United States Patent
Bygrave et al.

(10) Patent No.: US 12,143,476 B2
(45) Date of Patent: *Nov. 12, 2024

(54) METHOD OF DATA TRANSFER, A METHOD OF CONTROLLING USE OF DATA AND CRYPTOGRAPHIC DEVICE

(71) Applicant: NCIPHER SECURITY LIMITED, Cambridge (GB)

(72) Inventors: Ian Bygrave, Cambridge (GB); Alec Edgington, Cambridge (GB); Richard Kettlewell, Cambridge (GB); David O'Doherty, Cambridge (GB); Nicholas Smith, Cambridge (GB); Neil Walker, Cambridge (GB)

(73) Assignee: NCIPHER SECURITY LIMITED, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/504,378

(22) Filed: Nov. 8, 2023

(65) Prior Publication Data

US 2024/0073003 A1     Feb. 29, 2024

Related U.S. Application Data

(60) Continuation of application No. 17/376,930, filed on Jul. 15, 2021, now Pat. No. 11,849,029, which is a
(Continued)

(30) Foreign Application Priority Data

Feb. 5, 2016   (GB) ..................... 1602088

(51) Int. Cl.
*H04L 9/08* (2006.01)
*G06F 21/60* (2013.01)
*H04L 9/32* (2006.01)

(52) U.S. Cl.
CPC ............ *H04L 9/083* (2013.01); *G06F 21/606* (2013.01); *H04L 9/0825* (2013.01); *H04L 9/088* (2013.01);
(Continued)

(58) Field of Classification Search
CPC ....... H04L 9/086; H04L 9/0825; H04L 9/088; H04L 9/0897; H04L 9/3234; H04L 9/3268; H04L 9/3263; G06F 21/606
See application file for complete search history.

(56) References Cited

U.S. PATENT DOCUMENTS

| 7,565,528 B1 | 7/2009 | Mertes |
| 8,843,750 B1 | 9/2014 | Sokolov |

(Continued)

FOREIGN PATENT DOCUMENTS

| EP | 0898397 A2 | 2/1999 |
| EP | 1418702 B1 | 7/2007 |

(Continued)

OTHER PUBLICATIONS

Canadian Office Action in Application No. 3,013,687 mailed Apr. 16, 2016.
(Continued)

*Primary Examiner* — Samson B Lemma
(74) *Attorney, Agent, or Firm* — Merchant & Gould P.C.

(57) ABSTRACT

A method of data transfer from a tenant to a service provider comprises encrypting the data with a public key of a key pair generated by a secure device within the service provider system. The data thus cannot be accessed by the service provider during transmission.

The data is generated with a corresponding access control list, which specifies that a valid certificate must be presented in order to grant a particular use of the data once stored. The tenant can thus retain control of the use of the data even though it has been transferred out of the tenant system.

(Continued)

A method of controlling use of data securely stored in the service provider system comprises issuing a use certificate having an expiry time to the party requesting use of the data. The use certificate must be validated before use of the stored data is granted. This enables the tenant to grant use of the stored data for a limited time period.

10 Claims, 20 Drawing Sheets

Related U.S. Application Data division of application No. 16/075,575, filed as application No. PCT/GB2017/050264 on Feb. 3, 2017, now Pat. No. 11,101,983.

(52) U.S. Cl.
CPC .......... *H04L 9/0897* (2013.01); *H04L 9/3234* (2013.01); *H04L 9/3263* (2013.01); *H04L 9/3268* (2013.01)

(56) References Cited

U.S. PATENT DOCUMENTS

| | | | | |
|---|---|---|---|---|
| 8,887,246 | B2 | 11/2014 | Naslund | |
| 9,716,728 | B1* | 7/2017 | Tumulak | H04L 9/083 |
| 10,574,633 | B2 | 2/2020 | Le Saint | |
| 10,826,712 | B2 | 11/2020 | Le Saint | |
| 2002/0023208 | A1* | 2/2002 | Jancula | H04L 63/126 |
| | | | | 705/76 |
| 2002/0026583 | A1* | 2/2002 | Harrison | H04L 9/3236 |
| | | | | 713/172 |
| 2002/0078346 | A1 | 6/2002 | Sandhu | |
| 2003/0021417 | A1* | 1/2003 | Vasic | H04L 9/3263 |
| | | | | 713/155 |
| 2004/0093493 | A1 | 5/2004 | Bisbee | |
| 2005/0154889 | A1 | 7/2005 | Ashley | |
| 2005/0154909 | A1 | 7/2005 | Zhang | |
| 2006/0095953 | A1 | 5/2006 | Frank | |
| 2006/0155988 | A1 | 7/2006 | Hunter | |
| 2006/0168446 | A1 | 7/2006 | Ahonen | |
| 2007/0118745 | A1 | 5/2007 | Buer | |
| 2008/0141026 | A1 | 6/2008 | Cordery | |
| 2008/0215890 | A1 | 9/2008 | Buer | |
| 2008/0307495 | A1* | 12/2008 | Holtzman | G06F 21/10 |
| | | | | 726/2 |
| 2009/0187983 | A1 | 7/2009 | Zerfos | |
| 2010/0023757 | A1 | 1/2010 | Nguyen-Huu | |
| 2010/0138903 | A1 | 6/2010 | Medvinsky | |
| 2012/0243678 | A1 | 9/2012 | Rakic | |
| 2013/0061055 | A1 | 3/2013 | Schibuk | |
| 2014/0143543 | A1* | 5/2014 | Aikas | H04L 67/1097 |
| | | | | 713/168 |
| 2014/0229739 | A1* | 8/2014 | Roth | G06F 21/6218 |
| | | | | 713/189 |
| 2014/0230007 | A1* | 8/2014 | Roth | G06F 21/602 |
| | | | | 726/1 |
| 2015/0372811 | A1 | 12/2015 | Le Saint | |
| 2018/0167208 | A1* | 6/2018 | Le Saint | H04L 9/3265 |

FOREIGN PATENT DOCUMENTS

| | | | |
|---|---|---|---|
| JP | 2005521281 | A | 7/2005 |
| JP | 2011128697 | A | 6/2011 |
| JP | 2011211537 | A | 10/2011 |
| KR | 10-2001-0008103 | A | 2/2001 |
| KR | 10-2005-0074430 | A | 7/2005 |
| KR | 10-2006-0081334 | A | 7/2006 |
| KR | 10-2010-0018067 | A | 2/2010 |
| KR | 10-2010-0024605 | A | 3/2010 |
| KR | 10-2013-010000 | A | 9/2013 |
| KR | 10-2015-0080579 | A | 7/2015 |
| WO | 200067447 | A1 | 11/2000 |
| WO | 2003079266 | A1 | 9/2003 |
| WO | 2008/155454 | A1 | 12/2008 |
| WO | 2012/071143 | A1 | 5/2012 |
| WO | 2014/105310 | A1 | 7/2014 |
| WO | 2015012933 | A2 | 1/2015 |

OTHER PUBLICATIONS

Michael Howard et al., "Designing Secure Web-based Applications for Microsoft Windows 2000" Microsoft Programming Series (2000).
Office Action for Chinese Patent Application No. 201780009864.1 (mailed Mar. 3, 2021).
Office Action for Korean Patent Application No. 10-2018-7025706 (mailed Jan. 14, 2021).
Office Action for Korean Patent Application No. 10-2018-7025706, mailed Mar. 20, 2020.
Search Report for European Patent Application No. 20158813.4, mailed May 13, 2020.
Forouzan, Behrouz A., Cryptography & Network Security, Chapter 15, McGraw-Hill, Inc. (2007).
JP Office Action mailed Sep. 24, 2019 in JP Application No. 2018-540867.
PKCS #11 Cryptographic Token Interface Base Specification Version 2.40, Griffin, Robert, Fenwick, Valerie, Gleeson, Susan and Zimman, Chris (84 pgs).
Menezes. AJ, et al., Handbook of Applied Cryptography, published 1997, CRC Press, 12 pgs.
PCT/GB2017/050264, Written Opinion of the International Searching Authority, 21 pgs.
Vormetric Data Security Platform, Vormetric, Inc., 6 pgs.
Vormetric, Inc., Vormetric Encryption Excerpt Cryptographic Module Software Version 4.4.1. FIPS 140-2, Non-Proprietary Security Policy Level 1 Validation, Vormetric, Apr. 12 pgs.
Vormetric Encryption of VMware Customer Data at rest@softlayer, Vormetric, 60 pgs.
Vormetric Data Security Platform Architecture, Vormetric, Inc., 24 pgs.
Intellectual Property Office Search and Examination Report dated Sep. 7, 2016, 9 pgs.
Information technology—Security Techniques—Key Management—Part 3: Mechanisms using asymmetric techniques KS X ISO/IEC 11770-3 (2013) *See Korean Office Action (Cite #3), translated in English.
Communication European patent office in relation to patent application No. 20158813.4, Feb. 3, 2022.
Office Action for Korean Patent Application No. 10-2021-7033999, Jan. 19, 2022.

* cited by examiner

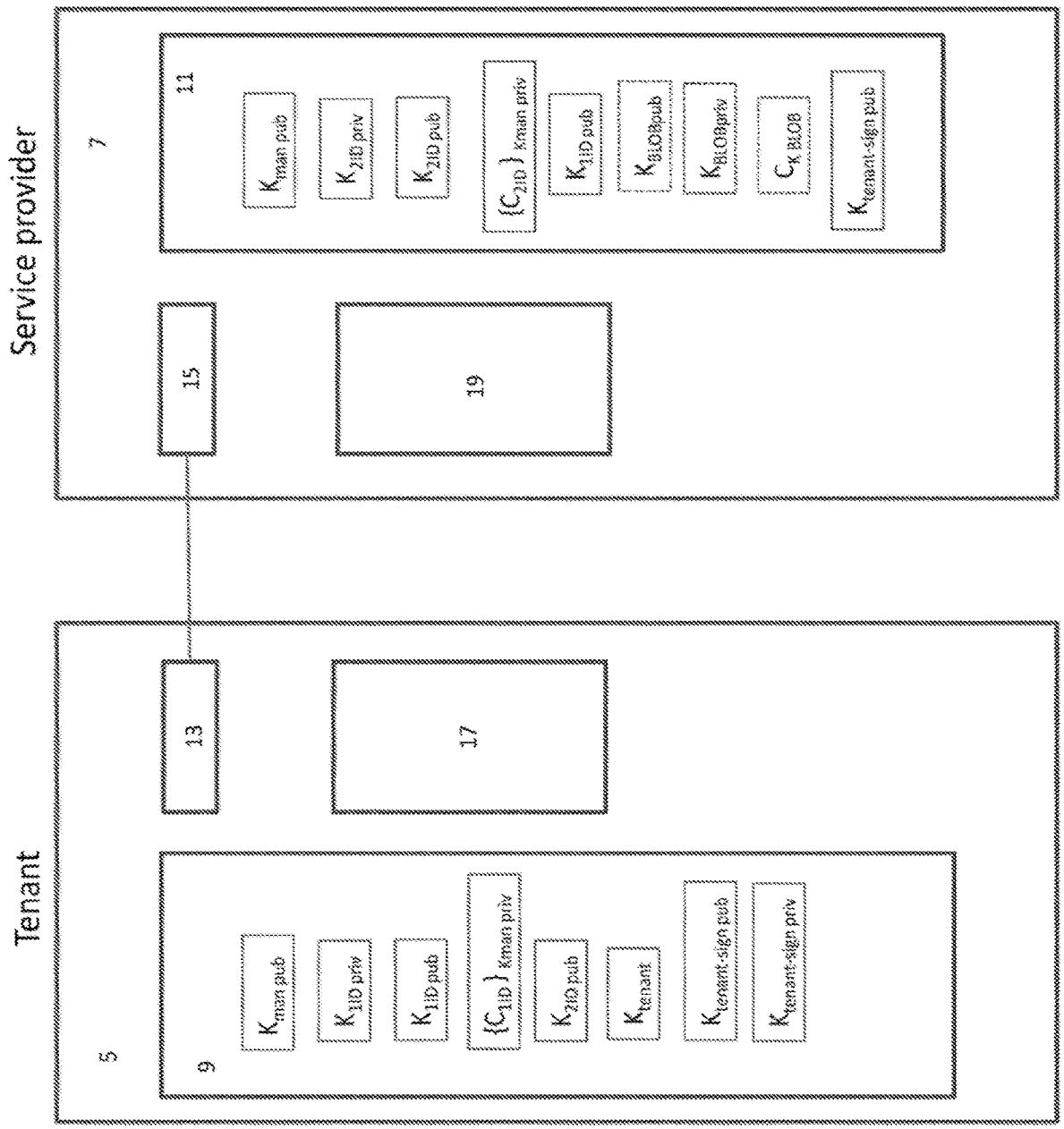

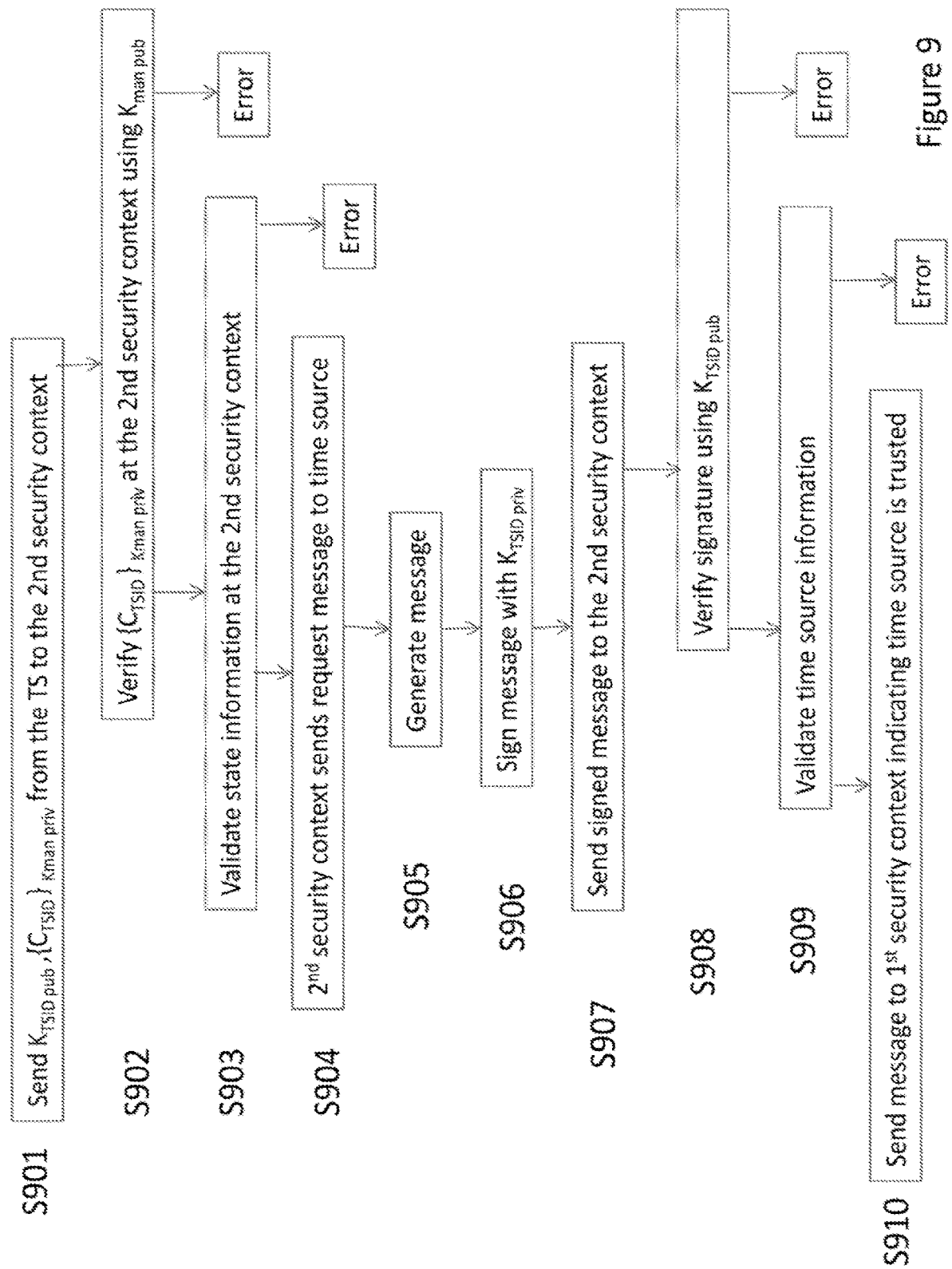

METHOD OF DATA TRANSFER, A METHOD OF CONTROLLING USE OF DATA AND CRYPTOGRAPHIC DEVICE

CROSS-REFERENCE TO RELATED APPLICATIONS

This application is a Continuation of U.S. patent application Ser. No. 17/376,930, filed Jul. 15, 2021, which is a Divisional of U.S. patent application Ser. No. 16/075,575, filed Aug. 3, 2018, which, in turn, is a National Stage of International Application No. PCT/GB2017/050264, filed Feb. 3, 2017, which claims priority to British Patent Application No. 1602088.5 filed Feb. 5, 2016. The contents of the aforementioned applications are incorporated herein by reference.

FIELD

The present invention relates to methods of data transfer, methods of controlling the use of data, and cryptographic devices.

BACKGROUND

The internet has resulted in many organisations using computer implemented services hosted by a service provider, which previously they would have been required to host themselves. Service providers are able to provide their computer implemented services to a large number of organisations (tenants). An example of this is cloud service providers, CSPs, who offer products such as "software as a service" (SaaS) or storage on demand. Use of a service provider hosted computer implemented service allows the tenants to reduce the administrative overhead of hosting such services themselves.

An area in which service providers have struggled to offer a multi-tenanted computer implemented service is in the cryptographic infrastructure sector, and specifically in hardware security modules, HSMs.

A conventional HSM hosted by a service provider uses a single-tenancy solution, i.e. deploying a dedicated appliance per tenant, to enable the secure cryptographic processing of data and storage of cryptographic keys on behalf of the tenant. The service provider manages the environmental settings of the cryptographic appliance, such as the IP address, whilst the tenant manages the cryptographic infrastructure remotely in a conventional manner. The service provider thus has to provide an appliance per tenant, whilst the tenant has to manage the maintenance and administration of the cryptographic appliance much as they would have previously. Such a system is inefficient and often results in underutilisation of cryptographic resources.

In addition, such a system is may be vulnerable. The service provider often has the "keys to the kingdom", that is, the ability to export the raw key material stored within the HSM. The permissions granted to the service provider can thus undermine the security of a hosted tenant key. This results in a number of issues for both the tenant and the service provider, including possible rogue use of a tenant's cryptographic key by a service provider, exposure of a tenant's key to a security agency that has jurisdiction over the service provider but not the tenant, and use of a tenant's key by another tenant.

STATEMENTS OF INVENTION

In a first aspect of the present invention, there is provided a method of data transfer between a first security context in a tenant system and a second security context in a service provider system, the method comprising:

generating an access control list corresponding to the data in the first security context, wherein the access control list specifies that a valid use credential must be presented in order to grant a first type of use of the data;

generating a first cryptographic key pair and a first cryptographic certificate in the second security context, the first cryptographic key pair comprising a first public key, $K_{BLOB\ pub}$, and a first private key, $K_{BLOB\ priv}$ and the first cryptographic certificate comprising information from which the origin of the first public key $K_{BLOB\ pub}$ can be validated; sending the first public key $K_{BLOB\ pub}$ and the first cryptographic certificate to the first security context;

validating the first cryptographic certificate in the first security context;

if the first cryptographic certificate is valid, encrypting the data and the corresponding access control list with the first public key $K_{BLOB\ pub}$ in the first security context;

sending the encrypted data and corresponding access control list, and information from which the origin of the data can be validated, to the second security context.

In an embodiment, the use credential is a use certificate.

In an embodiment, the data comprises a cryptographic key, $K_{tenant}$. The method may further comprise the step of generating the cryptographic key, $K_{tenant}$ in the first security context. The first type of use may be one or more cryptographic operations.

In an embodiment, the method further comprises establishing at the tenant system that the second security context is trusted, before sending the encrypted data.

Establishing trust may comprise validating at the first security context that the second security context is manufactured by a trusted manufacturer, that the configuration of the second security context meets the security requirements of the tenant and that the second security context is configured to enforce the policies contained in the ACL.

In an embodiment, it is validated that the configuration of the second security context meets the security requirements of the tenant immediately before transfer of the encrypted data to the second security context.

Establishing trust may further comprise validating that the state of the second security context meets the security requirements of the manufacturer, for example, validating that the software and hardware is impervious to attack by the service provider.

A manufacturer private key may be used to validate that the second security context is manufactured by a trusted manufacturer, and to validate a second identity public key of the second security context.

In an embodiment, the second security context stores a second identity private key, $K_{2ID\ priv}$, and the method further comprises sending the second identity public key, $K_{2ID\ pub}$, and a second identity certificate from the second security context to the first security context, wherein the second identity public key, $K_{2ID\ pub}$ and the second identity private key, $K_{2ID\ priv}$ are a cryptographic key pair and the second identity certificate comprises information identifying $K_{2ID\ pub}$ and is cryptographically signed by the manufacturer private key $K_{man\ priv}$.

In an embodiment, the second identity certificate further comprises information from which the state of the second security context can be validated.

In an embodiment, the method further comprises establishing at the tenant system that a reference time source is trusted. In an embodiment, the method further comprises establishing at the service provider system that a reference time source is trusted.

Establishing that a reference time source is trusted comprises validating that the reference time source is manufactured by a trusted manufacturer and that the state and configuration of the reference time source meets the security requirements.

In an embodiment, the method further comprises:
generating information relating to the current configuration of the second security context;
cryptographically signing the information with the second identity private key, $K_{2ID\ priv}$;
sending the signed information from the second security context to the first security context.

In an embodiment, the first cryptographic certificate comprises the information relating to the current configuration of the second security context and is signed with the second identity private key, $K_{2ID\ priv}$.

In an embodiment, the method further comprises:
generating a second cryptographic key pair and a second cryptographic certificate in the first security context, the second cryptographic key pair comprising a second public key, $K_{tenant\text{-}sign_{pub}}$, and a second private key, $K_{tenant\text{-}sign_{priv}}$, and the second cryptographic certificate comprising information from which the origin of the second public key $K_{tenant\text{-}sign_{pub}}$ can be validated;
sending the second public key $K_{tenant\text{-}sign_{pub}}$ and the second cryptographic certificate to the second security context.

In an embodiment, the first security context stores a first identity private key, $K_{1ID\ priv}$, and the method further comprises:
sending a first identity public key, $K_{1ID\ pub}$, and a first identity certificate from the first security context to the second security context, wherein the first identity public key, $K_{1ID\ pub}$ and the first identity private key, $K_{1ID\ priv}$ are a cryptographic key pair and the first identity certificate comprises information identifying $K_{1ID\ pub}$ and is cryptographically signed by a manufacturer private key $K_{man\ priv}$.

In an embodiment, the second cryptographic certificate comprises information from which the origin of the second public key $K_{tenant\text{-}sign_{pub}}$ can be identified; and the method further comprises:
cryptographically signing the second cryptographic certificate with the first identity private key, $K_{1ID\ priv}$;
verifying the second cryptographic certificate using the first identity public key, $K_{1ID\ pub}$ at the second security context.

The information from which the origin of the cryptographic key $K_{tenant}$ can be validated may comprise the encrypted cryptographic key $K_{tenant}$ and corresponding access control list signed with $K_{tenant\text{-}sign_{priv}}$.

The step of sending the encrypted cryptographic key $K_{tenant}$ and corresponding access control list, and information from which the origin of the cryptographic key $K_{tenant}$ can be validated, to the second security context may comprise:
cryptographically signing the encrypted cryptographic key $K_{tenant}$ and corresponding access control list with $K_{tenant\text{-}sign_{priv}}$;
sending the encrypted cryptographic key $K_{tenant}$ and corresponding access control list, the signature of the encrypted cryptographic key $K_{tenant}$ and corresponding access control list, and the hash of $K_{tenant\text{-}sign_{pub}}$ to the second security context.

In an embodiment, the first cryptographic certificate validates that $K_{BLOB\ priv}$ is ephemeral and that $K_{BLOB\ priv}$ cannot leave the second security context. In an embodiment, the first cryptographic certificate validates that the asymmetric key pair was generated in the second security context. The first private key, $K_{BLOB\ priv}$ is stored in the second security context.

In an embodiment, the information from which the origin of the first public key $K_{BLOB\ pub}$ can be validated is a signed hash of the first public key, $K_{BLOB\ pub}$. The first cryptographic certificate comprises a hash of the first public key, $K_{BLOB\ pub}$ and is signed with the private half of the identity key of the second security context, $K_{2ID\ priv}$. The step of validating the first cryptographic certificate, $C_{BLOB}$, comprises verifying the signature using the public half of the identity key of the second security context, $K_{2ID\ pub}$.

In an embodiment, the second security context is secure from the rest of the service provider system.

In an embodiment, the access control (ACL) list specifies that the use credential must comprise information from which the origin of the use credential can be validated. The access control list may specify that the use credential is a use certificate which must be signed by the second private key $K_{tenant\text{-}sign_{priv}}$ in order to grant the first type of use of the cryptographic key, $K_{tenant}$.

The ACL specifies that the use credential must comprise information from which the expiry of the use credential can be determined and must be unexpired in order to be valid.

The ACL may specify that the tenant cryptographic key $K_{tenant}$ can only be stored in non-volatile memory being resistant to tamper by a third party.

In an embodiment, the ACL specifies that the tenant cryptographic key $K_{tenant}$ can only be stored inside the second security context. In an alternative embodiment, the ACL contains a restriction that the tenant cryptographic key $K_{tenant}$ can only be stored on the condition that it is encrypted for storage by a key which cannot leave the second security context.

In an embodiment, the method further comprises:
validating, at the second security context, the origin of the cryptographic key $K_{tenant}$;
decrypting the encrypted cryptographic key $K_{tenant}$ and corresponding access control list with the first private key $K_{BLOB\ priv}$ at the second security context.

In an embodiment, the method further comprises:
re-encrypting the cryptographic key $K_{tenant}$ with a further cryptographic key at the second security context, wherein the further cryptographic key cannot leave the second security context;
storing the re-encrypted cryptographic key $K_{tenant}$, corresponding access control list, and information from which the origin of the cryptographic key $K_{tenant}$ can be validated.

In a further aspect of the present invention, there is provided a carrier medium comprising computer readable code configured to cause a computer to perform any of the methods described.

In a further aspect of the present invention, there is provided a method of controlling use of data, the data being stored in a service provider system in a manner which is accessible to a trusted second security context in the service provider system but secure from the rest of the service provider system, wherein an access control list specifying that a valid use credential must be presented in order to grant a first type of use of the data is stored with the data, the method comprising:

generating a use credential in a first security context, wherein the use credential comprises:
  information from which the data corresponding to the use credential can be identified;
  information from which the expiry of the use credential can be determined;
issuing the use credential and information from which the origin of the use credential can be validated;
validating the use credential with respect to the access control list, and validating that the use credential has not expired at the second security context;
granting the first type of use of the data, in the second security context, on the condition that the use credential is valid and not expired.

In an embodiment, the use credential is a use certificate.

In an embodiment, the data comprises a cryptographic key, $K_{tenant}$. The first type of use may be one or more cryptographic operations.

In an embodiment, the information from which the expiry of the use credential can be determined comprises:
  an expiry time;
  information identifying a reference time source.

In an embodiment, the method further comprises establishing at the tenant system that a reference time source is trusted. In an embodiment, the method further comprises establishing at the service provider system that a reference time source is trusted. Establishing that a reference time source is trusted comprises validating that the reference time source is manufactured by a trusted manufacturer and that the state and configuration of the reference time source meets the security requirements.

In an embodiment, the method further comprises providing the public half of an identity cryptographic key pair of the time source to the first security context, together with information validating the origin of the identity cryptographic key pair.

In an embodiment, the method further comprises providing the public half of an identity cryptographic key pair of the time source to the second security context, together with information validating the origin of the identity cryptographic key pair.

In an embodiment, generating a use credential in a first security context comprises:
  selecting a reference time source;
  requesting the current time stamp from the reference time source
  calculating the expiry time based on the time stamp.

In an embodiment, the method comprises:
  sending a message comprising the current time stamp from the reference time source to the tenant system, together with information from which the origin of the message can be validated; and
  validating the origin of the message.

The message may further comprise information relating to the current configuration of the reference time source.

The information validating the origin of the message may be the signed message, signed with the private half of the identity cryptographic key pair of the time source.

In an embodiment, information relating to a start time is included in the use credential.

The information from which the data corresponding to the use credential can be identified may be a hash of $K_{tenant}$.

In an embodiment, the use credential is a use certificate and the method further comprises:
  cryptographically signing the use certificate with a private key $K_{tenant\text{-}sign_{priv}}$ in the first security context, wherein the information from which the origin of the use certificate can be validated is the signature and wherein the corresponding public key $K_{tenant\text{-}sign_{pub}}$ is integrity protect and accessible to the second security context;
  verifying the use certificate using the public key $K_{tenant\text{-}sign_{pub}}$ at the second security context.

In an embodiment, the method further comprises:
  providing the use credential, the information from which the origin of the use credential can be validated, and a request to perform an operation with the key $K_{tenant}$, the operation being a first type of use, to the second security context;
  performing the operation at the second security context, on the condition that the use credential is valid and not expired.

In an embodiment, validating that the use credential has not expired at the second security context comprises:
  requesting the current time stamp from the reference time source;
  sending a message comprising the current time stamp from the reference time source to the second security context, together with information from which the origin of the message can be validated; and
  validating the origin of the message.

The information validating the origin of the message may be the signed message, signed with the private half of the identity cryptographic key pair of the time source.

Validating that the use credential has not expired at the second security context may further comprise:
  comparing the time stamp to the expiry time.

In a further aspect of the present invention, there is provided a carrier medium comprising computer readable code configured to cause a computer to perform any of the methods described.

In a further aspect of the present invention, there is provided a cryptographic device comprising a first security context, the first security context comprising:
  a first transceiver configured to receive a first public key $K_{BLOB\ pub}$ and a first cryptographic certificate, comprising information from which the origin of the first public key $K_{BLOB\ pub}$ can be validated, from a second security context;
  a first processor configured to perform cryptographic operations, the first processor being configured to:
    generate an access control list corresponding to data to be transferred, wherein the access control list specifies that a valid use credential must be presented in order to grant a first type of use of the data;
    validate that the first cryptographic key pair originated from the second security context;
    encrypt the data and the corresponding access control list with the first public key $K_{BLOB\ pub}$;
  wherein the first transceiver is configured to send the encrypted data and corresponding access control list, and information from which the origin of the data can be validated, to the second security context.

In an embodiment, the use credential is a use certificate.

In an embodiment, the data comprises a cryptographic key, $K_{tenant}$.

In an embodiment, the device further comprises:
  a first device memory, storing a first identity private key, $K_{1ID\ priv}$;
wherein the first transceiver is further configured to:
  send a first identity public key, $K_{1ID\ pub}$, and a first identity certificate to the second security context, wherein the first identity public key, $K_{1ID\ pub}$ and the first identity private key, $K_{1ID\ priv}$ are a cryptographic key pair and the first identity certificate comprises information identifying $K_{1ID\ pub}$ and is cryptographically signed by a manufacturer private key $K_{man\ priv}$; and receive a second identity public key, $K_{2ID\ pub}$, and a second identity certificate from the second security context, the second identity certificate comprising information identifying $K_{2ID\ pub}$ and being cryptographically signed by the manufacturer private key $K_{man\ priv}$;

the first processor is further configured to verify the second identity certificate using the manufacturer public key $K_{man\ pub}$.

In an embodiment, the first transceiver is further configured to:

receive information relating to the current configuration of the second security context, wherein the information is cryptographically signed with a second identity private key, $K_{2ID\ priv}$, wherein the second identity public key, $K_{2ID\ pub}$ and the second identity private key, $K_{2ID\ priv}$ are a cryptographic key pair; and wherein the first processor is further configured to:

verify the signature using the second identity public key, $K_{2ID\ pub}$;

validate that the configuration of the second security context meets the security requirements of the tenant and that the second security context is configured to enforce the policies contained in the ACL.

In an embodiment, the first processor is further configured to:

generate a second cryptographic key pair and a second cryptographic certificate in the first security context, the second cryptographic key pair comprising a second public key, $K_{tenant-sign_{pub}}$, and a second private key, $K_{tenant-sign_{priv}}$ and the second cryptographic certificate comprising information from which the origin of the second public key $K_{tenant-sign_{pub}}$ can be identified;

cryptographically sign the second cryptographic certificate with the first identity private key, $K_{1ID\ priv}$;

wherein the first transceiver is further configured to send the second public key $K_{tenant-sign_{pub}}$ and the signed second cryptographic certificate to the second security context.

In a further aspect of the present invention, there is provided a cryptographic device, comprising a first security context, comprising:

a first processor, configured to generate a use credential comprising:
  information from which data corresponding to the use credential can be identified;
  information from which an expiry of the use credential can be determined;
a first transceiver, configured to send the use credential and information from which the origin of the use credential can be validated to a second security context.

In an embodiment, the use credential is a use credential.
In an embodiment, the data comprises a cryptographic key, $K_{tenant}$.
In an embodiment, the first security context further comprises:

a first device memory, storing a private key $K_{tenant-sign_{priv}}$;
wherein the first processor is configured to cryptographically sign the use credential with the private key $K_{tenant-sign_{priv}}$.

In an embodiment, the use credential is a use certificate.
In an embodiment, the information from which the expiry of the use credential can be determined comprises:
an expiry time;

information identifying a reference time source.

In an embodiment, the information from which the cryptographic key $K_{tenant}$ corresponding to the use credential can be identified is a hash of $K_{tenant}$.

In a further aspect of the present invention, there is provided a cryptographic device comprising a second security context, for cooperation with a device or devices comprising a first security context, the cryptographic device comprising:

a processor, configured to perform cryptographic operations, the processor being configured to:
  generate a first cryptographic key pair and a first cryptographic certificate, the first cryptographic key pair comprising a first public key, $K_{BLOB\ pub}$, and a first private key, $K_{BLOB\ priv}$ and the first cryptographic certificate comprising information from which the origin of the first public key $K_{BLOB\ pub}$ can be validated;
a transceiver, configured to:
  send the first public key $K_{BLOB\ pub}$ and the first cryptographic certificate to a first security context; and
  receive encrypted data and a corresponding access control list, and information from which the origin of the data can be validated from the first security context;
the processor further configured to:
  validate the origin of the data;
  decrypt the encrypted data and corresponding access control list using the first private key $K_{BLOB\ priv}$.

In an embodiment, the use credential is a use certificate.
In an embodiment, the data comprises a cryptographic key, $K_{tenant}$.
In an embodiment, the processor is further configured to:
  re-encrypt the cryptographic key $K_{tenant}$ with a further cryptographic key, wherein the further cryptographic key cannot leave the second security context.

In an embodiment, the device further comprises a device memory, storing a second identity private key, $K_{2ID\ priv}$ and wherein the transceiver is further configured to:

send a second identity public key, $K_{2ID\ pub}$, and a second identity certificate to the first security context, wherein the second identity public key, $K_{2ID\ pub}$ and the second identity private key, $K_{2ID\ priv}$ are a cryptographic key pair and the second identity certificate comprises information identifying $K_{2ID\ pub}$ and is cryptographically signed by a manufacturer private key $K_{man\ priv}$; and receive a first identity public key, $K_{1ID\ pub}$, and a first identity certificate from the first security context, the first identity certificate comprising information identifying $K_{1ID\ pub}$ and being cryptographically signed by the manufacturer private key $K_{man\ priv}$ the processor is further configured to;
  verify the first identity certificate using the manufacturer public key $K_{man\ pub}$.

In an embodiment, the processor is further configured to:
generate information relating to the current configuration of the second security context;
cryptographically sign the information with the second identity private key, $K_{2ID\ priv}$; and
wherein the transceiver is further configured to:
send the information and signature to the first security context.

In an embodiment, the processor is further configured to:
generate the first cryptographic certificate comprising the information relating to the current configuration of the second security context and sign the first cryptographic certificate with the second identity private key, $K_{2ID\ priv}$.

In an embodiment, the transceiver is further configured to: receive a second public key $K_{tenant-sign_{pub}}$ and a signed second cryptographic certificate, the second cryptographic certificate comprising information from which the origin of the second public key $K_{tenant-sign_{pub}}$ can be validated, from the first security context;

and wherein the processor is further configured to: validate the origin of the second public key $K_{tenant-sign_{pub}}$.

In a further aspect of the present invention, there is provided a device, comprising:
a device memory, storing:
  encrypted data;
  an access control list corresponding to the data, the access control list specifying that a valid use credential must be presented in order to grant a first type of use of the data, and specifying that the use credential must comprise information from which the expiry of the use credential can be determined and must be unexpired in order to grant a first type of use of the data; and
  information from which the origin of the data can be identified.

In an embodiment, the use credential is a use certificate.

In an embodiment, the device is a cryptographic device comprising a second security context, for cooperation with a device or devices comprising a first security context.

In an embodiment, the data comprises a cryptographic key, $K_{tenant}$.

The access control list may specify that the use credential is a use certificate which must be signed by a private key $K_{tenant-sign_{priv}}$ in order to grant use of the cryptographic key, $K_{tenant}$.

The access control list may specify that the use credential must comprise information from which the cryptographic key $K_{tenant}$ corresponding to the use credential can be identified.

In an embodiment, the encrypted cryptographic key $K_{tenant}$ is encrypted by a key which cannot leave the second security context.

In an embodiment, the device further comprises:
a processor, configured to
  validate a received use credential with respect to the access control list, and validate that the use credential has not expired;
  grant the first type of use of the cryptographic key, $K_{tenant}$, in the second security context, on the condition that the use credential is valid and not expired.

In an embodiment, there is provided a method of data transfer from a tenant to a service provider comprising encrypting the data with a public key of a key pair generated by a secure device within the service provider system. The data thus cannot be accessed by the service provider during transmission.

The data is generated with a corresponding access control list, which specifies that a valid certificate must be presented in order to grant a particular use of the data once stored. The tenant can thus retain control of the use of the data even though it has been transferred out of the tenant system.

In an embodiment, there is provided a method of controlling use of data securely stored in the service provider system comprising issuing a use credential having an expiry time to the party requesting use of the data. The use credential must be validated before use of the stored data is granted. This enables the tenant to grant use of the stored data for a limited time period.

In this specification, the term security context refers to one or more security appliances (for example HSMs), or partitions of a security appliance, which share at least one private key and are configured to safeguard and perform a set of cryptographic functions.

In this specification, the term cryptographic key refers to a block of raw cryptographic material for use in cryptographic operations. An access control list corresponding to the key comprises information relating to a set of permissions describing the operations the key material may be used for, for example encryption, decryption or storage, and any credentials that must be provided to enable permissions. Also associated with the key may be information relating to the key type which comprises data identifying the type of key, including information identifying, for example, the algorithms the key can be used with and its length, e.g. the Advanced Encryption Standard (AES) algorithm with a key of length 256 bits, or the RSA algorithm with a key length of 2048 bits.

In this specification, the term "verify" may be used to refer to a method of checking a cryptographic signature. The term "validate" may be used to refer to a method of checking that data is as expected, or to a method of checking both that a signature is correct and that the data is as expected.

In this specification, the term "access control list" refers to one or more permissions attached to an object. The permissions specify which operations are allowed on the object, and the conditions and/or credentials required for the operation to be granted. In the methods described in this specification, public keys may be stored within the first security context or the second security context, or on untrusted mediums outside of the first security context or the second security context if the public key is integrity protected, for example signed by the identity key of the first security context or the second security context. This means that if the public key is tampered with, it will be detected.

In the methods described in this specification, information sent between the first security context and the second security context may be validated by use of a cryptographic certificate. For example, the information may be signed by a private signing key belonging to the sender, and the signature sent together with the information to the receiver.

The methods described in this specification may be computer implemented methods.

Since some methods in accordance with embodiments can be implemented by software, some embodiments encompass computer code provided to a general purpose computer on any suitable carrier medium. The carrier medium can comprise any non-transient storage medium such as a floppy disk, a CD ROM, a magnetic device or a programmable memory device, or any transient medium such as any signal for example an electrical, optical or microwave signal.

BRIEF DESCRIPTION OF THE FIGURES

Devices and methods in accordance with non-limiting embodiments will now be described with reference to the accompanying figures in which:

FIG. 5 is a schematic illustration of a first security context in accordance with an embodiment of the present invention and a second security context in accordance with an embodiment of the present invention after the second public key, $K_{tenant\text{-}sign\ pub}$, has been exchanged during the data transfer process;

FIG. 9 is a flow chart showing a method of registering a time source with the second security context;

DETAILED DESCRIPTION

Figure 1A:
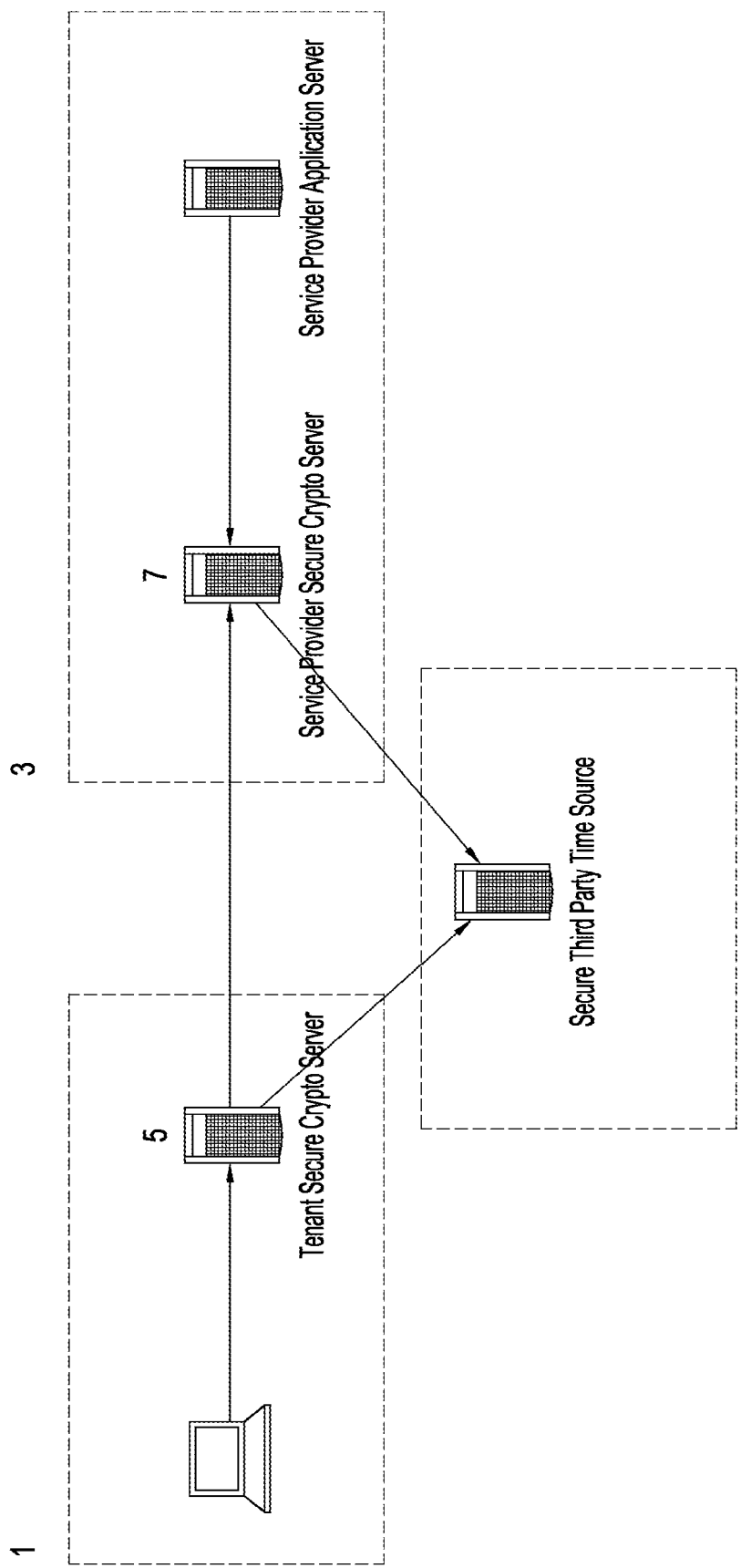
FIG. 1(a) is a schematic illustration of a network comprising a tenant system comprising a cryptographic device in accordance with an embodiment of the present invention and a service provider system comprising a cryptographic device in accordance with an embodiment of the present invention.

FIG. 1(a) is a schematic illustration of a tenant system 1 comprising a cryptographic device in accordance with an embodiment of the present invention and a service provider system 3 comprising a cryptographic device in accordance with another embodiment of the present invention.

The service provider may be a cloud service provider for example. The service provider provides storage of data such as cryptographic keys and secure cryptographic processing of data to one or more tenants. For example, the tenants may use the cryptographic infrastructure of the service provider system 3 for applications such as payments, security and regulation. The service provider system 3 comprises a service provider application server, configured to perform one or more applications such as these.

In order to use these services, the tenant system 1 provides a cryptographic key $K_{tenant}$ to the service provider system 3. The cryptographic key $K_{tenant}$ is securely stored at the service provider system 3 for use in such applications.

The tenant system 1 comprises a first security context 5 and the service provider system 3 comprises a second security context 7. A security context may be a single security device, for example a hardware security module, HSM. Alternatively, it may be two or more security devices, or a partition of a security device. The term security context is used here to refer to the device, devices, or partition of a device which form a single security context, i.e. which share at least one private key and are configured to safeguard and perform a set of cryptographic functions. The first security context 5 is secured from the rest of the tenant system. The second security context 7 is secured from the rest of the service provider system.

The tenant cryptographic key $K_{tenant}$ is provided to the second security context 7 in the service provider system 3. The tenant cryptographic key $K_{tenant}$ is then either stored within the second security context 7 or is encrypted with a key that cannot leave the second security context before being stored elsewhere in the service provider system 3.

Before providing the cryptographic key $K_{tenant}$ to the second security context 7, the tenant can authenticate and validate the second security context 7 from a generation certificate provided by the second security context 7. The generation certificate may have been generated at the time of manufacture of the device or devices which are part of the second security context 7 for example. The tenant trusts the manufacturer but not the service provider. The generation certificate authenticates that the second security context 7 was manufactured by the trusted manufacturer, and thus can be trusted.

Furthermore, the parameters and state of the second security context 7 can be validated, for example from information contained in the generation certificate, and in a further configuration certificate.

A generation certificate comprises static information that is valid for the entire lifetime of the appliance. A configuration certificate comprises information about the current configuration of the device. Configuration information is valid only at the time of generation of the configuration certificate, and may change at a later stage.

The first security context 5 thus establishes trust with the second security context, before key transfer operations begin.

The tenant cryptographic key $K_{tenant}$ is encrypted with the public half of an asymmetric key pair generated at the second security context 7, before being transferred to the second security context 7. A first cryptographic certificate is issued with the asymmetric key pair generated at the second security context 7. In an embodiment, the first cryptographic certificate validates that the asymmetric key pair was generated in the second security context 7, that the private half of the asymmetric key pair is ephemeral and that the private half of the asymmetric key pair cannot leave the second security context 7. This enables the tenant cryptographic key $K_{tenant}$ to be transferred to the service provider system 3 in a manner which is secure from attackers and from the service provider itself, i.e. from the rest of the service provider system 3 which is outside of the second security context 7, for example the application server.

In an embodiment, the tenant cryptographic key $K_{tenant}$ is then stored in the second security context 7. Alternatively, the tenant cryptographic key $K_{tenant}$ is stored elsewhere in the service provider system, for example in the application server, encrypted by a key which cannot leave the second security context 7.

An access control list (ACL) corresponding to the tenant cryptographic key $K_{tenant}$ is also generated with the tenant cryptographic key $K_{tenant}$ in the first security context 5. The ACL is also transferred to the second security context 7 with the tenant cryptographic key $K_{tenant}$. The ACL is stored with the tenant cryptographic key $K_{tenant}$. The first security context 5 has established trust with the second security context 7, and thus knows that the second security context 7 will enforce the policies contained in the ACL. The ACL thus allows the tenant to retain control over the key, even once it has been transferred to the second security context 7.

In an embodiment, the ACL specifies that the tenant cryptographic key $K_{tenant}$ can only be stored inside the second security context 7. In an alternative embodiment, the ACL contains a restriction that the tenant cryptographic key $K_{tenant}$ can only be stored on the condition that it is encrypted for storage by a key which cannot leave the second security context 7. This ensures that the tenant cryptographic key $K_{tenant}$ is inaccessible to third parties and to the service provider.

The ACL may specify that the tenant cryptographic key $K_{tenant}$ can only be stored in non-volatile memory being resistant to tamper by a third party.

Furthermore, the ACL specifies that a valid use credential, for example a use certificate, must be presented in order to grant one or more types of use of the tenant cryptographic key $K_{tenant}$. For example, the ACL may require presentation of a certificate signed by the private half of an asymmetric key owned by the tenant to grant performance of certain cryptographic operations using the tenant key $K_{tenant}$. This ensures that the particular type of operations using the key cannot be used if not authorised by the tenant.

Although the tenant cryptographic key $K_{tenant}$ is stored in the service provider system, the service provider, i.e. the rest of the service provider system 3 which is outside of the second security context 7, cannot access the key, and the key cannot be used without authorisation from the tenant. This protects the tenant cryptographic key $K_{tenant}$ from a malicious service provider. It also protects the tenant cryptographic key $K_{tenant}$ from security agencies which have jurisdiction over the service provider but not the tenant, for example.

It also allows multiple tenants to use the same cryptographic infrastructure in the service provider. Multiple tenants can store keys in the same security device, as each tenant cryptographic key $K_{tenant}$ is inaccessible to the other tenants, and cannot be used without authorisation from the corresponding tenant.

The access control list may specify that the use credential must comprise information from which the expiry of the use credential can be determined and must be unexpired in order to grant use of the cryptographic key, $K_{tenant}$. The tenant is thus able to specify, in the use credential, an expiry period for its key, after which the key may not be used until further authorization is provided.

Figure 1B:
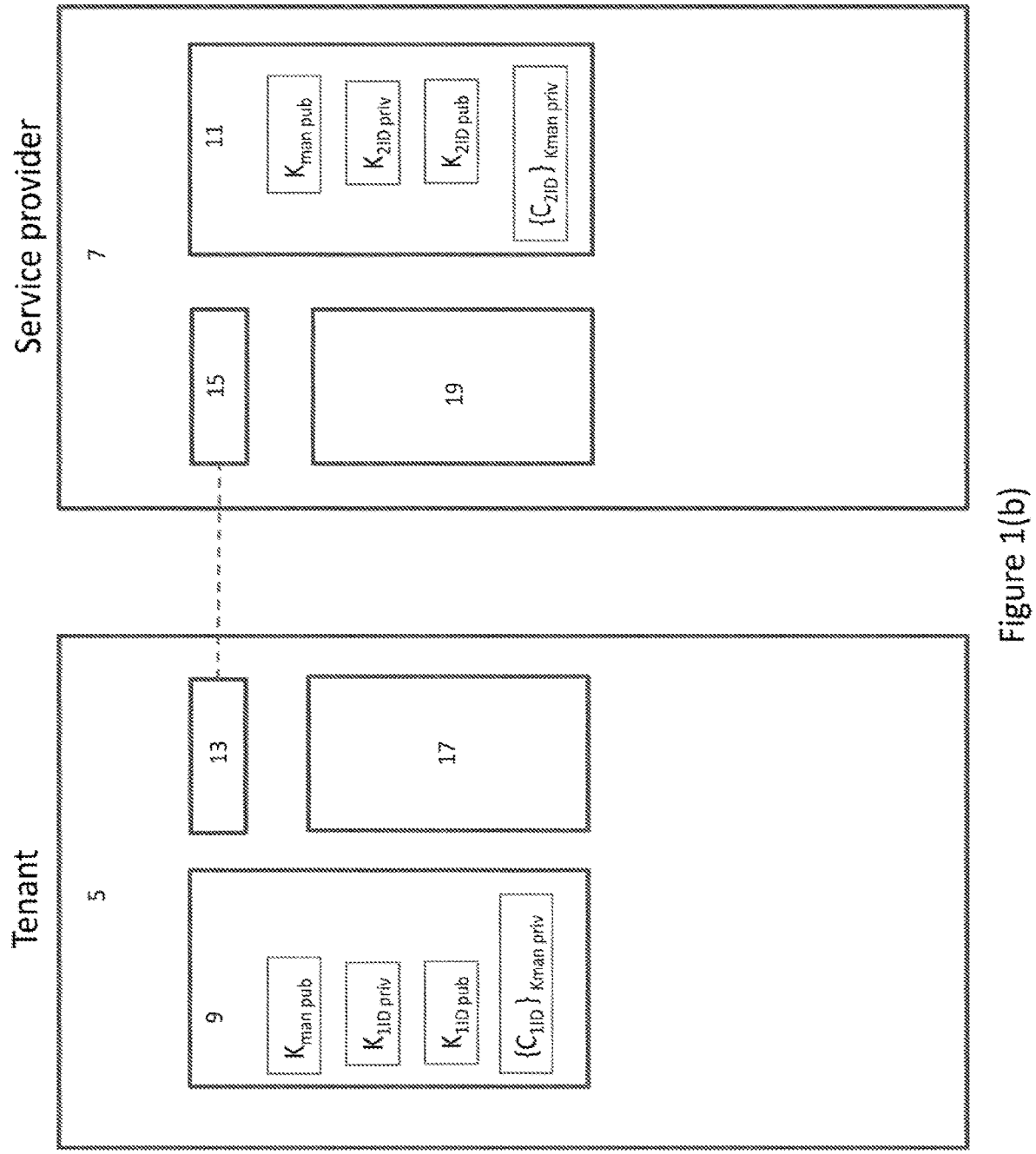
FIG. 1(b) shows a schematic illustration of a first security context in accordance with an embodiment of the present invention and a second security context in accordance with an embodiment of the present invention.

The expiry time can be calculated with reference to a reference time source 2 that is trusted by both the first security context 5 and the second security context 7. The reference time source 2 may be hosted by the service provider, the tenant or a separate third-party. FIG. 1(*a*) shows a schematic illustration of an embodiment in which the reference time source 2 is hosted by a third party.

Although the above description relates to transfer and storage of a tenant cryptographic key, any form of data may be transferred and stored in the same manner. The method of data transfer from a tenant to a service provider comprises encrypting the data with a public key of a key pair generated by a secure device within the service provider system. The data thus cannot be accessed by the service provider during transmission. The encrypted data is cryptographically signed before transfer, to ensure authenticity and integrity of the data.

The data is generated with a corresponding access control list, which specifies that a valid certificate must be presented in order to grant a particular use of the data once stored. The tenant can thus retain control of the use of the data even though it has been transferred out of the tenant system.

A method of controlling use of data securely stored in the service provider system comprises issuing a use credential having an expiry time to the party requesting use of the data. The use credential must be validated before use of the stored data is granted. This enables the tenant to grant use of the stored data for a limited time period.

FIG. 1(*b*) shows a schematic illustration of a first security context 5 in accordance with an embodiment of the present invention and a second security context 7 in accordance with another embodiment of the present invention.

The first security context 5 may be a single security appliance, for example a hardware security module, HSM. Alternatively, the first security context 5 may be two or more security appliances, or a partition of a security appliance. The first security context 5 could be a low-power, low performance, low cost HSM for example.

The second security context 7 may be a single security appliance, for example a hardware security module. Alternatively, the second security context 7 may be two or more security appliances, or a partition of a security appliance. The second security context 7 may comprise a cluster of high-performance HSMs.

The first security context 5 and the second security context 7 may thus each comprise one or more tamper resistant cryptographic appliances or a partition of a tamper resistant cryptographic appliance.

The first security context 5 comprises a first device memory 9. The first device memory 9 is configured to store cryptographic information such as keys, key pairs and certificates. The first device memory 9 may include any form of non-volatile device memory such as flash, optical disks or magnetic hard drives for example. The first security context 5 also comprises volatile memory.

The first device memory 9 may be physically secure and may be resistant to tamper by a third party, for example by the inclusion of physical security such as a membrane that covers the entire device, that cannot be removed without destroying the underlying physical hardware, thus making it un-usable.

A unique asymmetric identity key $K_{1ID}$ is stored in the first device memory 9, with a corresponding signed generation certificate $\{C_{1ID}\}K_{man\ priv}$. $K_{1ID}$ is a signing key used to prove the origin of data and authenticity. The generation certificate $C_{1D}$ may describe the public parameters of the key, for example, the generation certificate $C_{1D}$ may include information relating to the type of the key, and its length. The generation certificate $C_{1ID}$ comprises information which authenticates that the identity key $K_{1ID}$ was generated in the first security context 5. For example, the generation certificate $C_{1D}$ may comprise the hash of the public half of $K_{1ID}$ and be signed by the private half of a manufacturer asymmetric key, $K_{man\ priv}$.

The generation certificate $C_{1D}$ may also include state information, for example, information relating to a unique identification of the device, information identifying the manufacturer, the hardware version used, the software type used, the serial number of the unit and the supported features/functionality of the model. The generation certificate $C_{1ID}$ is signed by a manufacturer trusted by both the first security context 5 and the second security context 7. The generation certificate is cryptographically signed with the private half of a manufacturer asymmetric key, $K_{man\ priv}$. The manufacturer may be a third party who manufactured the security appliance(s) which forms the first security context and the security appliance(s) which forms the second security context. The public half of the trusted manufacturer key $K_{man\ pub}$ is also stored in the first device memory 9, or may be stored outside of the first security context 5 in an integrity protected manner.

The second security context 7 comprises a second device memory 11. The second device memory 11 is configured to store cryptographic information such as keys, key pairs and certificates. The second device memory 11 may include any form of non-volatile device memory such as flash, optical disks or magnetic hard drives for example. The second security context 5 also comprises volatile memory.

The device memory may be physically secure and may be resistant to tamper by a third party, for example by the inclusion of physical security such as a membrane that covers the entire device, that cannot be removed without destroying the underlying physical hardware, thus making it un-usable.

A unique asymmetric identity key $K_{2ID}$ is stored in the second device memory 11, with a corresponding signed generation certificate $\{C_{2ID}\}K_{man\ priv}$. $K_{2ID}$ is a signing key used to prove the origin of data and authenticity. The generation certificate $C_{2ID}$ may describe the public parameters of the key, for example, the generation certificate $C_{2ID}$ may include information relating to the type of the key, and its length. The generation certificate $C_{2ID}$ comprises information which authenticates that the identity key $K_{2ID}$ was generated in the second security context 7. For example, the generation certificate $C_{2ID}$ may include a hash of the public half of $K_{2ID}$, and be signed by the private half of a manufacturer asymmetric key, $K_{man\ priv}$.

The generation certificate $C_{2ID}$ may also include state information, for example, information relating to a unique identification of the device, information identifying the manufacturer, the hardware version, the software type used, the serial number of the unit and the supported features/functionality of the model. The generation certificate $C_{2ID}$ is signed by the trusted manufacturer. The generation certificate is cryptographically signed with the private half of a manufacturer asymmetric key, $K_{man\ priv}$. The public half of the trusted manufacturer key $K_{man\ pub}$ is also stored in the second device memory 11, or may be stored outside of the second security context 7 in an integrity protected manner.

In both the first security context 5 and the second security context 7, cryptographic keys are stored in the device memory in a secure, tamper-proof format.

The first security context 5 and second security context 7 can be verifiably identified using cryptographic certificates, the signed generation certificates $\{C_{1ID}\}_{Kman\ priv}$ and $\{C_{2ID}\}_{Kman\ priv}$, which may be generated at the time of manufacture. Each is thus able to securely store their identity in a way that means they cannot be imitated. Identifying the first security context 5 and second security context 7 allows for the origin of the device or devices in each security context to be ascertained. Each device contains the unique asymmetric identity key $K_{ID}$ generated in the factory when it was manufactured, for example. Each component also contains the key-generation certificate for the $K_{ID}$ which is signed using an asymmetric key known only to the manufacturer. The public half of the manufacturer key can be used as the root of trust to authenticate genuine appliances.

Furthermore, the parameters and state of the first security context and second security context can be validated in a non-repudiable manner, from information contained in the generation certificate, and through exchange of further, configuration, certificates.

In an embodiment, the first security context 5 and second security context 7 are each configured to generate a configuration certificate, $C_{1V}$ and $C_{2V}$ respectively, containing information about the current configuration of the devices set by the tenant and service provider. The configuration information cannot be included in the generation certificates, as these are generated at the time of manufacture, before the devices are distributed to the tenant and service provider and configured.

Thus once the generation certificates have been exchanged, and trust formed between the two security contexts, further information that relates to the dynamic configuration can be exchanged through further signed certificate data transfer. The configuration certificates, $C_{1V}$ and $C_{2V}$ respectively, are signed by the private half of the unique asymmetric identity key of the corresponding security context. The configuration certificate is signed by $K_{IDpriv}$ to verify authenticity, as $K_{IDpriv}$ is now trusted by the other security context. The data contained in the configuration certificate may pertain to the administrator deployment options such as security settings, software version, which trusted time source is used or whether the HSM believes there has been an attempt to tamper with it for example.

The origin and state of a service define enough information by which other services can place their trust. This information is exchanged in the generation and configuration certificates.

The second security context is trusted to enforce the rules specified in an ACL provided to the second security context and trusted to update its state certificates accurately. In an embodiment, if the second security context cannot enforce a rule to the specified level contained within the ACL then it will not perform an operation and will not advertise itself or the keys that it has created as supporting said rules.

The identity keys of the first and second security context may be installed at manufacture, and the hash of these keys signed by a manufacturer key $K_{man\ priv}$, and stored with the identity key, thus proving its provenance.

By being able to cryptographically identify services from "trusted" sources, a tenant is able to exchange its cryptographic key with a hosted service over a communication channel with a high assurance that all data is protected and not recoverable by any third-party, including the hosting service provider. By ascertaining that the service provider's appliance(s) in the second security context 7 is trusted, from the generation certificate, and that its configuration meets the tenant's security policy, from the configuration certificate, the tenant can transfer their key knowing that the key will be stored in the manner specified. The ACL sent with the key includes policies specifying how the key is to be stored and used. The second security context 7 will then enforce the policies. The tenant can trust that the second security context 7 will enforce the policies as it has established trust with the second security context 7. Establishing trust allows secure transfer and the ACL allows the second security context 7 to apply a policy once it is in possession of the key.

The first security context 5 further comprises a transceiver 13. The transceiver 13 is configured to transmit and receive data packets. The data packets may be transmitted from and received at the first transceiver 13, for example via an Internet connection or a directly wired connection between the first security context 5 and the second security context 7. This communication link may be untrusted, however the key transfer protocol described in relation to FIG. 6(a) below provides protection of the key from attackers. The first security context 5 further comprises a first processor 17. The first processor 17 is configured to perform cryptographic operations, such as generation of cryptographic keys and asymmetric cryptographic key pairs, generation of certificates corresponding to a cryptographic key or asymmetric cryptographic key pair, generation of access control lists corresponding to a cryptographic key, generation of use certificates corresponding to a cryptographic key, encryption of an object with a cryptographic key which is stored in the first device memory 9, decryption of an encrypted object with a cryptographic key which is stored in the first device memory 9, cryptographically signing an object with a cryptographic key which is stored in the first device memory 9, verification of a cryptographic signature and validation of an object based on information stored in the first device memory 9. The first processor 17 may be physically secure.

In an embodiment, the first security context 5 comprises a main processor to perform non-cryptographic operations and the first processor 17 is a co-processor, i.e. a separate component from the main processor configured to perform only the cryptographic operations. Alternatively, the first processor 17 may be the main processor.

The generation of cryptographic keys and asymmetric cryptographic key pairs may comprise generation of random numbers. The first security context 5 may further comprise a random entropy source, for use in random number generation.

The second security context 7 further comprises a transceiver 15. The second transceiver 15 is configured to transmit and receive data packets. The data packets may be transmitted from and received at the second transceiver 15, for example via a wireless Internet connection or a directly wired connection between the first security context 5 and the second security context 7.

The second security context 7 further comprises a second processor 19. The second processor 19 is configured to perform cryptographic operations, such as generation of cryptographic keys and asymmetric cryptographic key pairs, generation of certificates corresponding to a cryptographic key or asymmetric cryptographic key pair, generation of access control lists corresponding to a cryptographic key, generation of use certificates corresponding to a cryptographic key, encryption of an object with a cryptographic key which is stored in the second device memory 11, decryption of an encrypted object with a cryptographic key which is stored in the second device memory 11, cryptographically signing an object with a cryptographic key which is stored in the second device memory 11, verification of a cryptographic signature and validation of an object based on information stored in the second device memory 11. The second processor 19 may be physically secure.

In an embodiment, the first security context 5 comprises a main processor to perform non-cryptographic operations and the first processor 17 is a co-processor, i.e. a separate component from the main processor configured to perform only the cryptographic operations. Alternatively, the first processor 17 may be the main processor.

The generation of cryptographic keys and asymmetric cryptographic key pairs may comprise generation of random numbers. The second security context 7 may further comprise a random entropy source, for use in random number generation.

A HSM device such as may be used as part of the first security context 5 or second security context 7 may comprise a device memory, processor, transceiver and random entropy source as described above. The HSM may comprise both physical and non-physical security properties. Non-physical security properties include the use of encryption, i.e. the inclusion in the device of software or a physical component configured to perform encryption of stored data. Physical properties can include tamper switches triggered by physical access, and a tamper proof membrane surrounding the physical boundary of the device.

The cryptographic asymmetric key pairs discussed in this application may be any asymmetric key pair type that supports signing and verification. For example, each of the manufacturer key pair $K_{man}$, the fist identity key identity key $K_{1ID}$, second identity key pair $K_{2ID}$, time source identity key pair $K_{TSID}$ and signing key pair $K_{tenant\text{-}sign}$ may be any one of an RSA, a DSA, or a ECDSA key pair for example, where RSA or DSA are the algorithm for signing and verification.

For example, to generate an RSA key pair, a generation operation may be performed by the first processor 17, second processor 19 or third processor 41 to generate an output key pair which can be used by the RSA algorithm to sign data.

A random entropy source may be used to generate random numbers, which in turn are used by the first processor 17, second processor 19 or third processor 41 to generate cryptographic keys and cryptographic key pairs.

The cryptographic asymmetric key pairs in this application may be any asymmetric cryptographic key pair type that supports encryption and decryption. For example, the first cryptographic key pair $K_{BLOB}$ may be an RSA key pair or a key pair that could be used in an Integrated Encryption Scheme (IES) algorithm.

The transfer of cryptographic certificates and cryptographic keys between the first security context 5 and the second security context 7 described in the following may occur over a secure, authenticated channel between the first security context 5 and the second security context 7, which is provided and controlled by the service provider. The secure channel provided by the service provider may be provided using a load balancer or firewall appliance. Use of such infrastructure mitigates attacks such as denial of service.

Although the channel is secure from third parties, it is open to attack by the service provider, and therefore is not trusted by the tenant for transfer of high value cryptographic keys. Thus security is enforced by the tenant by the encryption of $K_{tenant}$ and subsequent signing of the encrypted data sent over the channel.

Figure 2A:
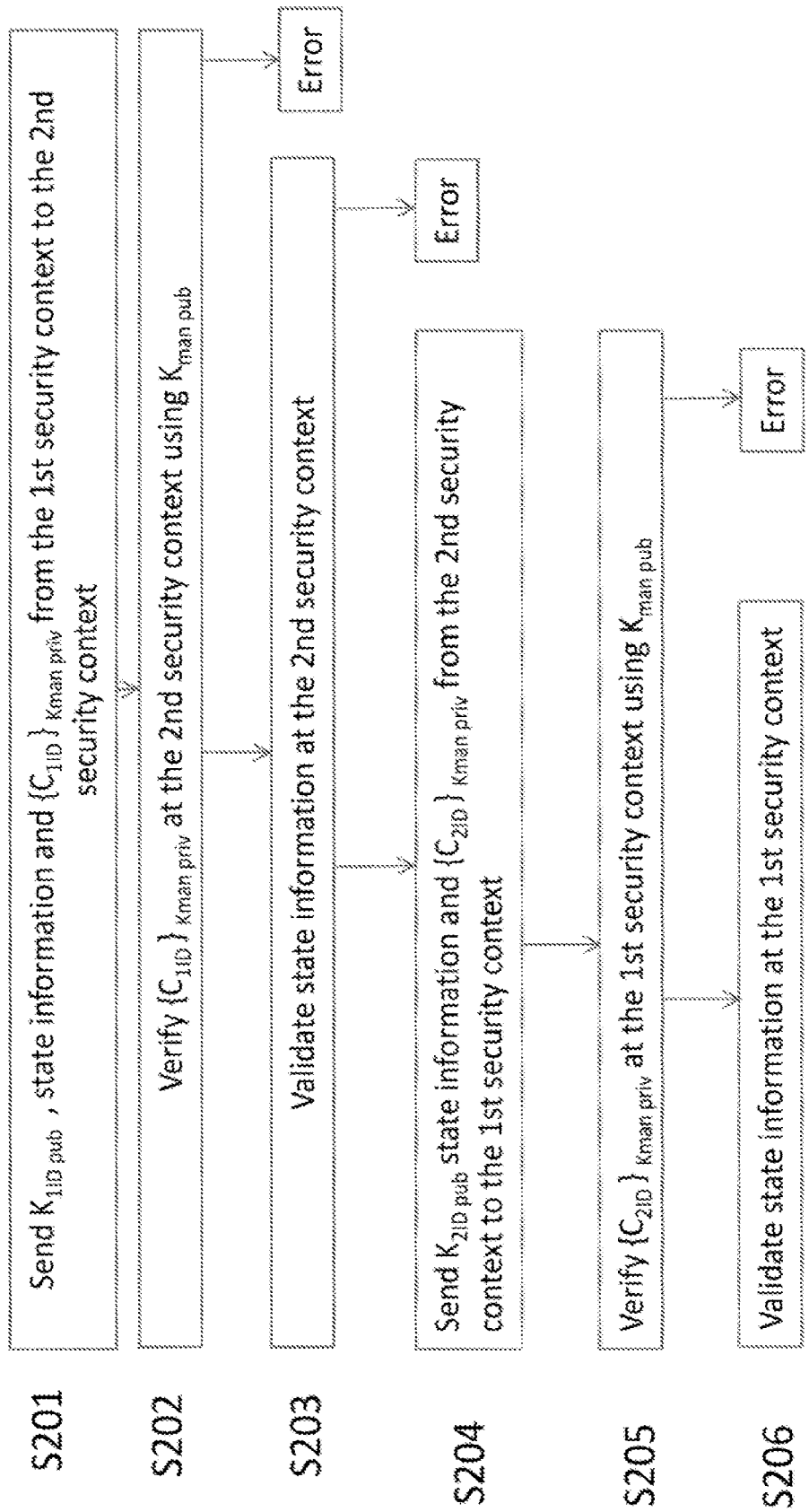
FIG. 2(a) is a flow chart showing a method of establishing trust between the first security context and the second security context, which is part of a method of cryptographic key transfer according to an embodiment of the present invention.

FIG. 2(a) is a flow chart showing a method of establishing trust between the first security context 5 and the second security context 7. The method of establishing trust is part of a method of cryptographic key transfer according to an embodiment of the present invention. The method of establishing trust may be performed before the cryptographic key $K_{tenant}$ is generated for example, or may be performed after the cryptographic key is generated but before any exchange of cryptographic keys between the first security context 5 and the second security context 7 for example.

In step S201, the public half of the identity key of the first security context, $K_{1ID\ pub}$, and the generation certificate $\{C_{1ID}\}_{Kman\ priv}$, are sent from the first security context 5 to the second security context 7. The first transceiver 13 in the first security context 5 is configured to send the public half of the identity key of the first security context, $K_{1ID\ pub}$, and the generation certificate $\{C_{1ID}\}_{Kman\ priv}$, to the second transceiver 15 in the second security context 7. Information relating to the state of the device(s) in the first security context 5 may be sent in the same message. The information relating to the state of the device(s) is also included in the generation certificate in this case, and can be used by the receiver to validate the state information contained in the message.

The generation certificate is immutable, thus only contains information that is available at manufacture time. Information relating to the current configuration of the device, for example, the IP address or tamper state, may be included in the configuration certificate. The configuration information may be sent at the same time as the generation certificate, or after the generation certificate. However, the generation certificate is generated and signed at the time of manufacture, whereas the configuration certificate is generated at the time of key transfer, and is signed by $K_{1ID\text{-}priv}$. The configuration certificate can be verified only after the generation certificate has been verified.

In step S202, the signature of the generation certificate $\{C_{1ID}\}_{Kman\ priv}$ is verified at the second security context 7. The second processor 19 in the second security context 7 is configured to verify the signature of the generation certificate $\{C_{1ID}\}_{Kman\ priv}$. The generation certificate is verified using the public half of the trusted manufacturer key $K_{man\ pub}$ which is stored in the device memory 11. The second processor 19 is configured to perform a signature verification algorithm that, given the signed message $\{C_{1ID}\}_{Kman\ priv}$ and the public key $K_{man\ pub}$ either accepts or rejects the message's claim to authenticity.

The authenticity of the public half of the identity key of the first security context, $K_{1ID\ pub}$ is validated at the second security context 7. The second processor 19 in the second security context 7 is configured to validate the public half of the identity key of the first security context, $K_{1ID\ pub}$. In an embodiment in which the generation certificate $C_{1ID}$ comprises a hash of the public half of the identity key of the first security context, $K_{1ID\ pub}$, the authenticity is validated by calculating the hash the public half of the identity key of the first security context, $K_{1ID\ pub}$, and validating that it matches that contained in its generation certificate $C_{1ID}$.

In an embodiment, the generation certificate $C_{1D}$ comprises the hash of the public half of $K_{1ID}$ and is signed by the private half of the manufacturer asymmetric key, $K_{man\ priv}$. Step S202 comprises: calculating the hash of the received data sent in the message, in this case the hash of $K_{1ID\ pub}$; inputting the received signature into the verification algorithm, which may be a cryptographic operation, together with the public half of the manufacturer key and verifying the output; comparing the calculated hash to that contained in the output of the verification algorithm to determine whether they are the same.

In step S203, if state information is included in the message, the second security context 7 validates that the state of the device(s) meets requirements. Alternatively, state information is not included in the generation certificate, and the second security context 7 does not validate the state of the first security context 5. The second security context 7 does not transfer any secure information to the first security context 5, thus it is not necessary for the state information of the first security context 5 to be validated.

If the signature is verified and state information is validated, the public half of the identity key of the first security context, $K_{1ID\ pub}$, is stored in the second device memory 11 of the second security context 7. Alternatively, the public half of the identity key of the first security context, $K_{1ID\ pub}$ can be integrity protected by the second security context 7 and stored in untrusted storage outside of the second security context 7. The second security context 7 may sign the public half of the identity key of the first security context, $K_{1ID\ pub}$, and data indicating that this is a public key from a trusted source, using $K_{2ID\ priv}$ for storage. Alternatively, it may encrypt them using another secret key. In these cases, an untrusted device memory can be used, which often has a larger capacity than the device memory within the second security context 7, whilst trust in the key is maintained.

If the signature is not verified or the state information is not validated, an error is returned to the first security context, for example a message is sent stating "AccessDenied". At this point, the communication between the first security context 5 and the second security context 7 is terminated.

In step S204, the public half of the identity key of the second security context, $K_{2ID\ pub}$, and the generation certificate $\{C_{2ID}\}_{Kman\ priv}$, are sent from the second security context 7 to the first security context 5. The second transceiver 15 in the second security context 7 is configured to send the public half of the identity key of the second security context, $K_{2ID\ pub}$, and the generation certificate $\{C_{2ID}\}_{Kman\ priv}$, to the first transceiver 13 in the first security context 5. Information relating to the state of the device(s) in the second security context 7 may be sent in the same message. The information relating to the state of the device(s) will also be included in the generation certificate in this case, in order to validate the state information. Again, the generation certificate is immutable, thus only contains information that is available at manufacture time. Information relating to the current configuration of the device, for example, the IP address or tamper state, may be included in the configuration certificate. The configuration information may be sent at the same time as the generation certificate, or after the generation certificate, for example in step S604 as part of the first cryptographic certificate $C_{BLOB}$. However, the generation certificate is generated and signed at the time of manufacture, whereas the configuration certificate is generated at the time of key transfer, and is signed by $K_{2ID\text{-}priv}$. The configuration certificate can be verified only after the generation certificate has been verified.

In step S205, the signature of the generation certificate $\{C_{2ID}\}_{Kman\,priv}$ is verified at the first security context 5. The first processor 17 in the first security context 5 is configured to verify the generation certificate $\{C_{2ID}\}_{Kman\,priv}$. The signature is verified using the public half of the trusted manufacturer key $K_{man\,pub}$ stored in the device memory 9. The first processor 17 is configured to perform a signature verification algorithm that, given the signed message $\{C_{2ID}\}_{Kman\,priv}$ and the public key $K_{man\,pub}$ either accepts or rejects the message's claim to authenticity. This allows the first security context 5 to validate the manufacturer device in the second security context 7, by verifying the signature.

The authenticity of the public half of the identity key of the second security context, $K_{2ID\,pub}$ is validated at the first security context 5. The first processor 17 in the first security context 5 is configured to validate the public half of the identity key of the second security context, $K_{2ID\,pub}$. In an embodiment in which the generation certificate $C_{2ID}$ comprises a hash of the public half of the identity key of the second security context, $K_{2ID\,pub}$, the authenticity is validated by calculating the hash the public half of the identity key of the second security context, $K_{2ID\,pub}$, and validating that it matches that contained in its generation certificate $C_{2ID}$.

In step S206, if state information is included in the message, the first security context 5 validates that the state of the device(s) meets requirements.

If the signature is verified and state information is validated, the public half of the identity key of the second security context, $K_{2ID\,pub}$, is stored in the first device memory 9 of the first security context 5. Alternatively, the public half of the identity key of the second security context, $K_{2ID\,pub}$ can be integrity protected by the first security context 5 and stored in untrusted storage outside of the first security context 5. The first security context 5 may sign the public half of the identity key of the second security context, $K_{2ID\,pub}$, and data indicating that this is a public key from a trusted source, using $K_{1ID\,priv}$ for storage. Alternatively, it may encrypt them using another secret key. In these cases, an untrusted device memory can be used, which often has a larger capacity than the device memory within the first security context 5, whilst trust in the key is maintained.

If the signature is not verified or the state information is not validated, an error is returned to the second security context 7, for example a message is sent stating "Access-Denied". At this point, the communication between the first security context 5 and the second security context 7 is terminated.

Figure 2B:
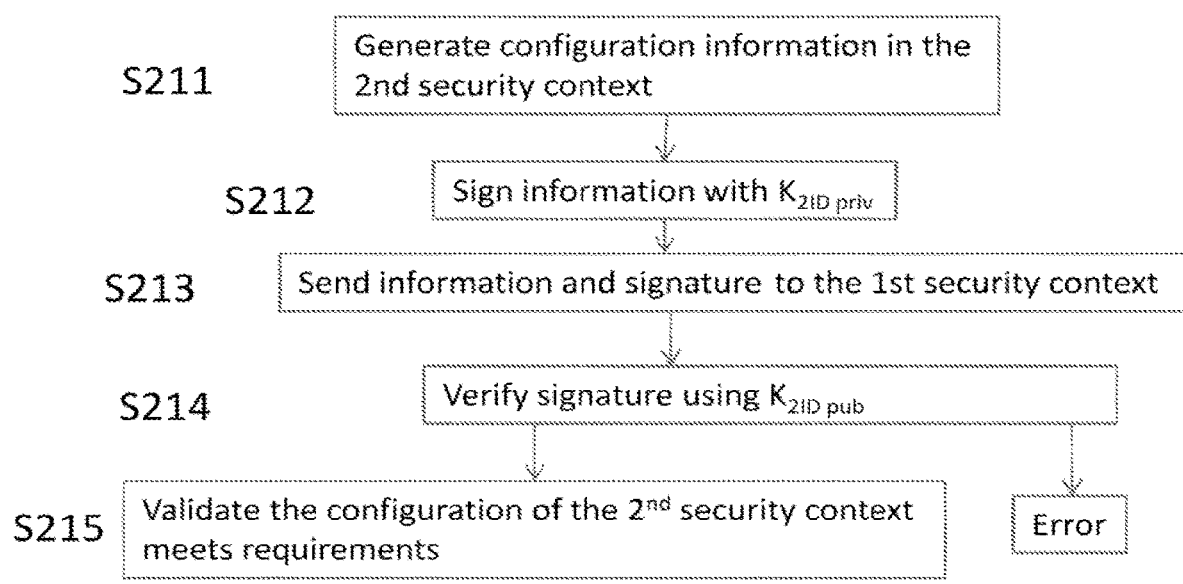
FIG. 2(b) is a flow chart showing a method of validating the configuration of the second security context at the first security context, which is part of a method of cryptographic key transfer according to an embodiment of the present invention.

FIG. 2(b) is a flow chart showing a method of validating the configuration of the second security context 7 at the first security context 5, which is part of a method of cryptographic key transfer according to an embodiment of the present invention. In this method, the configuration of the second security context 7 can be validated. In an embodiment, a similar method can also be used to validate the configuration of the first security context 5 at the second security context 7. Alternatively, the second security context 7 does not validate the configuration of the first security context 5. The second security context 7 does not transfer any secure information to the first security context 5, thus it is not necessary for the configuration of the first security context 5 to be validated.

Configuration information is generated by the second security context 7 in step S211. The configuration information may include information relating to the specific configuration applied by the administrator. This may include information relating to the cryptographic operations that are supported, the encryption keys that are used, and/or the version of software of the unit, for example. The configuration information may comprise information indicating that the first security context 5 has been configured to use the AES algorithm to encrypt tenant keys when not inside the second security context 7 for example. The configuration information may further comprise information relating to the administrator deployment options such as security settings, which trusted time source is used or whether the second security context 7 believes that there has been an attempt to tamper with the device.

In step S212, the configuration information is signed by the private half of the identity key of the second security context, $K_{2ID\,priv}$, producing a configuration certificate $C_{2V}$. The private half of the identity key of the second security context, $K_{2ID\,priv}$ is stored in the second security context 7 and cannot be accessed by an administrator. Signing the configuration certificate $C_{2V}$ with the private half of the identity key of the second security context, $K_{2ID\,priv}$ means that the configuration information cannot be subverted.

In step S213, the configuration information and configuration certificate $C_{2V}$ is sent from the second security context 7 to the first security context 5. This can be sent at the same time as $K_{2ID\,pub}$ and $\{C_{2ID}\}_{Kman\,priv}$, in step S204 for example. Alternatively, the configuration information may be included in the first cryptographic certificate described in relation to FIG. 6(a), and the configuration information sent at the same time as the first cryptographic certificate $C_{BLOB}$. The second transceiver 15 in the second security context 7 is configured to send the configuration information and configuration certificate $C_{2V}$ to the first transceiver 13 in the first security context 5.

In step S214, the signed configuration certificate $C_{2V}$ is verified at the first security context 5. The first processor 17 in the first security context 5 is configured to verify the signed configuration certificate $C_{2V}$. The signed configuration certificate $C_{2V}$ is verified using the public half of the second identity key $K_{2ID\,pub}$ stored in the device memory 9, after being received and processed in steps S204 to S206. The first processor 17 is configured to perform a signature verification algorithm that, given the signed configuration certificate $C_{2V}$ and the public key $K_{2ID\,pub}$ either accepts or rejects the message's claim to authenticity. This allows the first security context 5 to prove that the configuration information has been generated by a known appliance.

In step S215, the first security context validates that the configuration information meets its requirements.

In an embodiment, the configuration information is requested and checked immediately before transfer of $K_{tenant}$ to the second security context 7. This ensures that up to date configuration information is validated.

In an embodiment, configuration information and a configuration certificate are also generated and sent by the first security context 5 in a similar manner. The configuration information may comprise information relating to the specific configuration applied by the administrator. The configuration information is signed by the private half of the identity key of the first security context 5 and sent to the second security context 7, which validates that the configuration of the first security context 5 meets its requirements.

In the above described method, the tenant registers itself with the service provider. Registration proceeds in the form of mutual authentication of the two parties over an insecure medium. Mutual authentication of the first security context 5 and the second security context 7 is performed using the unique asymmetric identity keys. The public halves of the identity keys are exchanged, together with their matching generation certificates. Each security context validates the generation certificate of the other by checking that the certificate contains the hash of the public half of the identity key and that the certificate has genuinely been created by a trusted manufacturer. The generation certificate of the identity key may be referred to as a warrant. Using the established shared root of trust the first security context 5 and second security context 7 establish a secure, authenticated network communication with a verifiably trustworthy partner. The first security context 5 and the second security context 7 each cryptographically validates that the other was built by a trusted manufacturer.

The step S205 of verifying the signed generation certificate $\{C_{2ID}\}_{Kman\ priv}$ at the first security context using $K_{man\ pub}$ verifies that the second security context 7 is of a known trustworthy origin.

Figure 3:
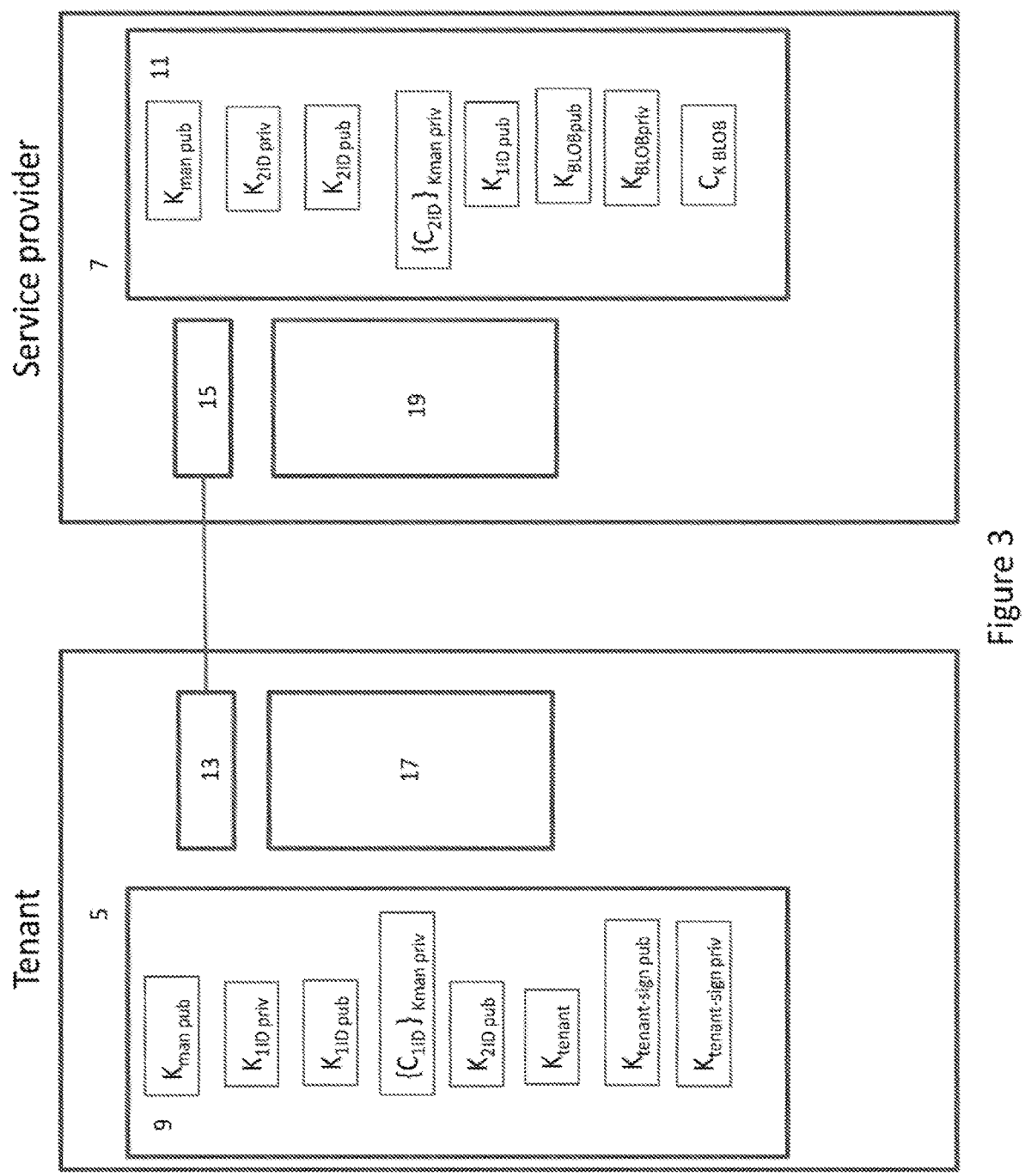
FIG. 3 is a schematic illustration of a first security context in accordance with an embodiment of the present invention and a second security context in accordance with an embodiment of the present invention, after trust has been established, and after the relevant keys have been generated in each security context.

FIG. 3 is a schematic illustration of the tenant system 1 and service provider system 3 after trust has been established, and after the relevant keys have been generated in each security context.

The first device memory 9 in the first security context 5 also stores the public half of the identity key of the second security context $K_{2ID\ pub}$. Alternatively, this key may be stored outside of the first security context 5 in an integrity protected manner. The first device memory 9 also stores the tenant key $K_{tenant}$, generated in step S601 described below, and the second key pair $K_{tenant-sign}$, generated in step S401 described below.

The second device memory 11 in the second security context 7 also stores the public half of the identity key of the first security context $K_{1ID\ pub}$. Alternatively, this key may be stored outside of the first security context 5 in an integrity protected manner. The second device memory 1 also stores the first cryptographic key pair and a first cryptographic certificate generated in step S602 described below.

Figure 4A:
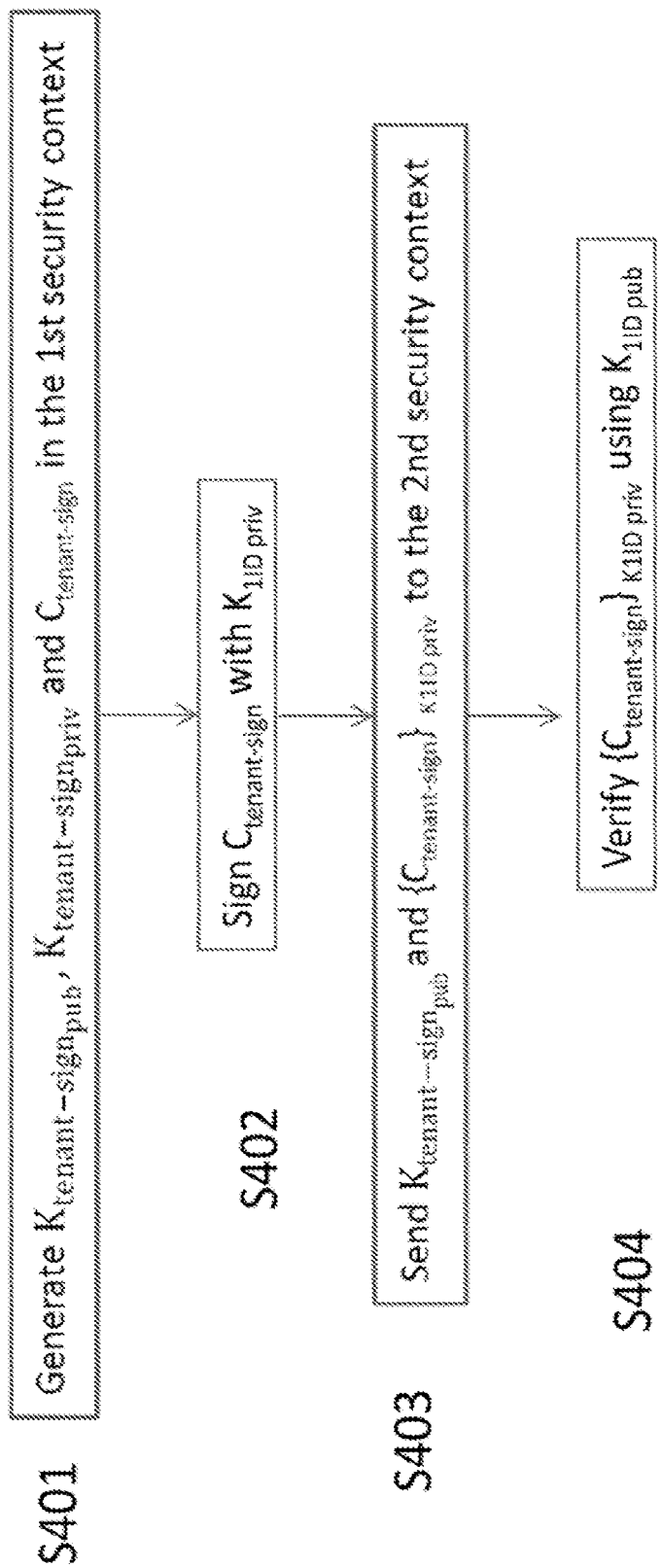
FIG. 4(a) is a flow chart showing a method of transferring a signing key, $K_{tenant\text{-}sign}$ from the first security context to the second security context, which is part of a method of cryptographic key transfer according to an embodiment of the present invention.

FIG. 4(a) is a flow chart showing a method of transferring a signing key, $K_{tenant-sign}$ from the first security context 5 to the second security context 7, which is part of a method of cryptographic key transfer according to an embodiment of the present invention. In an embodiment, the method of transferring the signing key $K_{tenant-sign}$ is performed before the cryptographic key $K_{tenant}$ is sent to the second security context 7. The method of transferring the signing key $K_{tenant-sign}$ may be performed after the cryptographic key $K_{tenant}$ is generated.

In step S401, the asymmetric cryptographic key pair $K_{tenant-sign_{pub}}$ and $K_{tenant-sign_{priv}}$ and corresponding certificate $C_{tenant-sign}$ are generated in the first security context 5. The asymmetric cryptographic key pair $K_{tenant-sign_{pub}}$ and $K_{tenant-sign_{priv}}$ are referred to as the second public key and the second private key and the corresponding certificate $C_{tenant-sign}$ is referred to as the second cryptographic certificate. The first processor 17 in the first security context 5 is configured to generate the asymmetric cryptographic key pair $K_{tenant-sign_{pub}}$ and $K_{tenant-sign_{priv}}$ and corresponding certificate $C_{tenant-sign}$. The second cryptographic certificate, $C_{tenant-sign}$ may comprise the signed hash of the second public key $K_{tenant-sign_{pub}}$.

In step S402, the second cryptographic certificate, $C_{tenant-sign}$ is cryptographically signed with the private half of the identity key of the first security context, $K_{1ID\ priv}$. The first processor 17 is configured to cryptographically sign the second cryptographic certificate, $C_{tenant-sign}$ with the private half of the identity key of the first security context, $K_{1ID\ priv}$.

The second cryptographic certificate $C_{tenant-sign}$ thus comprises information from which the origin of the second public key $K_{tenant-sign_{pub}}$ can be validated. The information from which the origin of the second public key $K_{tenant-sign_{pub}}$ can be validated comprises the signed hash of the second public key $K_{tenant-sign_{pub}}$. The second cryptographic certificate $C_{tenant-sign}$ comprises a hash of the second public key $K_{tenant-sign_{pub}}$ and is signed with the private half of the identity key of the first security context, $K_{1ID\ priv}$, which allows the origin of the second public key $K_{tenant-sign_{pub}}$ to be validated.

In step S403, the second public key $K_{tenant-sign_{pub}}$ and the second cryptographic certificate $\{C_{tenant-sign}\}_{K1ID\ priv}$ are sent to the second security context 7. The first transceiver 13 is configured to send the second public key $K_{tenant-sign_{pub}}$ and the second cryptographic certificate $\{C_{tenant-sign}\}_{K1ID\ priv}$ to the second security context 7.

In step S404, the second cryptographic certificate $\{C_{tenant-sign}\}_{K1ID\ priv}$ is verified at the second security context 7. The second processor 19 in the second security context 7 is configured to verify the second certificate $\{C_{tenant-sign}\}_{K1ID\ priv}$. The second certificate is verified using the public half of the identity key of the first security context, $K_{1ID\ pub}$. The second processor 19 is configured to perform a signature verification algorithm that, given the signed message $\{C_{tenant-sign}\}_{K1ID\ priv}$ and the public key $K_{1ID\ pub}$ either accepts or rejects the message's claim to authenticity.

The authenticity of the second public key $K_{tenant-sign_{pub}}$ is then validated at the second security context 7. The second processor 19 in the second security context 7 is configured to validate the second public key $K_{tenant-sign_{pub}}$. In an embodiment in which the second cryptographic certificate $C_{tenant-sign}$ comprises a hash of the second public key $K_{tenant-sign_{pub}}$, the authenticity of the second public key $K_{tenant-sign_{pub}}$ is validated by calculating the hash the second public key $K_{tenant-sign_{pub}}$, and validating that it matches that contained in the second cryptographic certificate $C_{tenant-sign}$.

If the signature is verified and the second public key validated, the second public key $K_{tenant-sign_{pub}}$ is stored in the second device memory 11 of the second security context 7. Alternatively, it can be integrity protected by the second security context 7 and stored in untrusted storage outside of the second security context 7.

If the signature is not verified or the second public key not validated, an error is returned to the first security context 5, for example a message is sent stating "AccessDenied". At this point, the communication between the first security context 5 and the second security context 7 is terminated.

In the above described method, upon successful establishment of trust, the first security context 5 generates an asymmetric key, $K_{tenant-sign}$, and forwards the public half including a certificate signed by the private half of $K_{1ID}$ to the second security context 7. The second security context 7 validates the certificate and stores the public half of $K_{tenant.sign}$ in the second device memory 11 or elsewhere in a secure, tamper-proof format for later use. Thus the first security context 5 in the tenant system generates an asymmetric key, $K_{tenant-sign}$, and forwards the public half to the second security context for storage and later use.

Figure 4B:
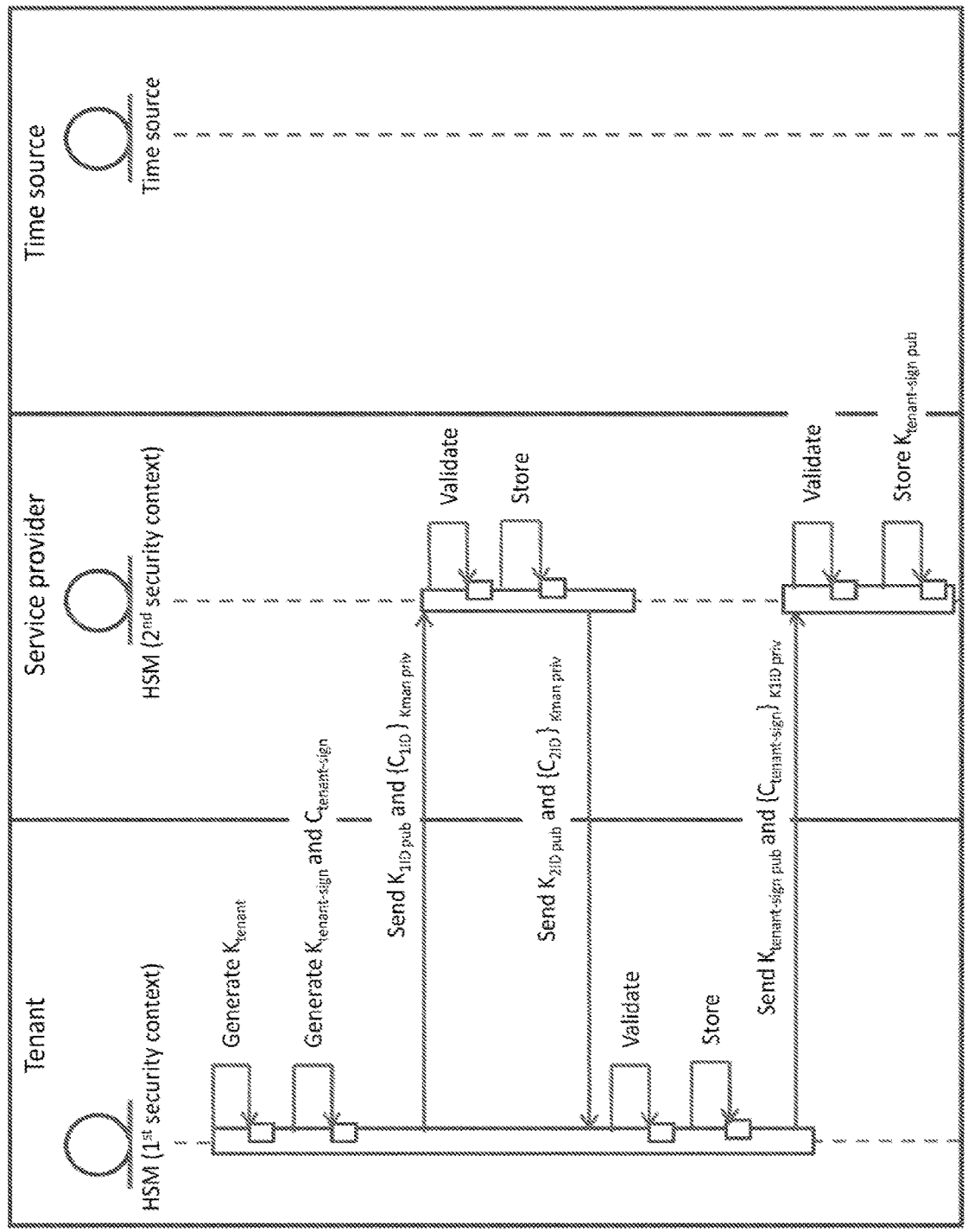
FIG. 4(b) is an illustration of a method of tenant registration, which is part of a method of cryptographic key transfer according to an embodiment of the present invention.

FIG. 4(b) is a schematic illustration of a method of tenant registration, which is part of a method of cryptographic key transfer according to an embodiment of the present invention. The method comprises generating the tenant cryptographic key $K_{tenant}$ as described in relation to step S601 below, establishing trust as described in relation to FIG. 2(a) above, and generating and exchanging the second public key as described in relation to FIG. 4(a) above.

Each vertical box in the diagram represents the enclosed entity, i.e. the first security context 5, second security context 7 and time source 3 over time, with time increasing in the downward direction. The blocks which arrows and loops originate from and terminate at indicate the duration of a particular process. For example, the second security context 7 receives the public half of the identity key of the first security context $K_{1ID\ pub}$ and corresponding generation certificate. This starts a process in the second security context 7. The next step of the process is to validate the certificate and then forward a response to the first security context 5, i.e. an error message if the certificate is not validated, or a message containing its own public identity key and certificate if the certificate is validated. This is the end of the particular process.

Loops indicate actions that happen internally to a process, for example, validation, which does not require interaction with any other entity. Lines that cross between entities indicate communication between the entities.

The cryptographic key $K_{tenant}$ is generated in the first security context 5. The second cryptographic key $K_{tenant-sign}$ is then generated in the first security context 5. The public half of the identity key $K_{1ID\ pub}$ and signed certificate $\{C_{1ID}\}_{Kman\ priv}$ are then sent from the first security context 5 to the second security context 7 and are validated at the second security context 7. The public half of the identity key $K_{2ID\ pub}$ and signed certificate $\{C_{2ID}\}_{Kman\ priv}$ are then sent from the second security context 7 to the first security context 5 and are validated at the first security context 5. The second cryptographic key $K_{tenant-sign\ pub}$ and signed certificate $\{C_{tenant-sign}\}_{K1ID\ priv}$ are sent to the second security context 7 where they are validated and stored.

FIG. 5 is a schematic illustration of the tenant system 1 and service provider system 3 after the second public key, $K_{tenant-sign\ pub}$, has been exchanged during the data transfer process discussed in relation to FIG. 6(a) below.

In an embodiment, $K_{blob}$ and $C_{blob}$ are transient, and once $K_{tenant}$ has been transferred, are deleted from the second security context 7.

The second device memory 11 in the second security context 7 also stores the public half of the second key $K_{tenant-sign_{pub}}$. Alternatively, this key may be stored outside of the first security context 5 in an integrity protected manner.

Figure 6A:
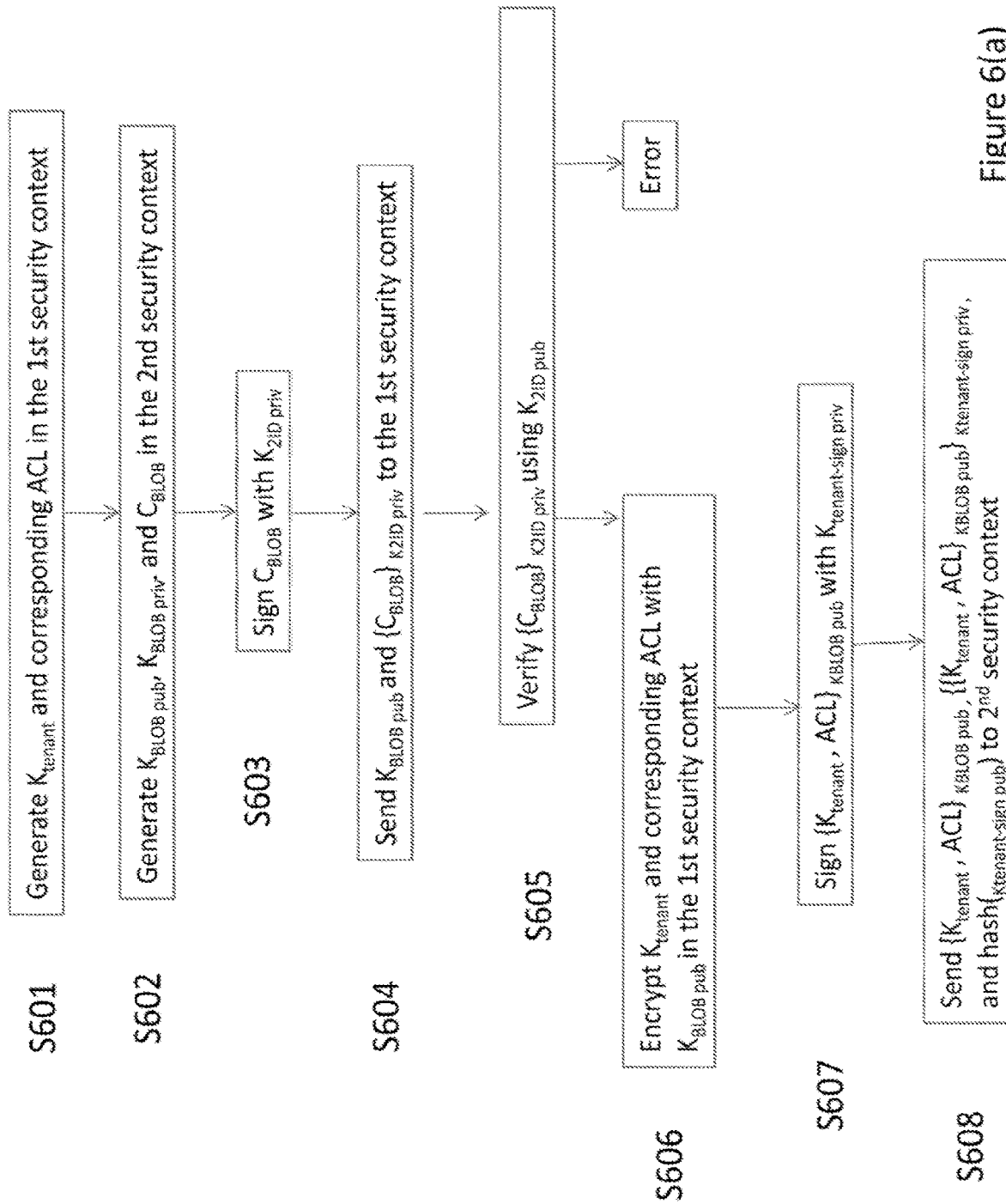
FIG. 6(a) is a flow chart showing a method of transferring data from the first security context to the second security context in accordance with an embodiment of the present invention.

FIG. 6(a) is a flow chart showing a method of transferring data from the first security context 5 to the second security context 7 in accordance with an embodiment of the present invention. In the embodiment shown in FIG. 6(a), the data is a cryptographic key, $K_{tenant}$.

Once the tenant system has registered itself with the service provider system, the first security context 5 connects to the second security context 7 via the secured, authenticated connection and initiates the key transfer, or import, process.

In step S601, the cryptographic key, $K_{tenant}$, and a corresponding access control list, ACL, are generated in the first security context 5. The first processor 17 in the first security context 5 is configured to generate the cryptographic key, $K_{tenant}$, and corresponding access control list.

The first security context 5 thus generates a key, $K_{tenant}$, which they will be lending to the service provider. $K_{tenant}$ is generated inside a secure appliance in the first security context 5 with an access control list (ACL).

The ACL specifies that a valid use credential, for example a use certificate, must be presented in order to grant a first type of use of the key. The first type of use may be a cryptographic operation for example. The ACL describes how the key may be used, any restrictions on its use and what credentials must be supplied for each operation to be enabled.

In an alternative embodiment, the cryptographic key, $K_{tenant}$, is not generated in the first security context 5, but is generated outside the first security context 5 and then provided to the first security context 5.

In an alternative embodiment, instead of the cryptographic key, $K_{tenant}$, some other kind of data is generated at or provided to the first security context 5. An access control list corresponding to the data is then generated, which specifies that a valid use credential must be presented in order to grant a first type of use of the data. The first type of use may be reading the contents of the data file for example.

In the below description, the methods and apparatus are described with reference to the transfer and lease of a tenant key, however it is understood that some other kind of data could be substituted for the tenant key, and transferred and leased in the same manner.

The ACL may comprise one or more permissions, or policies. Each permission may govern a particular use of the key. For example, a first permission governs how the key may be stored, a second permission governs how the key may be used for encryption, a third permission governs how the key may be used for decryption and so on.

The ACL also comprises credential(s) associated with a particular permission. The credentials specify what must be provided to authorize a particular permission. Some permissions may not have an associated credential, for example the storage permission.

The tenant has validated that the second security context 7 adheres to the requirements in the ACL before the key is transferred, as described in relation to FIGS. 2(a) and (b).

The tenant validates that the second security context 7 is manufactured by a trusted manufacturer. The tenant may also validate that the current configuration of the second security context 7 meets the security requirements of the tenant. By validating that the second security context 7 is trusted and meets the tenants requirements, the tenant can be sure that the second security context 7 will enforce the policies/permissions contained in the ACL.

The access control list specifies that a valid use credential, for example a use certificate, must be presented in order to allow certain use(s) of the cryptographic key, $K_{tenant}$. Thus the $K_{tenant}$ ACL may require a valid certificate to be presented each time the key is used for encryption, for example. The permissions related to these uses thus have associated credentials, for example the use certificate.

A tenant may specify that a valid use certificate is required in the permission that governs using a key for encryption for example. Thus in order to use the cryptographic key, $K_{tenant}$ for encryption, a valid use certificate would need to be presented to activate the permission.

The permission may specify that the use certificate must comprise information from which the cryptographic key $K_{tenant}$ corresponding to the use certificate can be identified in order to grant the use corresponding to the permission. The ACL may comprise the hash of $K_{tenant}$.

The ACL may comprise a reference to the second security context 7. The reference to the second security context 7 may comprise the hash of the public half of the identity key $K_{2ID\ pub}$.

In an embodiment, the permission requires presentation of a certificate signed by the private half of an asymmetric key, $K_{tenant-sign}$, owned by the tenant in order to grant the use associated with the permission. The permission specifies that a use certificate must be signed by the second private key $K_{tenant-sign_{priv}}$ in order to grant the use of the cryptographic key, $K_{tenant}$.

In an embodiment, the permission specifies that the use certificate must comprise information from which the expiry of the use certificate can be determined and must be unexpired in order to grant the use of the cryptographic key, $K_{tenant}$ associated with the permission. The tenant is thus able to specify, in the use certificate, an expiry time for its key, after which the key may not be used until further authorization is provided. This allows transfer of cryptographic material between tenant and service provider with assurances over when a key may be used. It ensures that the use of the key is only possible for a set amount of time as specified by the tenant.

In an embodiment, the ACL comprises a permission which specifies that the use certificate must comprise information from which the "start time" of a validity period of the use certificate can be determined, and the start time must have passed in order to grant use of the cryptographic key, $K_{tenant}$ associated with the permission. The tenant is thus able to specify a validity period for the key, outside of which the key may not be used until further authorization is provided. It ensures that the use of the key is only possible for a set time interval, as specified by the tenant For the permission that governs storage of the cryptographic key, $K_{tenant}$, the certificate credential may not be present. This means the permission governing storage is always active, or only active until the key is stored in a non-volatile medium, for example. This allows the second security context 7 to store the key without a certificate. For the case in which the permission governing storage is only active until the key is stored in a non-volatile medium, the permission is a temporary permission and deactivates after storage, i.e. it's stripped from the ACL.

The permission may specify that the cryptographic key, $K_{tenant}$ can be stored outside the second security context 7 only when encrypted for storage by a key which cannot leave the second security context 7. The permission may specify that $K_{tenant}$ can only be encrypted with a key that cannot leave the second security context 7 and is not controllable by the administrator, i.e. the service provider. The permission may also include the key type(s) and mechanism(s) that can be used to encrypt the tenant key $K_{tenant}$, for example, the tenant key $K_{tenant}$ can only be encrypted using AES-GCM encryption with an AES key of 256 bits. The permission may specify that the cryptographic key, $K_{tenant}$ can also be stored inside the second security context 7.

In an embodiment, the permission specifies that the cryptographic key $K_{tenant}$ and ACL are to be encrypted with an authenticated encryption algorithm.

In an embodiment, the permission specifies that information from which the origin of the cryptographic key $K_{tenant}$ can be identified is stored in the same data structure as the encrypted cryptographic key $K_{tenant}$ and access control list, and is authenticity protected.

Alternatively, the permission may specify that the cryptographic key, $K_{tenant}$ can only be stored inside the second security context 7.

The $K_{tenant}$ ACL contains a permission which specifies that the tenant key can only be stored inside the second security context 7 and/or outside the second security context 7 if encrypted for storage outside the second security context 7 by a key which is not obtainable by the service provider. As long as the second security context 7 enforces the policy specified in the ACL, the tenant key $K_{tenant}$ is not exposed to the hosting service provider system 3.

The tenant has ensured that the second security context 7 will enforce the policy because it has received information validating that the manufacturer of the second security context 7 is a trusted manufacturer. Information identifying the manufacturer of the second security context is sent in the generation certificate. For example, the generation certificate is signed with the manufacturer private key. Furthermore, the tenant has received information validating the product, software and hardware of the second security context 7. This information is sent in the generation certificate. As the manufacturer has been identified as a trusted manufacturer, the tenant trusts that the second security context 7 conforms to the information provided by the manufacturer. For example, if the generation certificate contains information specifying that the software and hardware is impervious to attack by the service provider, the tenant trusts this is the case, as the information is provided by the trusted manufacturer. The tenant can validate from the generation certificate that the service provider is using a second security context 7 having certain guarantees from the manufacturer. The manufacturer can provide information in the generation certificate which guarantees that an ACL will be enforced by the second security context 7. As the tenant trusts the manufacturer, this guarantee is also trusted. Thus the guarantee information that allows the tenant to ensure that the ACL will be enforced originates from the manufacturer. Furthermore, the configuration information sent in the configuration certificate informs the tenant whether someone has tried to tamper with the second security context 7 either physically or by attempting to hack it. Once the tenant confirms that the second security context 7 has not been tampered with, then the guarantees from the manufacturer are still applicable.

The ACL allows transfer of cryptographic material between tenant and service provider, with no exposure of the raw cryptographic material to the service provider or to a security agency with jurisdiction over the service provider. For example, a tenant based in the UK would not want their cryptographic keys accessible by an American service provider for fear of the keys being turned over to an American security agency which does not have jurisdiction over a UK-based company.

Furthermore, it allows the service provider to support keys from multiple tenants inside a single infrastructure, removing the need to maintain a dedicated appliance per tenant. The tenant would not want their keys accessible to a third party, as a third-party which has been able to extract a tenant's key could then use the key. Providing the access control list comprising a permission which specifies that the cryptographic key, $K_{tenant}$ can only be stored inside the second security context 7 and/or outside the second security context 7 if encrypted for storage by a key which cannot leave the second security context 7 allows multiple tenants to use the same cryptographic infrastructure whilst ensuring that the raw key material is never exposed to the other tenants. Service providers and tenants are able to share cryptographic infrastructure in a secure way to improve efficiency.

A permission or permissions contained in the ACL thus restrict how $K_{tenant}$ can be stored and are set so that $K_{tenant}$ is inaccessible by anyone including the service provider. As a permission corresponding to a first type of use of the key can only be activated by a certificate credential signed by a private key known only to the tenant, the second security context 7 will disallow the first type of use of the key until such a time as an authorizing certificate is presented with the key. This means that the first type of use of the raw key material is not accessible by any third-party including the service provider. The tenant is thus able to maintain assurance that their cryptographic keys are not exposed to either the service provider or any other party. The tenant is able to control the use of its key once imported into the second security context via the access control list.

The access control list may specify that particular information must be provided in the use certificate in order to allow particular uses of the tenant key $K_{tenant}$. In this way, the tenant can restrict how the key is used by the service provider. For example, the ACL may contain a permission that specifies that the tenant key can be used to encrypt data when a certificate signed with a certain private key is presented. Thus the credential associated with the permission is the certificate signed with the certain private key. It may also include a permission that specifies decrypt is available when presented by a certificate signed by a different private key. Each permission may require a different credential, for example a certificate signed by a different private key.

Further information that a permission may specify is contained in the certificate may include the time the certificate was issued, where the time stamp comprises a reference to a shared trusted clock and/or the identity (for example the hash of $K_{IDpub}$) of the appliance the certificate can be used with. Including the identity restricts which appliances within a context a key can be used.

The established trust with the second security context and the provision of the ACL corresponding to the tenant key $K_{tenant}$ allows the tenant to cryptographically validate that a service provider adheres to a set of rules, i.e. those provided in the ACL, which guarantee the non-disclosure of raw cryptographic material and usage once a key has been transferred. It allows the tenant to securely and verifiably lease cryptographic keys to the service provider for use in a restricted manner, whilst supporting multi-tenancy.

The ACL comprises policies which ensure that the service provider has no access to the raw key material of a tenant, the tenant has assurance that their key is only usable in situations under its control, and multiple tenants can share the same cryptographic infrastructure in a secure manner. It allows lease of the key $K_{tenant}$ whilst restricting the time period in which it may be used. It allows tenants to accurately control the use of their keys once they're hosted by a service provider.

After $K_{tenant}$ is generated, the tenant then initiates a key-lending protocol with the service provider. For example, the first security context 5 may send a message to the second security context 7 which initiates step S602. The message may request $K_{BLOB\ pub}$.

In step S602, a first cryptographic key pair which is suitable for use in an encryption scheme and a first cryptographic certificate $C_{BLOB}$ are generated in the second security context 7, the first cryptographic key pair comprising a first public key, $K_{BLOB\ pub}$, and a first private key, $K_{BLOB\ priv}$. In an embodiment, the first cryptographic certificate comprises a hash of the first public key, $K_{BLOB\ pub}$.

In an embodiment, a new first cryptographic key pair $K_{BLOB}$ and first cryptographic certificate $CO_{BLOB}$ are generated for each data transfer, in other words, each first cryptographic key pair $K_{BLOB}$ and first cryptographic certificate $C_{BLOB}$ is only valid for a single use.

In an embodiment, the first cryptographic certificate $C_{BLOB}$ and the configuration certificate are a single certificate. In other words, instead of the method of FIG. 2(b), the first cryptographic certificate is generated further comprising information relating to the current configuration of the second security context. The information relating to the current configuration of the second security context may be as described in relation to FIG. 2(b).

In step S603, the first cryptographic certificate $C_{BLOB}$ is cryptographically signed with the private half of the identity key of the second security context, $K_{2ID\ priv}$. The second processor 19 is configured to cryptographically sign the first cryptographic certificate $C_{BLOB}$ with the private half of the identity key of the second security context, $K_{2ID\ priv}$.

In an embodiment, the first cryptographic certificate $C_{BLOB}$ validates that $K_{BLOB\ pub}$ was generated in the second security context 7. The first cryptographic certificate comprises information from which the origin of the cryptographic key $K_{BLOB\ pub}$ can be validated. In an embodiment, the information from which the origin of the cryptographic key $K_{BLOB\ pub}$ can be validated is the signed hash of the first public key, $K_{BLOB\ pub}$. In other words, the first cryptographic certificate $C_{BLOB}$ comprises a hash of the first public key $K_{BLOB\ pub}$ and is signed with the private half of the identity key of the second security context, $K_{2ID\ priv}$, which allows the origin of the first public key, $K_{BLOB\ pub}$ to be validated.

The first cryptographic certificate is signed by $K_{2ID\ priv}$ in order to prove that the service provider generated the certificate. Including the hash also validates that the data, i.e. the first public key, $K_{BLOB\ pub}$ has not been tampered with during transit.

In an embodiment, the first cryptographic certificate comprises information which validates that $K_{BLOB\ priv}$ is ephemeral and that $K_{BLOB\ priv}$ cannot leave the second security context. Information indicating that $K_{BLOB\ priv}$ is ephemeral and that $K_{BLOB\ priv}$ cannot leave the second security context is sent with the first cryptographic key pair $K_{BLOB}$ to the first security context 5. The first cryptographic certificate comprises this information and is signed, thus validating the information contained in the message.

In step S604, the first public key, $K_{BLOB\ pub}$, and the signed first cryptographic certificate $\{C_{BLOB}\}K_{2ID\ priv}$ are sent to the first security context 5. Information relating to $K_{BLOB\ pub}$, for example indicating that $K_{BLOB\ priv}$ is ephemeral and that $K_{BLOB\ priv}$ cannot leave the second security, may also be sent with the first cryptographic key pair $K_{BLOB}$ to the first security context 5 and be included in the first certificate. The second transceiver 15 is configured to send the first public key, $K_{BLOB\ pub}$ and the signed first cryptographic certificate $\{C_{BLOB}\}K_{2ID\ priv}$ to the first security context 5. Configuration information and/or information about the key may be sent to the first security context 5 in the same message.

Thus in steps S602 to S604, the second security context 7, in response to the initiation message, generates an asymmetric key, $K_{BLOB}$, and forwards the public half and a certificate signed by the private half of the identity key of the second security context, $K_{2ID\ priv}$ to the first security context 5. $K_{BLOB}$ is an ephemeral asymmetric key, generated inside the second security context 7 with an accompanying key certificate, $C_{BLOB}$. $C_{BLOB}$ allows the tenant to validate that the key was generated by an appliance inside the second security context 7, that the private half of $K_{blob}$ is ephemeral and can never leave the second security context 7. The service provider sends the public half of $K_{BLOB}$ and $C_{BLOB}$ to the first security context 5.

In step S605, the signed first cryptographic certificate $\{C_{BLOB}\}K_{2ID\ priv}$ is verified at the first security context 5. The first processor 17 in the first security context 5 is configured to verify the signed first cryptographic certificate $\{C_{BLOB}\}K_{2ID\ priv}$. The signed first cryptographic certificate $\{C_{BLOB}\}K_{2ID\ priv}$ is verified using the public half of the identity key of the second security context, $K_{2ID\ pub}$. The first processor 17 is configured to perform a signature verification algorithm that, given the signed message $\{C_{BLOB}\}K2ID\ priv$ and the public key $K_{2ID\ pub}$ either accepts or rejects the message's claim to authenticity.

The authenticity of the first public key, $K_{BLOB\ pub}$ is then validated at the first security context 5 from the first cryptographic certificate $C_{BLOB}$. The first processor 17 in the first security context 5 is configured to validate the first public key, $K_{BLOB\ pub}$. In an embodiment in which the first cryptographic certificate $C_{BLOB}$ comprises a hash of the first public key, $K_{BLOB\ pub}$, the authenticity of the first public key, $K_{BLOB\ pub}$ is validated by calculating the hash of the first public key, $K_{BLOB\ pub}$, and validating that it matches that contained in the first cryptographic certificate $C_{BLOB}$. Any other information sent with the first public key, $K_{BLOB\ pub}$, for example current configuration information and information relating to the first public key, $K_{BLOB\ pub}$, is also validated from the certificate.

If the signature is verified, the first public key, $K_{BLOB\ pub}$, is stored in the first device memory 9 of the first security context 5. Alternatively, it can be integrity protected by the first security context 5 and stored in untrusted storage outside of the first security context 5.

If the signature is not verified or the key is not validated, an error is returned to the second security context 7, for example a message is sent stating "AccessDenied". At this point, the communication between the first security context 5 and the second security context 7 is terminated.

In an embodiment in which the first cryptographic certificate $C_{BLOB}$ is generated further comprising information relating to the current configuration of the second security context, the information relating to the current configuration of the second security context is also validated in step S605, as described in relation to FIG. 2(b). Any key information included in the message is also validated.

Thus in step S605, the first security context may use the certificate to validate the parameters of $K_{BLOB}$, authenticating the source and checking that it is well-formed and conforming to the security policies expected by the tenant. The security policy a tenant may require could include a key length, key type and/or key permission-credential pairs. Key permissions are used to describe the operations that a key may be used for. For example, permissions may specify that a key can be used to encrypt other keys or that it may be used for cryptographically signing data. Permissions must be activated by a matching credential before they can be used. A credential in this system takes the form of a verifiable cryptographic certificate. The first security context 5 validates $C_{BLOB}$, that the private half of $K_{BLOB}$ is ephemeral, that the second security context 7 is manufactured by a trusted source, and that the state of the second security context 7 is suitable for lending a key to.

Step S606 comprises encrypting the cryptographic key $K_{tenant}$ and the corresponding access control list with the first public key $K_{BLOB\ pub}$ in the first security context 5. The first processor 17 is configured to encrypt the cryptographic key $K_{tenant}$ and the corresponding access control list with the first public key $K_{BLOB\ pub}$.

As the communication channel between the first security context 5 and the second security context 7 is provided and controlled by the service provider, it is not trusted by the tenant for transfer of high value cryptographic keys such as $K_{tenant}$, as it could be open to attack by the service provider. Thus the security of $K_{tenant}$ is enforced by the tenant by encryption of $K_{tenant}$ with the first public key $K_{BLOB\ pub}$. The first certificate $C_{BLOB}$ allows the tenant to validate that the private half of $K_{blob}$ can never leave the second security context 7, thus by encryption of $K_{tenant}$ with the first public key $K_{BLOB\ pub}$, the tenant can ensure that $K_{tenant}$ is secure from the service provider, even though the service provider can attack the communication channel.

The encryption of the tenant key in this way provides a secure channel which is rooted in the trust between the first security context 5 and the second security context 7. This allows a higher level secure authenticated channel that is not trusted by the first security context 5 and the second security context 7 to be used between the tenant and service provider site. This higher layer secure channel may be provided by the service provider using a load balancer or firewall appliance. The encryption of the tenant key allows the service provider to continue to use this infrastructure to mitigate attacks such as denial of service but still allows context to context security without having to trust external security services.

$K_{BLOB\ pub}$ may be discarded by the tenant after encryption of $K_{tenant}$.

In an embodiment, the information from which the origin of the cryptographic key $K_{tenant}$ can be validated is the signed encrypted tenant key and access control list $\{\{K_{tenant}, ACL\}K_{BLOB\ pub}\}_{Ktenant-sign\ priv}$.

Thus in step S607, the output blob from step S606 is cryptographically signed using the private half of $K_{tenant-sign}$. The first processor 17 is configured to cryptographically sign the output blob from step S606 with the private half of $K_{tenant-sign}$.

In step S608, the encrypted cryptographic key and corresponding access control list $\{K_{tenant}, ACL\}_{KBLOB\ pub}$, and information from which the origin of the cryptographic key $K_{tenant}$ can be validated is sent to the second security context 7. In an embodiment, information from which the origin of the message can be identified is also sent, which may be the hash of the public half of $K_{tenant-sign}$ for example.

In an embodiment, in which the information from which the origin of the message can be identified comprises a hash of $K_{tenant-sign_{pub}}$, the encrypted blob, hash of the signing key and signature are forwarded to the second security context 7. The signature is information from which the origin of the cryptographic key $K_{tenant}$ can be validated. The first transceiver 13 is configured to send the encrypted blob, signed output blob from step S607 and the hash of the public half of $K_{tenant-sign}$ to the second security context 7.

Given an acceptable key $K_{BLOB\ pub}$, that is a key $K_{BLOB\ pub}$ that the tenant defines as being of sufficient cryptographic strength, the key which is to be registered, $K_{tenant}$, is encrypted with the public half of $K_{blob}$ at the first security context 5. As described above, $K_{tenant}$ includes permission-credential pairs, i.e. the ACL, which specify the acceptable operations for which the key material may be used and which may be activated by a certificate which must be signed by the private half of $K_{tenant-sign}$. The encrypted blob is signed using the private half of $K_{tenant-sign}$ and the encrypted blob, signature and hash of the public half of $K_{tenant-sign}$ are forwarded to the second security context 7.

The transfer of the cryptographic key $K_{tenant}$ to the second security context in the service provider is secure from the service provider and other attackers, as the key used to encrypt the cryptographic key $K_{tenant}$ is not recoverable in plaintext. $K_{blobpriv}$ is required to successfully decrypt the data sent from the first security context 5 to the second security context 7. $K_{blobpriv}$ is ephemeral and cannot be accessed or mutated by the service provider or a third party.

Figure 6B:
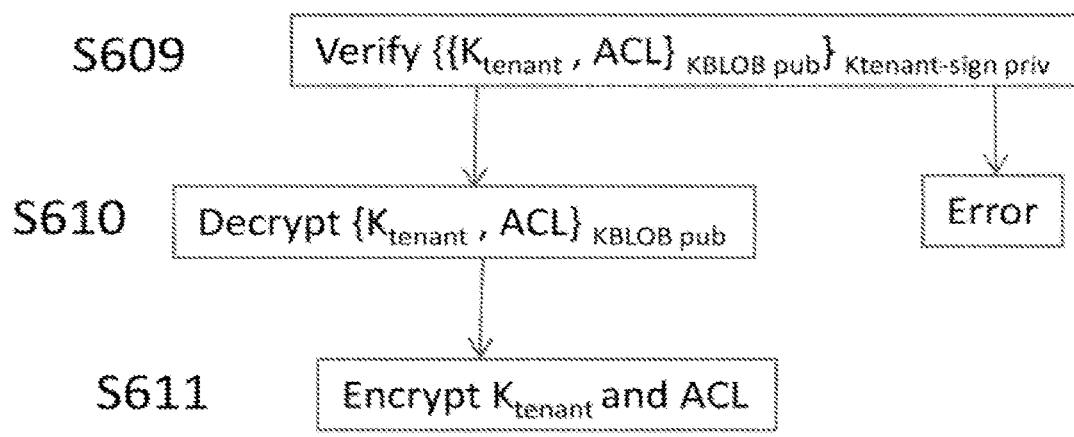
FIG. 6(b) is a flow chart showing further steps of a method of transferring data from the first security context to the second security context in accordance with an embodiment of the present invention.

FIG. 6(b) is a flow chart showing further steps of a method of transferring a cryptographic key, $K_{tenant}$ from the first security context 5 to the second security context 7 in accordance with an embodiment of the present invention.

In step S609, the origin of the cryptographic key $K_{tenant}$ is validated at the second security context 7. In an embodiment, this is validated by first verifying the signature contained in the message sent from the first security context 5.

In an embodiment, the hash of the public half of $K_{tenant-sign}$ is used to identify the tenant from which the message originates, and thus identify the correct signing key required to verify the signature.

The signature is then verified using the public half of $K_{tenant-sign}$. The second processor 19 in the second security context 7 is configured to verify the signature. The signature is verified using the public half of $K_{tenant-sign}$. The second processor 19 is configured to perform a signature verification algorithm that, given the signature and the public key $K_{tenant-sign}$ either accepts or rejects the message's claim to authenticity.

It is then validated that the contents of the signature match the encrypted blob. This allows validation of the origin of the encrypted blob.

If verified and validated, the method progresses to step S610. If not verified or validated, an error is returned to the first security context 5, for example a message is sent stating "AccessDenied". At this point, the communication between the first security context 5 and the second security context 7 is terminated.

Step S610 comprises decrypting the encrypted cryptographic key $K_{tenant}$ and corresponding access control list with the first private key $K_{BLOB\ priv}$ at the second security context 7. The second processor 19 is configured to decrypt the encrypted cryptographic key $K_{tenant}$ and corresponding access control list. The second processor 19 is configured to perform a decryption algorithm given the encrypted cryptographic key $K_{tenant}$ and corresponding access control list and the first private key $K_{BLOB\ priv}$.

Step S611 comprises re-encrypting the cryptographic key $K_{tenant}$ and the ACL with a third cryptographic key at the second security context 7. This step is performed so that the cryptographic key $K_{tenant}$ and the ACL may be stored outside of the second security context 7. In an alternative embodiment, this step is omitted and the cryptographic key $K_{tenant}$, the ACL and information identifying the origin of the cryptographic key $K_{tenant}$ are stored unencrypted within the second security context 7.

The ACL specifies the parameters of which type(s) of key can be used to encrypt $K_{tenant}$, and which encryption mechanisms can be used.

The ACL may comprise a permission, i.e. a policy, which states that $K_{tenant}$ can only be encrypted with a key that cannot leave the second security context 7 and is not controllable by the administrator, i.e. the service provider. The permission also includes the key type(s) and mechanism(s) that can be used to encrypt the tenant key $K_{tenant}$, for example, the tenant key $K_{tenant}$ can only be encrypted using AES-GCM (Galois/Counter Mode) encryption with an AES key of 256 bits.

The encryption mechanism may specify the need to ensure authenticity, integrity and confidentiality or some subset of those properties.

The second security context 7 may either re-use an existing key that meets the ACL policy requirements, or create a new key.

The cryptographic key $K_{tenant}$ and the ACL are encrypted in the second security context 7 using the mechanism specified, and a third cryptographic key which meets the specified requirements. The second processor is configured to encrypt the cryptographic key $K_{tenant}$ with a third cryptographic key. In an embodiment, the cryptographic key, $K_{tenant}$ is encrypted for storage by a key which cannot leave the second security context 7.

The cryptographic key $K_{tenant}$ and the ACL may be encrypted using an authenticated encryption algorithm.

In an embodiment, the cryptographic key $K_{tenant}$ and ACL are inputs to be encrypted in an authenticated encryption algorithm, for example an AES-GCM operation, whilst information from which the origin of the cryptographic key $K_{tenant}$ can be identified is input as an authenticated data parameter. In an embodiment, the information from which the origin of the cryptographic key $K_{tenant}$ can be identified is the public half of $K_{tenant-sign}$. In an embodiment, a hash of $K_{tenant}$ is also stored with the cryptographic key $K_{tenant}$, for example the hash of $k_{tenant}$ may be the name of the file in which the encrypted data is stored.

The re-encrypted cryptographic key $K_{tenant}$ and corresponding access control list, and the authenticated information from which the origin of the cryptographic key $K_{tenant}$ can be identified, are transferred to a device memory outside of the second security context 7.

The information from which the origin of the cryptographic key $K_{tenant}$ can be identified is thus stored in the same data structure as the encrypted cryptographic key $K_{tenant}$ and access control list, but not necessarily be encrypted. However, the information from which the origin of the cryptographic key $K_{tenant}$ can be identified is authenticity protected, such that it cannot be changed without notice.

In the above described steps, upon receipt, the second security context 7 verifies the payload signature using the public half of $K_{tenant-sign}$. The hash contained in the received payload is used to identify the public half of the tenant's signing key. The received payload signature is verified using the identified signing key. Upon successful validation of the payload, $K_{tenant}$ is decrypted using the private half of $K_{blob}$ and re-encrypted under a non-recoverable key, as enforced by the $K_{tenant}$ ACL, and stored alongside the public half of $K_{tenant-sign}$ outside of the second security context 7 for later use. Alternatively, the key $K_{tenant}$ is stored unencrypted in protected non-volatile memory within the second security context 7. In both cases, the decrypted key is thus stored in a secure, tamper-proof manner.

The manner in which $K_{tenant}$ is stored is described by its permissions, or policies. Specifically, at generation time, the permissions granted restrict how $K_{tenant}$ can be stored and are set so that $K_{tenant}$ is inaccessible by anyone including the service provider, other than the second security context 7.

In an embodiment in which a plurality of tenants store a key with a single service provider, each of the tenant keys can be encrypted for storage with the same key. Alternatively, each tenant key may be encrypted with a different key if there are different storage permissions between the ACLs corresponding to each tenant key for example.

Figure 7A:
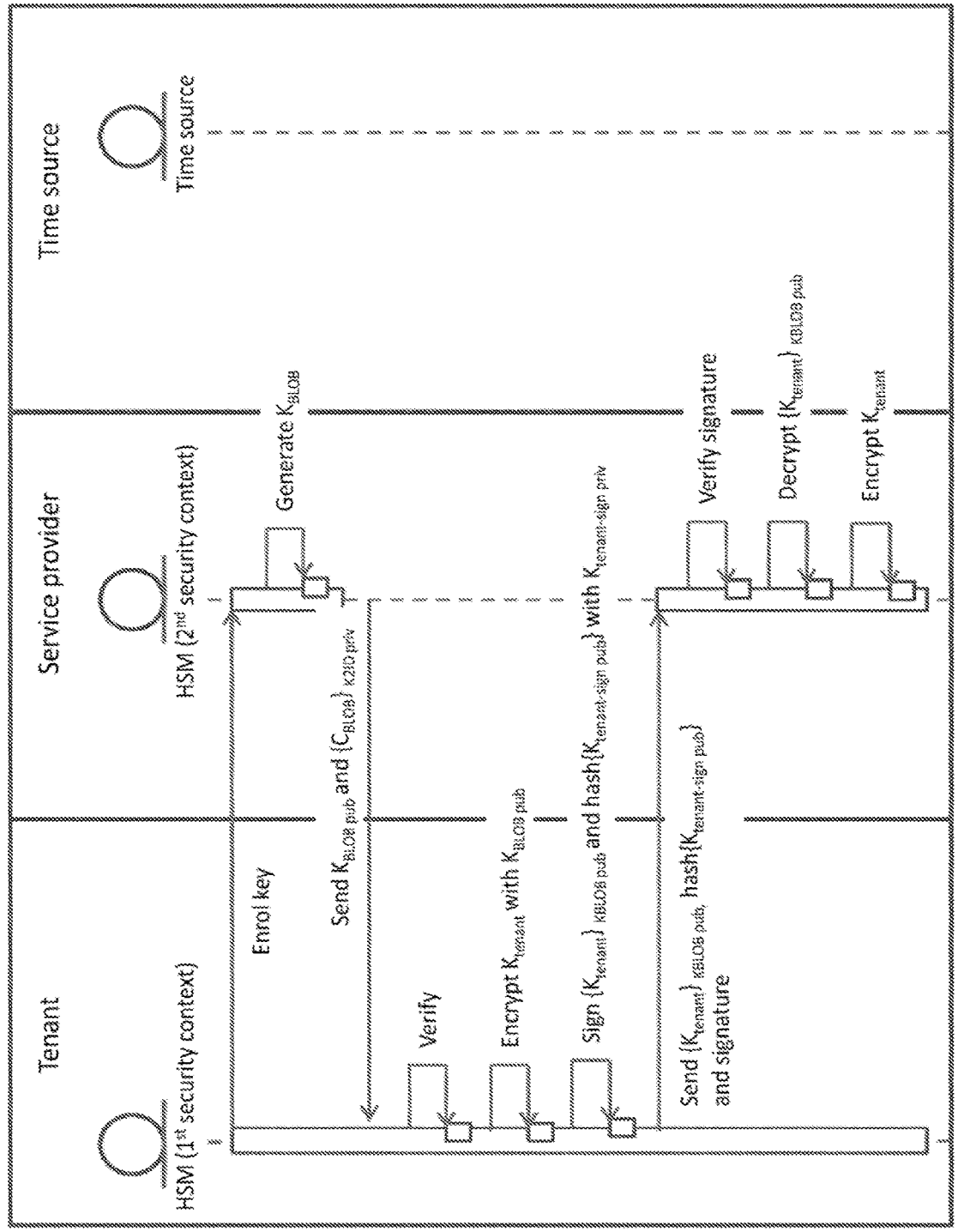
FIG. 7(a) is an illustration of a method of key enrolment, which is part of a method of cryptographic key transfer according to an embodiment of the present invention.

FIG. 7(a) is a schematic illustration of a method of key enrolment, which is part of a method of cryptographic key transfer according to an embodiment of the present invention. The method comprises steps S602 to S611 described in relation to FIGS. 6(a) and (b) above.

A key enrolment message is sent from the first security context 5 to the second security context 7. In response to this message, the first cryptographic key pair $K_{BLOB}$ is generated at the second security context 7. The second security context 7 sends the public half of the first cryptographic key pair $K_{BLOB}$ and the signed first cryptographic certificate $\{C_{BLOB}\}K_{2ID\ priv}$ to the first security context 5, where they are validated. The cryptographic key $K_{tenant}$ is encrypted at the first security context 5 with $K_{BLOB\ pub}$. The encrypted key $\{K_{tenant}\}K_{BLOB\ pub}$ and hash$\{K_{tenant-sign\ pub}\}$ are signed with $K_{tenant-sign\ priv}$ at the first security context 5. The signed message is sent to the second security context 7 where it is validated, and the encrypted key $\{K_{tenant}\}_{KBLOB\ pub}$ is decrypted and re-encrypted in the second security context 7 with a non-recoverable key that is safe from the administrator. The encrypted tenant key can then be stored outside of the second security context 7.

Figure 7B:
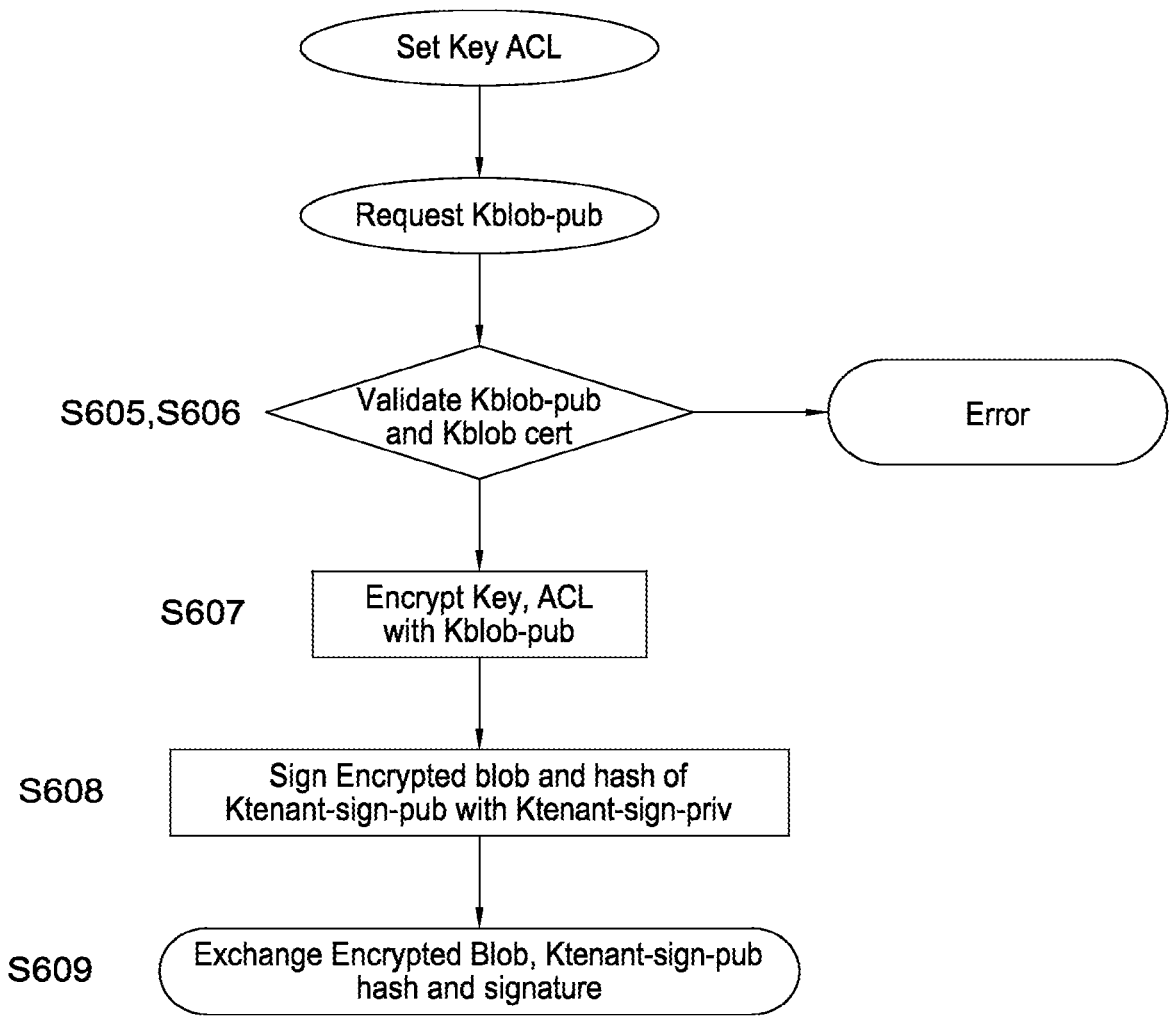
FIG. 7(b) is a flow chart of a method of cryptographic key transfer according to an embodiment of the present invention.

FIG. 7(b) is a flow chart of a method of cryptographic key transfer according to an embodiment of the present invention.

The tenant sets the ACL of the tenant key in the first security context 5. The first security context 5 then requests the first public key $K_{BLOB\ pub}$ from the second security context 7. The first security context 5 sends a request message to the second security context 7 for example. The first security context 5 then validates the received first public key $K_{BLOB\ pub}$ and first cryptographic certificate $C_{BLOB}$. This corresponds to steps S605 described above. If the first public key $K_{BLOB\ pub}$ and first cryptographic certificate $C_{BLOB}$ are not validated, an error is returned. If they are validated, the first security context 5 encrypts the tenant key and associated ACL with the first public key $K_{BLOB\ pub}$. This corresponds to step S606 described above. The first security context 5 then signs the encrypted key and associated ACL and a hash of $K_{tenant\text{-}sign\ pub}$ with $K_{tenant\text{-}sign\ priv}$. This corresponds to the S607 described above. The first security context 5 then exchanges the encrypted blob, the hash of $K_{tenant\text{-}sign\ pub}$ and the signature with the second security context 7. This corresponds to step S608 above.

Figure 8A:
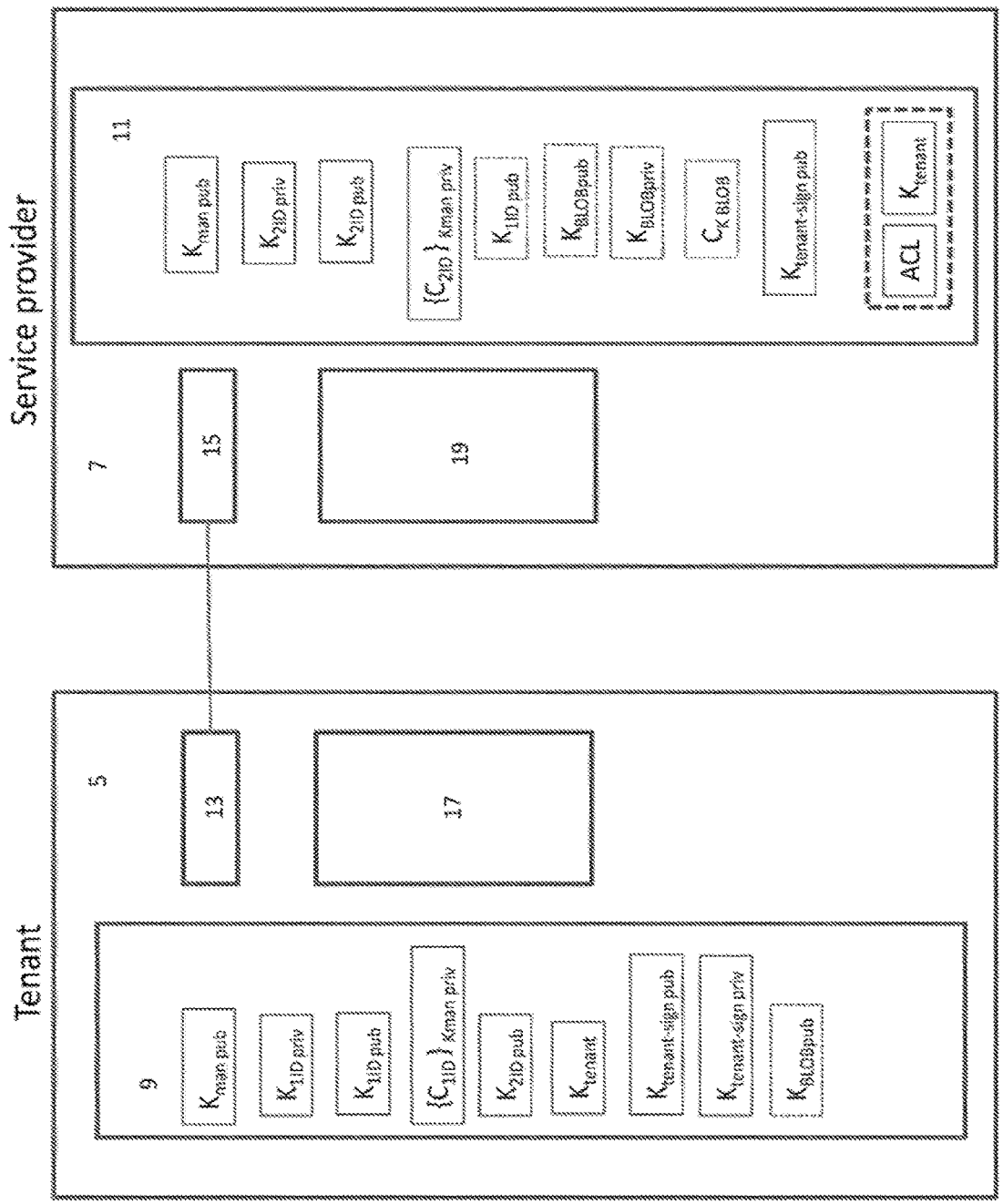
FIG. 8(a) is a schematic illustration of a first security context in accordance with an embodiment of the present invention and a second security context in accordance with an embodiment of the present invention after the tenant key $K_{tenant}$ has been imported to the second security context.

FIG. 8(a) is a schematic illustration of the tenant system 1 and service provider system 3 after the tenant key $K_{tenant}$ has been imported to the second security context 7. In an embodiment, $K_{blob}$ and $C_{blob}$ are transient, and once $K_{tenant}$ has been transferred are deleted from the second security context 7 and the first security context 5.

The first device memory 9 in the first security context 5 also stores the first public key $K_{BLOBpub}$. Alternatively, this key may be stored outside of the first security context 5 in an integrity protected manner. The second device memory 11 in the second security context 7 also stores the tenant key $K_{tenant}$ and the corresponding ACL. Alternatively, the tenant key $K_{tenant}$ and ACL may be stored outside the second security context 7, encrypted with a third cryptographic key which cannot leave the second security context 7.

Figure 8B:
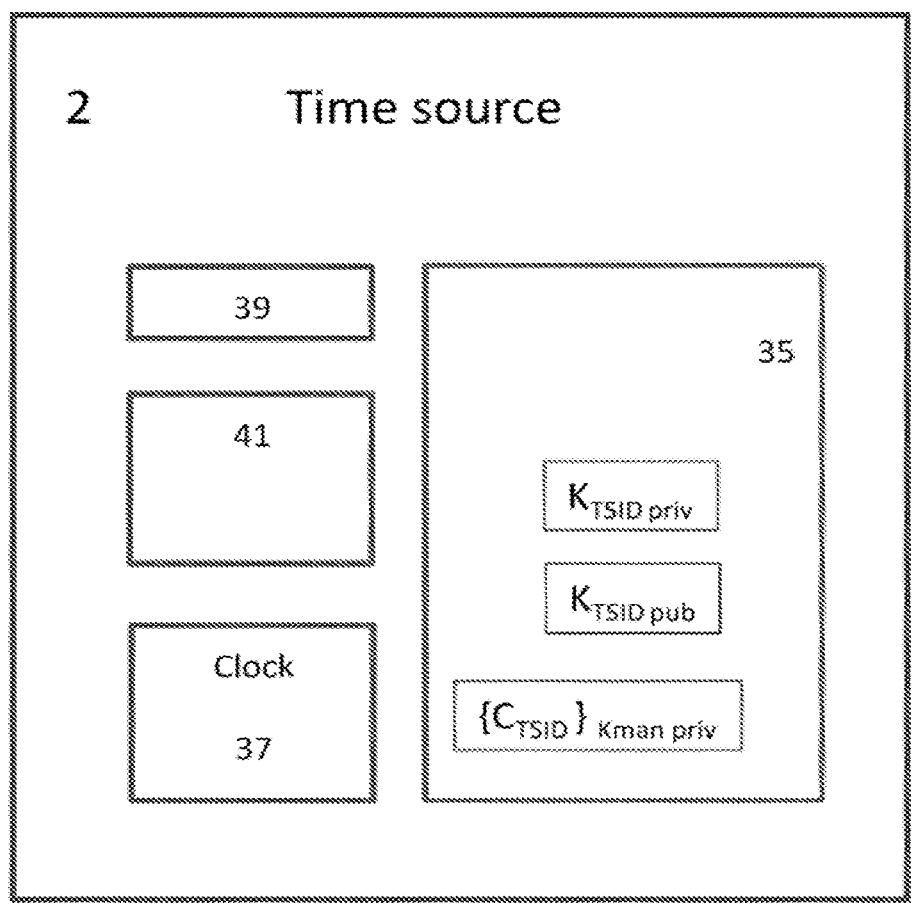
FIG. 8(b) is a schematic illustration of a time source which may be hosted by the service provider, the tenant or a separate third-party.

FIG. 8(b) is a schematic illustration of a tamper-proof, secure reference time source 2, which may be hosted by the service provider, the tenant or a separate third-party. If hosted by the service provider, the reference time source may be part of the second security context 7, or may be a different security context.

The time source 2 comprises a third device memory 35. The third device memory 35 is configured to store cryptographic information such as keys, key pairs and certificates. The third device memory 35 may include any form of non-volatile device memory such as flash, optical disks or magnetic hard drives for example. The time source 2 also comprises volatile memory.

The third device memory 35 stores a unique asymmetric identity key $K_{TSID}$, with a corresponding signed generation certificate $\{C_{TSID}\}K_{man\ priv}$. $K_{TSID}$ is a signing key used to prove the origin of data and authenticity. The generation certificate $C_{TSID}$ may describe the public parameters of the key, for example information relating to the type of key, and its length. The generation certificate $C_{TSID}$ comprises information which authenticates that the identity key $K_{TSID}$ was generated in the time source 2. For example, the generation certificate $C_{TSID}$ may comprise the signed hash of the public half of $K_{TSID}$. The generation certificate $C_{TSID}$ may also include state information, for example, information relating to a unique identification of the device, information identifying the manufacturer, the device version, hardware version, the software type and the supported features of the model. The generation certificate $C_{TSID}$ is signed by a manufacturer trusted by both the first security context 5 and the second security context 7. The generation certificate is cryptographically signed with the private half of a manufacturer asymmetric key, $K_{man\ priv}$. The manufacturer may be a third party who manufactured the security appliance(s) which forms the first security context, the security appliance(s) which forms the second security context and the time source 2.

The time source 2 further comprises a third transceiver 39. The third transceiver 39 is configured to transmit and receive data packets. The data packets may be transmitted from and received at the transceiver 39 via a wireless Internet connection for example.

The time source 2 further comprises a third processor 41. The third processor 41 is configured to perform cryptographic operations, such as generation of cryptographic keys and asymmetric cryptographic key pairs, generation of certificates corresponding to a cryptographic key or asymmetric cryptographic key pair, generation of access control lists corresponding to a cryptographic key, generation of use certificates corresponding to a cryptographic key, encryption of an object with a cryptographic key which is stored in the third device memory 35, decryption of an encrypted object with a cryptographic key which is stored in the third device memory 35, cryptographically signing an object with a cryptographic key which is stored in the third device memory 35, signature verification and validation of an object based on information stored in the third device memory 35.

The time source 2 further comprises a clock 37. The clock 37 may be a monotonic clock, i.e. a counter that increases monotonically over time. The clock may represent time of day to a high degree of accuracy. In an embodiment, the clock is accurate to 1 second or better. For example, the clock may be based on a GPS signal which is accurate to the order of 40 nanoseconds.

The time source 2 may be resistant to tamper, for example by the inclusion of physical security such as a membrane that covers the entire device, and that cannot be removed without destroying the underlying physical hardware, thus making it un-usable.

The three services shown in FIGS. 8(a) and 8(b) comprising: 1) the first security context 5, for example a secure appliance, owned and operated by a tenant; 2) the second security context 7, for example one or more secure appliances owned and operated by the service provider; and 3) a trusted time source 2, which may be owned by the service provider, an external third-party or a tenant, are a set of cooperating services that can all verify that they were built by trusted third-parties with a set of known security properties and adhere to certain same rules. There is an assumption that a tenant trusts the aforementioned third-parties which built the cooperating services but does not trust the service provider who is hosting some of these services. A security context may be one or more security appliances that share a set of cryptographic primitives and form a cluster across which requests may be load-balanced.

Each of the first security context 5, second security context 7 and reference time source 2 can be verifiably identified using a cryptographic certificate, which may be generated at the time of manufacture for example. Each is able to securely store their identity in a way that means they cannot be imitated. Identifying the first security context 5, second security context 7 or reference time source 2 allows for its origin to be ascertained.

Furthermore, the configuration and state of each of the first security context 5, second security context 7 and reference time source 2 can be validated in a non-repudiable manner. The origin and state of a service define enough information by which other services can place their trust.

Each component contains a $K_{ID}$ generated in the factory when it was manufactured for example. Each component also contains the key certificate for the $K_{ID}$ which is signed using an asymmetric key known only to the manufacturer. The public half of the manufacturer key can be used as the root of trust to authenticate genuine appliances.

The transfer of cryptographic certificates and cryptographic keys between the reference time source 2 and the second security context 7 described in the following may occur over a secure, authenticated channel between the reference time source 2 and the second security context 7, which is provided and controlled by the service provider. Note that although the channel may be secured from third parties, it is open to attack by the service provider, and is thus untrusted.

The exchange of public keys and certificates described in relation to FIG. 9 below allows a trusted relationship between the second security context 7 and the time source 2 to be established.

FIG. 9 is a flow chart showing a method of registering a time source 2 with the second security context 7. This can be performed at any point as part of the key transfer method according to an embodiment of the present invention, or as part of the method of controlling use of a cryptographic key according to an embodiment of the present invention. For example, the method of registering a time source 2 may be performed when the administrator of the second security context 7 sets up the appliances in the second security context 7, i.e. when authenticity is performed. This is an infrequent process, and may only need to be performed once. After enrolment of the time source 2, the second security context 7 may then broadcast information relating to its trusted time sources to potential tenants. The tenants therefore know initially which time source(s) the service provider supports, and can make a decision as to whether these time sources are acceptable before enrolment of keys begins, for example by validating the authenticity, state and configuration of the time source(s) as described in relation to FIG. 10 below.

If the reference time source 2 is part of the second security context 7, it is not necessary to register the time source 2 with the second security context 7 and these steps are not performed.

A reference time source 2 comprises a device memory 35 and a clock 37 as described in relation to FIG. 8(*b*) above.

In step S901, the public half of the identity key of the time source, $K_{TSID\ pub}$, and the generation certificate $\{C_{TSID}\}_{Kman\ priv}$, are sent from the reference time source 2 to the second security context 7 in response to a query message from the second security context 7. A transceiver 39 in the reference time source 2 is configured to send the public half of the identity key of the time source, $K_{TSID\ pub}$, and the generation certificate $\{C_{TSID}\}_{Kman\ priv}$, to the second transceiver 15 in the second security context 7. Information relating to the state of the time source device 2 may be sent in the same message. The information relating to the state of the device will also be contained in the generation certificate in this case, in order to allow validation of the state information.

In step S902, the generation certificate $\{C_{TSID}\}_{Kman\ priv}$ is verified at the second security context 7. The second processor 19 in the second security context 7 is configured to verify the generation certificate $\{C_{TSID}\}K_{man\ priv}$. The generation certificate is verified using the public half of the trusted manufacturer key $K_{man\ pub}$. The second processor 19 is configured to perform a signature verification algorithm that, given the signed message $\{C_{TSID}\}_{Kman\ priv}$ and the public key $K_{man\ pub}$ either accepts or rejects the message's claim to authenticity.

The authenticity of the public half of the identity key of the time source, $K_{TSID\ pub}$ is then validated at the second security context 7. The second processor 19 in the second security context 7 is configured to validate the public half of the identity key of the time source, $K_{TSID\ pub}$. In an embodiment in which the generation certificate $C_{TSID}$ comprises a hash of the public half of the identity key of the time source, $K_{TSID\ pub}$, the authenticity of the public half of the identity key of the time source, $K_{TSID\ pub}$, is validated by calculating the hash of the public half of the identity key of the time source, $K_{TSID\ pub}$, and validating that it matches that contained in its generation certificate $C_{TSID}$.

In step S903, the second security context 7 may also validate any state information contained in the message meets requirements.

If the signature is verified and the state information is validated, the public half of the identity key of the time source, $K_{TSID\ pub}$, is stored in the second device memory 11 of the second security context 7. Alternatively, it can be integrity protected by the second security context 7 and stored in untrusted storage outside of the second security context 7.

If the signature is not verified, or the key or state information is not validated, an error is returned to the time source 2, for example a message is sent stating "AccessDenied". At this point, the communication between the time source 2 and the second security context 7 is terminated.

In the above described steps, the second security context 7 establishes trust with the reference time source 2. The second security context 7 thus establishes trust with the time source 2 by validating its origin, state and authenticity via a certificate chain.

Once trust has been established, the second security context 7 requests configuration information from the time source 2 in step S904. The transceiver 15 in the second security context 7 sends a message requesting the information to the time source 2.

In step S905, in response to the request, the time source 2 generates configuration information which includes information relating to the configuration of the time source 2, which may include precision information about the clock and security settings, the cryptographic primitives that have been setup, the version of software that the time source is running and the state of the time source 2, including any anomalies detected. The third processor 41 in the time source 2 is configured to generate this message. In step S906, the response message is signed by the private half of the identity key of the time source, $K_{TSID\ priv}$. The third processor 41 in the time source 2 is configured to cryptographically sign the message with the private half of the identity key of the time source, $K_{TSID\ priv}$.

In step S907, the signature and configuration information is sent to the second security context 7. The transceiver 39 in the time source 2 is configured to send the signed message to the second security context 7.

In step S908, the second security context 7 verifies the response signature using public half of the identity key of the time source, $K_{TSID\ pub}$. The second processor 19 in the second security context 5 is configured to verify the signature. The signature is verified using the public half of the identity key of the time source, $K_{TSID\ pub}$. The second processor 19 is configured to perform a signature verification algorithm that, given the signed message and the public key $K_{TSID\ pub}$ either accepts or rejects the message's claim to authenticity.

In step S909, a check as to whether the time source configuration is within acceptable tolerances is performed. The configuration information is checked to validate that it meets the requirements of the service provider.

The configuration information can be checked again whenever a time stamp is requested by the second security context 7, by requesting configuration information again.

The state and configuration of all appliances in the system, i.e. the first security context 5, the second security context 7 and the reference time source 2 can be obtained from the state entry present in the appliance. After initialization, each appliance updates this field and generates a new configuration message to allow clients to cryptographically verify the new appliance settings.

If the signature is verified successfully and the configuration of the time source 2 is within tolerances, the method progresses to step S910. If not, an error is returned to the time source 2, for example a message is sent stating "AccessDenied". At this point, the communication between the time source 2 and the second security context 7 is terminated.

In step S910, a message is sent to the first security context 5 comprising information identifying the time source 2 and information indicating that the time source 2 is trusted by the second security context 7. The information identifying the time source 2 may comprise a unique identification number for example the hash of the public half of the identity key of the time source 2 or the IP address of the time source 2. The transceiver 15 in the second security context 7 is configured to send a message comprising information identifying the time source 2 and information indicating that the time source is trusted to the first security context 5. Information identifying the time source 2 and information indicating that the time source 2 is trusted is also stored in the device memory 11 of the second security context 7, or outside of the second security context 7 in an integrity protected manner.

In an embodiment, the second security context 7 adds the time source 2 to a list of trusted time source(s). The reference time source's unique identification may be added to the list. The list of trusted time source(s) is then broadcast by the second security context 7. The first security context 5 receives the list of trusted time source(s) from the second security context 7.

Figure 10:
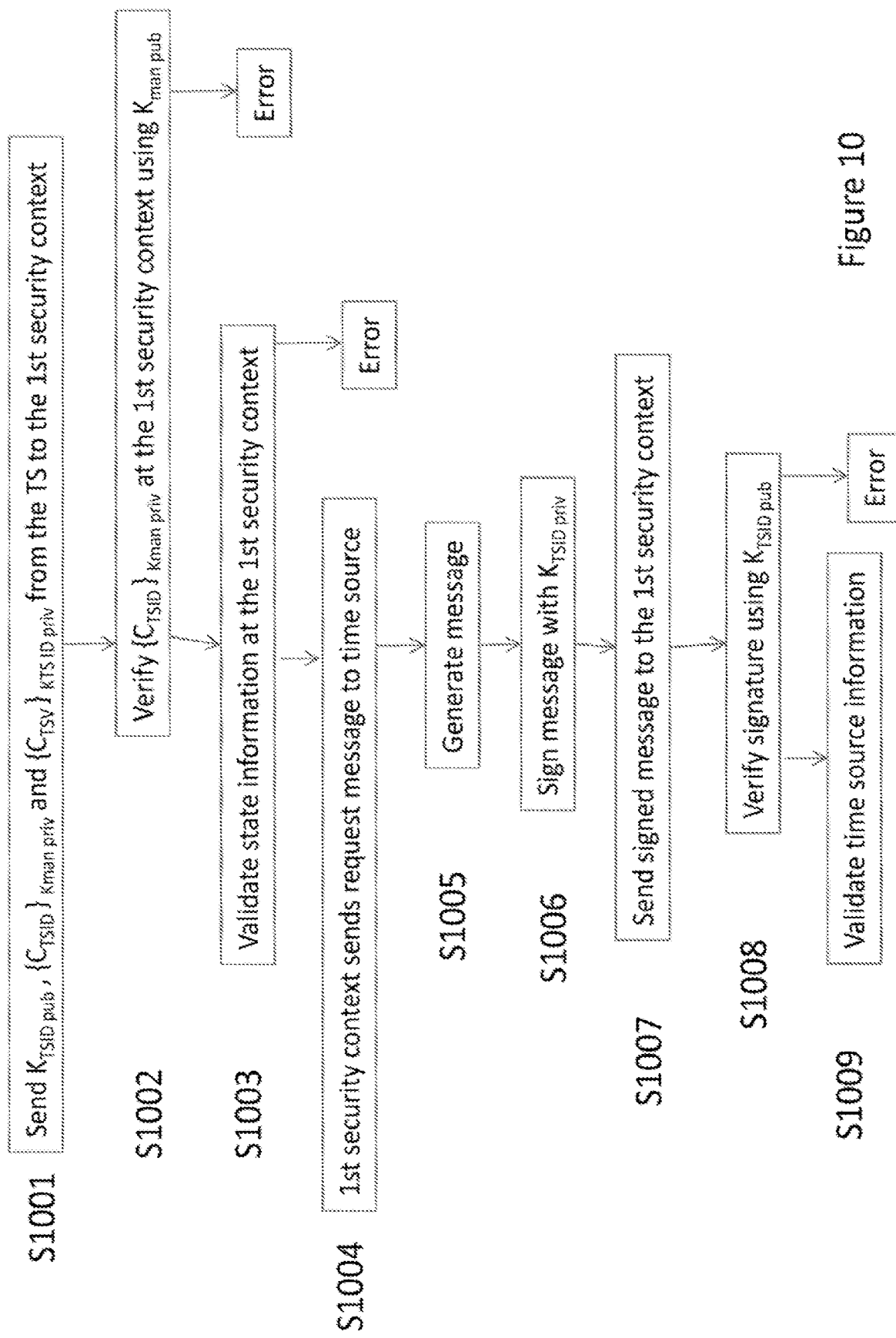
FIG. 10 is a flow chart showing a method of registering a time source with the first security context.

Given the received information identifying one or more trusted time sources, the first security context 5 can query, and in the same way as the second security context 7, validate the authenticity, state and configuration of the time source(s). A flow chart illustrating this process is shown in FIG. 10. Again, this can be performed at any point as part of the key transfer method according to an embodiment of the present invention, or as part of the method of controlling use of a cryptographic key according to an embodiment of the present invention.

Alternatively, if the reference time source 2 is part of the first security context 5, the below steps will not be performed.

Furthermore, in a case in which the reference time source 2 is identified first by the first security context 5, the below steps may be performed, and then information regarding the time source 2 sent to the second security context 7, which then validates the time source 2.

The transfer of cryptographic certificates and cryptographic keys between the reference time source 2 and the first security context 5 described in the following may occur over a secure, authenticated channel between the reference time source 2 and the first security context 5. Where the time source is provided by the service provider, the channel may be provided and controlled by the service provider or a proxy. Where the time source is provided by a third party time service provider, the channel may be provided directly between the tenant and time service provider. This channel may be provided by the time service provider or a proxy. Note that although the channel is secure from third parties, it is open to attack by the time service provider. The transfer of cryptographic certificates and cryptographic keys between the reference time source 2 and the second security context 7 described in the following may occur over a secure, authenticated channel between the reference time source 2 and the second security context 7.

The exchange of public keys and certificates described in relation to FIG. 10 below allows a trusted relationship between the first security context 5 and the time source 2 to be established.

In step S1001, the public half of the identity key of the time source, $K_{TSID\ pub}$, the generation certificate $\{C_{TSID}\}_{Kman\ priv}$, and a configuration certificate $\{C_{TSID}\}_{Kman\ priv}$ are sent from the reference time source 2 to the first security context 5 in response to a query message from the first security context 5. A transceiver 39 in the reference time source 2 is configured to send the public half of the identity key of the time source, $K_{TSID\ pub}$, and the generation certificate $\{C_{TSID}\}_{Kman\ priv}$, to the first transceiver 13 in the first security context 5. Information relating to the state of the time source device(s) may be sent in the same message. The information relating to the state of the device(s) will also be contained in the generation certificate in this case, in order to validate the state information.

In step S1002, the generation certificate $\{C_{TSID}\}_{Kman\ priv}$ is verified at the first security context 5. The first processor 17 in the first security context 5 is configured to verify the generation certificate $\{C_{TSID}\}_{Kman\ priv}$. The generation certificate is verified using the public half of the trusted manufacturer key $K_{man\ pub}$. The first processor 17 is configured to perform a signature verification algorithm that, given the signed message $\{C_{TSID}\}_{Kman\ priv}$ and the public key $K_{man\ pub}$ either accepts or rejects the message's claim to authenticity.

The authenticity of the public half of the identity key of the time source, $K_{TSID\ pub}$ is then validated at the first security context 5. The first processor 17 in the first security context 5 is configured to validate the public half of the identity key of the time source, $K_{TSID\ pub}$. In an embodiment in which the generation certificate $C_{TSID}$ comprises a hash of the public half of the identity key of the time source, $K_{TSID\ pub}$, the authenticity of the public half of the identity key of the time source, $K_{TSID\ pub}$, is validated by calculating the hash the public half of the identity key of the time source, $K_{TSID\ pub}$, and validating that it matches that contained in its generation certificate $C_{TSID}$.

In step S1003, the first security context 5 may also validate that the state of the device(s) meets requirements, from any state information contained in the message.

If the signature is verified and the key and state information is validated, the public half of the identity key of the time source, $K_{TSID\ pub}$, is stored in the first device memory 9 of the first security context 5. Alternatively, it can be integrity protected by the first security context 5 and stored in untrusted storage outside of the first security context 5.

If the signature is not verified or the key or state information is not validated, an error is returned to the time source 2, for example a message is sent stating "AccessDenied". At this point, the communication between the time source 2 and the first security context 5 is terminated.

In the above described steps, the first security context 5 establishes trust with the reference time source 2. The first security context 5 thus establishes trust with the time source 2 by making a secure connection to the time source, and validating its origin and authenticity via a certificate chain.

Once trust has been established, the first security context 5 requests configuration and state information from the time source 2 in step S1004. The transceiver in the first security context 5 sends a message requesting information to the time source 2.

In step S1005, in response to the request, the time source 2 generates a message which includes the configuration of the time source 2, which may include precision information about the clock and security settings, the cryptographic primitives that have been setup, the version of software that the time source is running and the state of the time source, including any anomalies detected. The third processor 41 in the time source is configured to generate the configuration information.

The message may be the same message sent to the second security context 7. Alternatively, a message containing different information may be generated and sent in a similar manner as described in relation to FIG. 2(*b*). The message may comprise information relating to the specific configuration applied to the reference time source.

In step S1006, the response message is signed by the private half of the identity key of the time source, $K_{TSID\ priv}$. The third processor 41 in the time source is configured to cryptographically sign the message with the private half of the identity key of the time source, $K_{TSID\ priv}$.

In step S1007, the message and signature is sent to the first security context 5. The transceiver 39 in the time source 2 is configured to send the signed message to the first security context 5.

In step S1008, the first security context 5 verifies the response signature using public half of the identity key of the time source, $K_{TSID\ pub}$. The first processor 17 in the first security context 5 is configured to verify the signature. The signature is verified using the public half of the identity key of the time source, $K_{TSID\ pub}$. The first processor 17 is configured to perform a signature verification algorithm that, given the signed message and the public key $K_{TSID\ pub}$ either accepts or rejects the message's claim to authenticity.

In step S1009, a check as to whether the time source configuration and the time source state are within acceptable tolerances is performed. The information is checked to validate that it meets the requirements of the tenant. In an embodiment, the configuration information is requested and checked immediately before transfer of $K_{tenant}$ to the second security context 7. This ensures that up to date configuration information is validated.

If the signature is verified successfully and the configuration and state of the time source 2 are within tolerances, information identifying the time source 2 and information indicating that the time source 2 is trusted are stored in the device memory 9 of the first security context 5, or outside of the first security context 5 in an integrity protected manner. If not, an error is returned to the time source 2, for example a message is sent stating "AccessDenied". At this point, the communication between the time source 2 and the first security context 5 is terminated.

The configuration information can be checked again whenever a time stamp is requested by the first security context 7, by requesting configuration information again.

Figure 11:
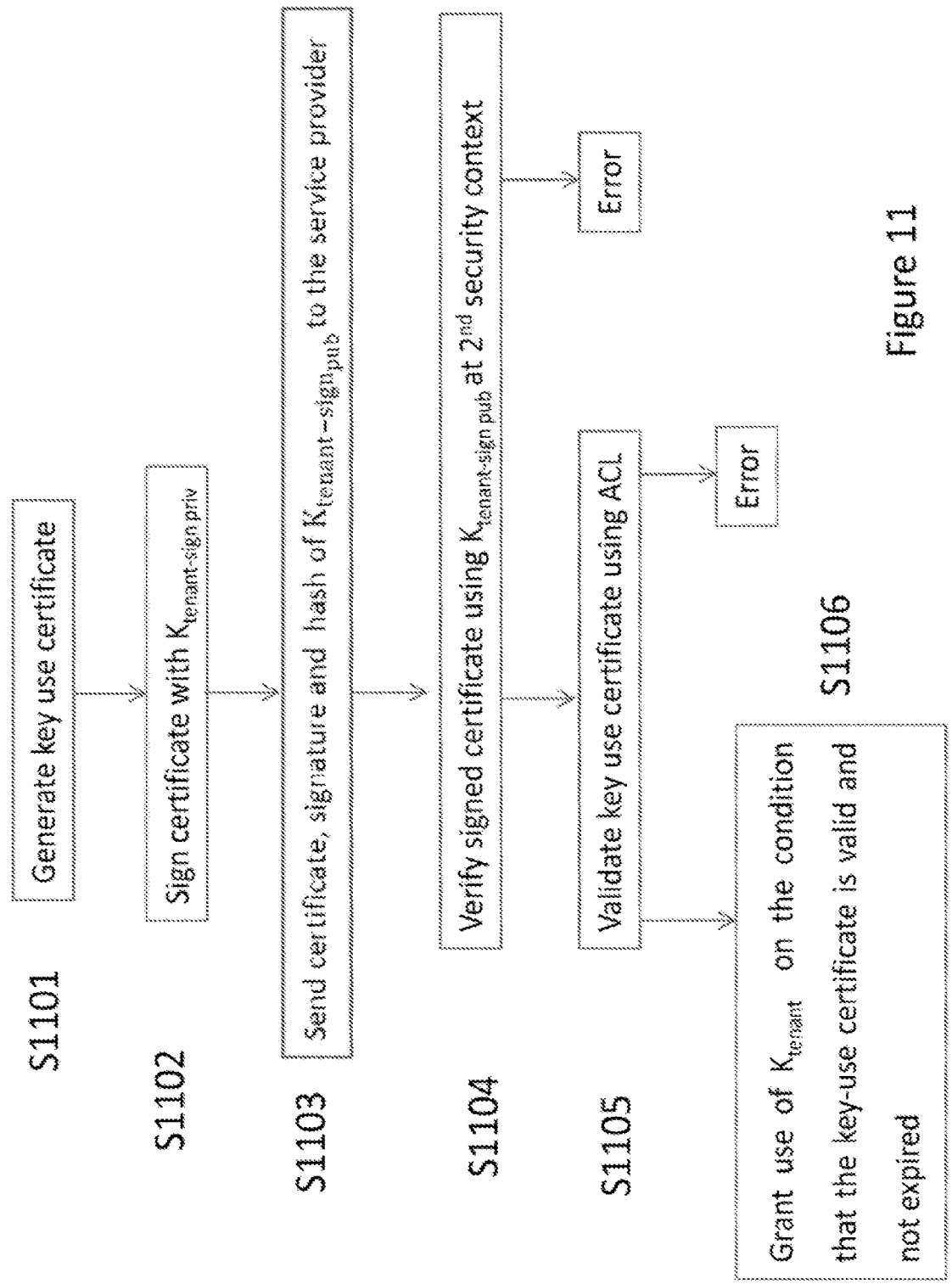
FIG. 11 is a flow chart showing a method of controlling use of data according to an embodiment of the present invention.

FIG. 11 is a flow chart showing a method of controlling use of a cryptographic key, $K_{tenant}$ according to an embodiment of the present invention. The cryptographic key, $K_{tenant}$ is securely stored in the service provider system together with an access control list specifying that a valid use credential, for example a use certificate, must be presented in order to allow a first type of use of the cryptographic key, $K_{tenant}$.

In an alternative embodiment, instead of the cryptographic key, $K_{tenant}$, some other kind of data is securely stored in the service provider system, and the use of this data is controlled. An access control list is stored together with the data, which specifies that a valid use certificate must be presented in order to grant a first type of use of the data. In the below, the methods and apparatus are described with reference to the use of a tenant key, however it is understood that some other kind of data could be substituted for the tenant key, and used in the same manner.

The process of enabling the use of an imported key can be referred to as Key Authorization.

At the point at which the tenant wishes to make its key available for use in the service provider's cryptographic infrastructure, the tenant generates a use certificate.

Step S1101 comprises generating a use credential in the first security context 5. In an embodiment, the use credential is a use certificate. The processor 17 in the first security context 5 is configured to generate the use certificate. The use certificate comprises information from which the cryptographic key $K_{tenant}$ corresponding to the use certificate can be identified and information from which the expiry of the use certificate can be determined.

In an embodiment, the information from which the cryptographic key $K_{tenant}$ corresponding to the use certificate can be identified comprises the hash of $K_{tenant}$.

In an embodiment, the information from which the expiry of the use certificate can be determined comprises an expiry time, and information identifying a reference time source. The expiry time is calculated with reference to a reference time source 2 that is trusted by both the first security context 5 and the second security context 7. Trust in a reference time source is ascertained by the first security context 5 and the second security context 7 independently connecting to the reference time source and validating that the time source is trusted and that the time source is tamper-proof via the module state parameter of the certificate. This is described in relation to FIGS. 9 and 10 above and may be performed prior to the method of key transfer, or after the method of key transfer and before the generation of a use certificate for example.

The use certificate thus comprises information regarding a validity period with reference to a secure time source 2.

Key Authorization thus begins with a tenant generating a credential certificate, or a "key-use" certificate that matches that defined in a permission of $K_{tenant}$, the ACL. In other words, the use certificate fulfils the requirements which are defined in the access control list corresponding to $K_{tenant}$.

In an embodiment, the credential certificate, or use certificate, is signed with the private half of $K_{tenant-sign}$.

Figure 12:
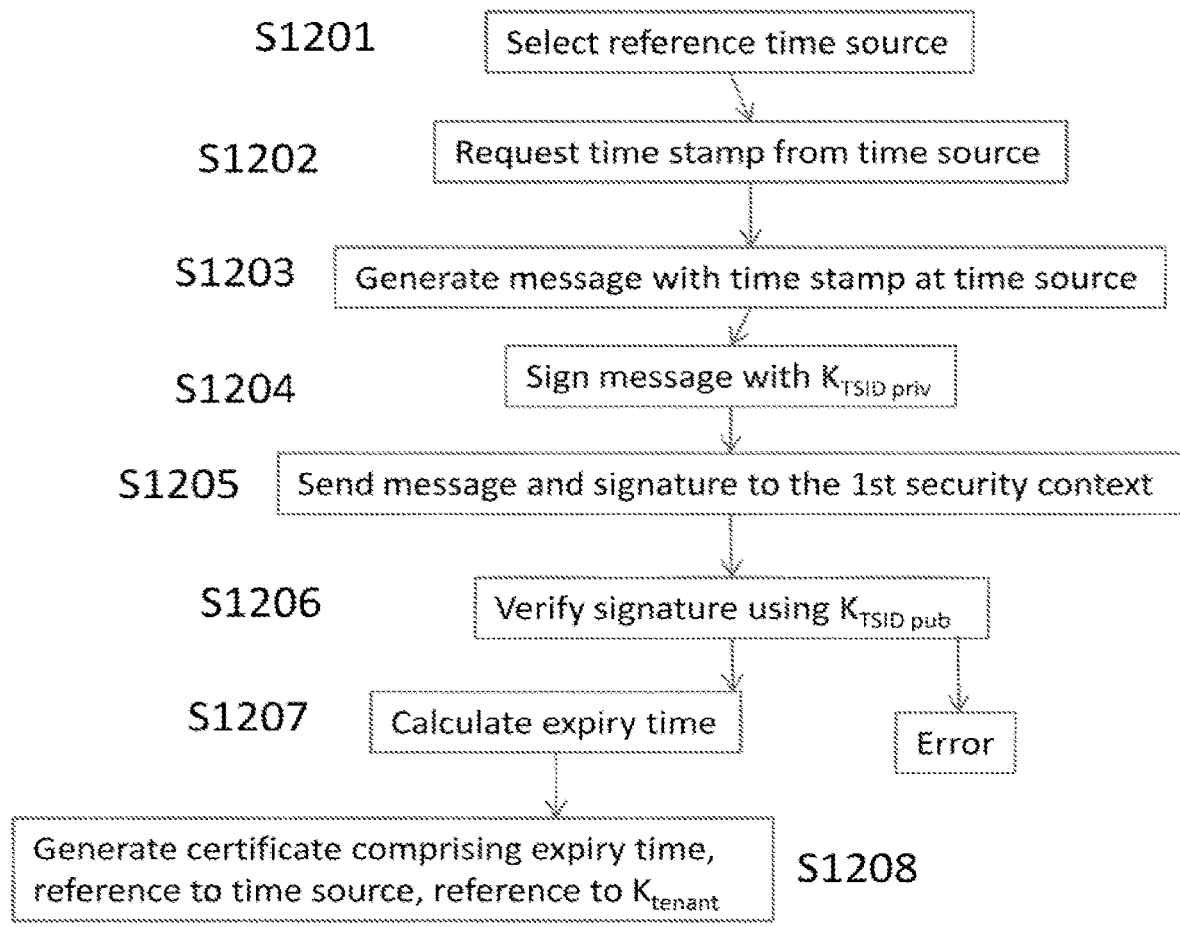
FIG. 12 is a flow chart showing a method of generating a use certificate at the first security context, which is part of a method of controlling use of a cryptographic key, $K_{tenant}$ according to an embodiment of the present invention.

FIG. 12 shows a method of generating a use certificate at the first security context 5, which is part of a method of controlling use of a cryptographic key, $K_{tenant}$ according to an embodiment of the present invention.

In step S1201, a reference time source 2 is selected by the first security context 5. Information identifying one or more time sources and information indicating that the time source(s) are trusted may be stored in the device memory 9 of the first security context 5 or outside of the first security context in an integrity protected manner. One of the time sources is selected by the first security context 5.

The time source 2 may be chosen from a list of trusted time sources broadcast by the second security context 7 and for which the first security context 5 has established trust.

Thus both the second security context 7 and the first security context 5 have established trust with the one or more time sources on the list. Each of these time sources are valid time sources with the necessary configuration and state. The first security context selects a time source 2 from the list of one or more valid time sources.

In step S1202, the first security context 5 requests the current time stamp from the chosen time source 2. The first transceiver 13 in the first security context 5 sends a request message to the time source 2.

In step S1203 the time source 2 generates a message including the time stamp. The message may comprise information identifying the time source and the current time at the generation of the message, determined from the time source clock. The information identifying the time source may comprise the hash of the public identity key of the generating time source, $K_{TSID\ pub}$.

The message may further comprise the current configuration information, relating to any indication that the time source has been tampered with for example. This information can then be used by the client to check whether the time source is in an acceptable state before using the timestamp in the use certificate.

In step S1204, the message is signed with the private half of the identity key of the time source, $K_{TSID\ priv}$. The third processor 41 in the time source is configured to cryptographically sign the message with the private half of the identity key of the time source, $K_{TSID\ priv}$.

In step S1205, the message and signature is sent to the first security context 5. The transceiver 39 in the time source 2 is configured to send the signed message to the first security context 5.

In step S1206, the first security context 5 verifies the response signature using the public half of the identity key of the time source, $K_{TSID\ pub}$. The first processor 17 in the first security context 5 is configured to verify the signature. The signature is verified using the public half of the identity key of the time source, $K_{TSID\ pub}$. The first processor 17 is configured to perform a signature verification algorithm that, given the signed message and the public key $K_{TSID\ pub}$ either accepts or rejects the message's claim to authenticity.

If the signature is verified successfully the method progresses to step S1207. If not, an error is returned to the time source 2, for example a message is sent stating "AccessDenied". At this point, the communication between the time source 2 and the second security context 7 is terminated.

If configuration information is included in the message, the first security context 5 validates that the configuration is acceptable. If the current configuration information is not acceptable to the tenant, then the use certificate generation is stopped.

In step S1207 the tenant calculates the expiry time for their key $K_{tenant}$ based on the aforementioned time stamp. The expiry time is calculated as the time stamp time plus an amount of time for which the tenant wishes the certificate to be active, for example the time stamp time plus one or more days.

Where the expiry time is small compared to the communication delay, a communication delay may be factored in to the expiry time for example. In this case, the expiry time is calculated as the time stamp time plus the communication delay from the reference time source 2 to the first security context 5 plus the communication delay from the first security context 5 to the second security context 7 plus the amount of time for which the tenant wishes the certificate to be active.

The amount of time for which the tenant wishes the certificate to be active may be a few seconds or several days for example, depending on the application.

A "start time" may also be included in the use certificate, such that the use certificate defines a validity period, within which the certificate is valid. This allows a tenant to pre-generate one or more certificates, in advance of use.

In step S1208, the expiry time, a reference to the time source, a reference to $K_{tenant}$ and a reference to the second security context 7 are included in a use certificate.

A reference to a system component, such as the time source or the second security context 7 may be a unique ID that can be tied to it using a certificate, or could be the hash of the public half of its identity key $K_{ID}$.

The processor 17 in the first security context 5 is configured to generate a use certificate, comprising the expiry time calculated in step S1207, a reference to a time source, a reference to $K_{tenant}$ and a reference to the second security context 7.

In an embodiment, the reference to $K_{tenant}$ is the hash of $K_{tenant}$. In an embodiment, the reference to the time source 2 is the hash of the public half of its identity key $K_{TSID-pub}$. In an embodiment, the reference to the second security context 7 is the hash of the public half of its identity key $K_{2ID-pub}$.

Returning to FIG. 11, once the use certificate has been generated, it is issued together with information from which the origin of the use certificate can be identified. In an embodiment, the information from which the origin of the use certificate can be identified is a hash of $K_{tenant-sign_{pub}}$.

In step S1102, the use certificate is signed with the private half of the signing key $K_{tenant-sign\ priv}$. The first processor 17 in the first security context 5 is configured to cryptographically sign the certificate with the private half of the signing key $K_{tenant-sign\ priv}$.

In step S1103, the use certificate is sent to the application server of the service provider, together with the information from which the origin of the use certificate can be validated. The information from which the origin of the use certificate can be validated is the signature, i.e. the signed use certificate.

The first transceiver 13 is configured to send the use certificate to the application server. Other entities which wish to use the tenant key may be sent a use certificate. These entities may communicate directly with the second security context 7 or via the application server.

Information from which the origin of the use certificate can be identified may also be sent with the use certificate. The information from which the origin of the use certificate can be identified may be a hash of $K_{tenant-sign_{pub}}$. The information from which the origin of the use certificate can be identified is included in order to identify which signing key should be used to verify the signature.

The first security context 5 thus sends the use certificate, the signature and the hash of $K_{tenant-sign\ pub}$, to the service provider. Each use of the key by the service provider is then accompanied by the presentation of this information to the second security context 7.

In step S1104, the use certificate, signature and the information from which the origin of the use certificate can be identified, which may be the hash of $K_{tenant\text{-}sign_{pub}}$ is presented to the second security context 7 by the application server. The use certificate is presented each time the application server wishes to use $K_{tenant}$. The application server may send a request message, specifying the use of the tenant key that is required, together with the use certificate. For example, the application server may send a message to the second security context 7 comprising a data file, a request that the second security context 7 encrypt the data file with the tenant key, a use certificate, the and the information from which the origin of the use certificate can be identified, which may be the hash of $K_{tenant\text{-}sign_{pub}}$.

The second security context 7 may have access to a number of public keys, for example associated with different tenants. The keys may be stored at the second security context 7, or outside the second security context 7 in an authenticated manner. The second security context 7 identifies the correct signature verification key $K_{tenant\text{-}sign_{pub}}$, based on the information from which the origin of the use certificate can be identified, which may be the hash of $K_{tenant\text{-}sign_{pub}}$. The signed use certificate is then verified at the second security context 7. The second processor 19 in the second security context 7 is configured to verify the signature. The signature is verified using the public half of the signing key $K_{tenant\text{-}sign\ pub}$. The second processor 19 is configured to perform a signature verification algorithm that, given the signed use certificate and the public key $K_{tenant\text{-}sign\ pub}$ either accepts or rejects the message's claim to authenticity. If the signature is verified successfully the method progresses to step S1105. If not, an error is returned to the first security context 5, for example a message is sent stating "AccessDenied". At this point, the communication between the first security context 5 and the second security context 7 is terminated.

In step S1105, the second security context 7 validates the use certificate with respect to the access control list stored in the second device memory 11. As part of this step, it is validated that the use certificate has not expired. It is also validated that the use certificate allows the operation that is requested, in other words that the use certificate matches the credential associated with the permission corresponding to the operation, or use, which is requested. The second processor 19 is configured to validate the use certificate. If the certificate is invalid, for example because of tamper indicated by the certificate signature, expiry or if the ACL does not allow the operation requested, then the second security context 7 may return an error message to the application server for example.

The second security context 7 identifies the securely stored tenant key corresponding to the use certificate from the reference to $K_{tenant}$ in the use certificate.

The second security context loads the securely stored tenant key and ACL. Loading the tenant key involves making it available to the processor in the second security context 7, i.e. sending the tenant key and ACL to the device memory 9, if not already present. This may involve loading the tenant key and ACL from a non-volatile memory device outside of the second security context 7, decrypting the key and making it available to the second processor for example.

At this point the second security context 7 validates the use certificate and that the expiry time has not elapsed with respect to the reference time source. The second security context 7 can use the use certificate to enable the matching permission by validating that all fields given are as expected.

The second processor 19 is configured to confirm that the reference to $K_{tenant}$ and the reference to the second security context 7 match those in ACL corresponding to the key $K_{tenant}$ and stored in the second device memory 11. In an embodiment, the reference to $K_{tenant}$ is the hash of $K_{tenant}$. In an embodiment, the reference to the second security context 7 is the hash of the public half of the identity key $K_{2ID\ pub}$.

If the reference to $K_{tenant}$ and the reference to the second security context 7 match those in ACL, it is confirmed whether the validity period has expired. If not, an error is returned to the application server, for example a message is sent stating "CertificateExpired".

The second processor 19 is further configured to confirm that the validity period has not expired with respect to the referenced time source 2. In an embodiment, the second security context 7 requests the current time stamp from the time source 2 corresponding to the reference in the use certificate. The second transceiver 15 in the second security context 7 is configured to send a request message to the time source 2. In response to the request message, the time source 2 generates a message including the current time stamp. The message is signed with the private half of the identity key of the time source, $K_{TSID\ priv}$. The third processor 41 in the time source is configured to cryptographically sign the message with the private half of the identity key of the time source, $K_{TSID\ priv}$. The signed message is then sent to the second security context 7. The transceiver 39 in the time source 2 is configured to send the signed message to the second security context 7. The message may also comprise the current configuration information of the time source.

The second security context 7 then verifies the response signature using the public half of the identity key of the time source, $K_{TSID\ pub}$. The second processor 19 in the second security context 7 is configured to verify the signature. The signature is verified using the public half of the identity key of the time source, $K_{TSID\ pub}$. The second processor 19 is configured to perform a signature verification algorithm that, given the signed message and the public key $K_{TSID\ pub}$ either accepts or rejects the message's claim to authenticity.

If the signature is verified successfully the current time stamp is compared to the expiry time contained in the use certificate to determine whether the use certificate has expired. If not, an error is returned to the application server, for example a message is sent stating "AccessDenied". At this point, the communication between the first security context 5 and the second security context 7 is terminated.

If the current time stamp received from the time source 2 is prior to the expiry time contained in the use certificate, then the method progresses to step S1106. If not, an error is returned to the application server, for example a message is sent stating "CertificateExpired". The application server may then request the first security context 5 to provide a new certificate or simply terminate the operation.

In step S1106, the second security context 7 grants the use of the cryptographic key, $K_{tenant}$, on the condition that the use certificate is valid and not expired. If the certificate is valid and the expiry time has not yet elapsed, the cryptographic operation is allowed to proceed. The second security context 7 can now use the tenant key within the validity period. The second security context 7 activates the necessary permissions within the ACL corresponding to the requested use and checks the ACL for an active permission that allows the request. The second security context 7 then performs the requested operation and returns the result to the application server. For example, in the case that the application server has sent a message comprising a data file and a request that the second security context 7 encrypt the data file with the tenant key, the second security context 7 encrypts the data file with the tenant key and returns the encrypted data file to the application server.

At or before the point of expiry, the tenant can generate a new certificate to extend the expiry time of the key. Failure to regenerate a new certificate results in the key becoming unusable by the service provider. In an embodiment, the second security context 7 notifies the first security context 5 before or at the point of expiry of the use certificate. A new use certificate can then be generated at the first security context with a later expiry time. Alternatively, the second security context 7 notifies the application server before or at the point of expiry of the use certificate. The application server then requests a new use certificate from the first security context 5. Alternatively, the use certificate is read by the application server, which requests a new use certificate from the first security context 5 before or at the point of expiry. Alternatively, a further component, which may be owned by the tenant or the service provider may monitor certificates and raise a request for certificates that are about to or have expired.

Thus the tenant system 1 effectively leases the cryptographic key $K_{tenant}$ to the service provider system 3 in a secure manner. The use of the key by the service provider is cryptographically restricted by an expiry time in reference to a trusted time source, as set by the owning tenant in the use certificate. The ACL specifies that the use of the cryptographic key $K_{tenant}$ is only granted when an unexpired use certificate is provided. Furthermore, the tenant can restrict how the key is used by the service provider.

Figure 13:
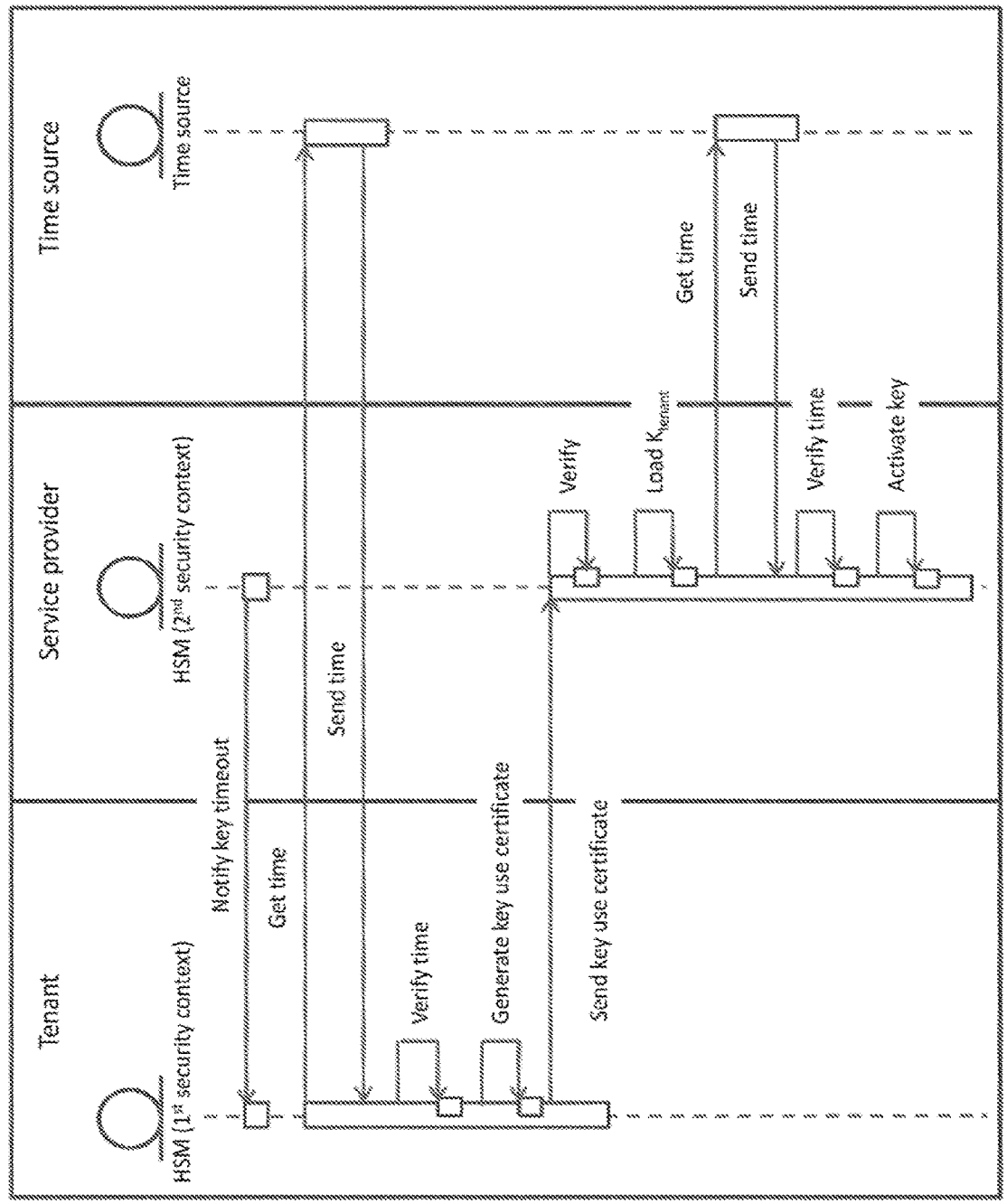
FIG. 13 is an illustration of a method of controlling use of a cryptographic key, $K_{tenant}$ according to an embodiment of the present invention.

FIG. 13 is a schematic illustration of a method of controlling use of a cryptographic key, $K_{tenant}$ according to an embodiment of the present invention.

This method shown corresponds to the case where the tenant key is being used at the second security context 7, and the expiry period elapses. The second security context 7 or the application server may periodically compare the current time obtained from the reference time source 2 to the expiry time in the use certificate, and from this information determine whether the certificate has expired. Alternatively, the second security context 7 may determine that the certificate has expired only when a request using an expired certificate is made. The second security context 7 may notify the first security context 5, the application server or a further device that the key has timed out.

The first security context 5 is configured to send a request message to the time source 2 in response to the notification, requesting the current time stamp as described in relation to step S1202 above.

The time source 2 is configured to generate and send a message comprising the time information as described in relation to steps 1203 to 1205 above.

The message is verified at the first security context 5 as described in relation to step S1206 above and a use certificate is generated as described in steps S1207 to S1208 and signed as described in step S1102 above. The use certificate is sent to the service provider as described in step S1103 above, and forwarded to the second security context 7 and verified at the second security context 7 as described in relation to step S1104. The stored tenant key corresponding to the use certificate is loaded and the current time stamp obtained from the time source 2 and validated as described in relation to S1105 above. Loading the tenant key involves making it available to the processor, i.e. sent to the device memory 9 if not already present. This may involve loading the tenant key from non-volatile memory device outside of the second security context 7, decrypting the key and making it available to the processor. The key is then activated as in step S1106 above.

Figure 14:
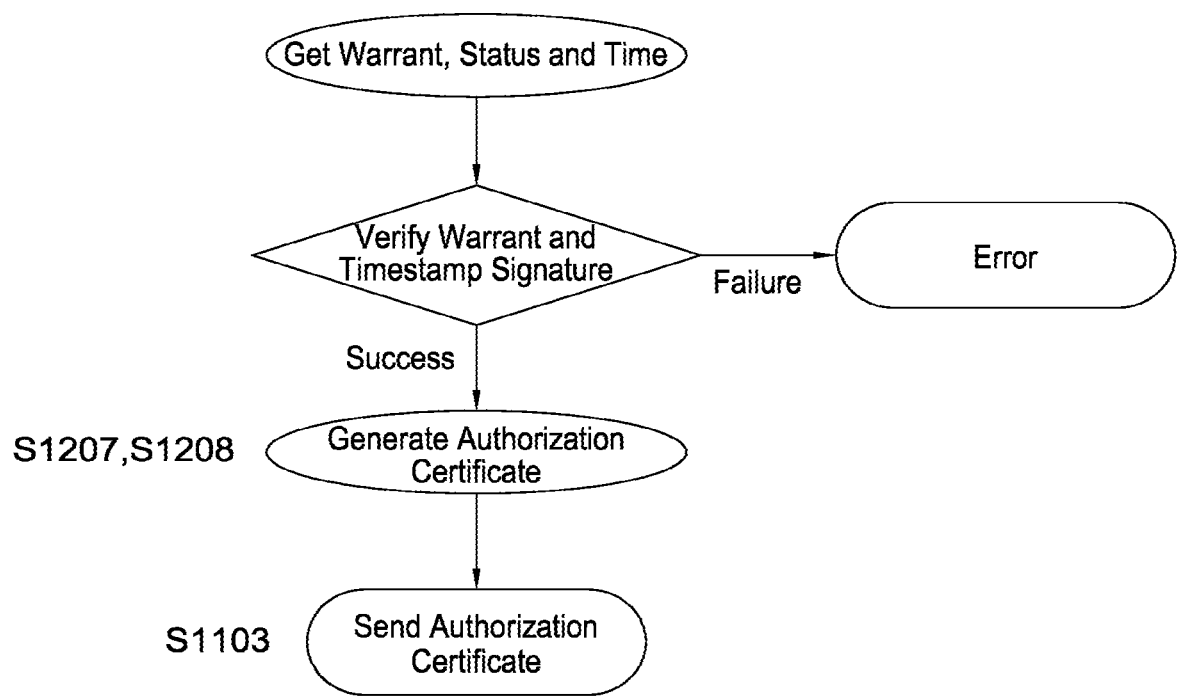
FIG. 14 is a flow chart of a method of controlling use of a cryptographic key, $K_{tenant}$ according to an embodiment of the present invention.

FIG. 14 is a schematic illustration of a method of controlling use of a cryptographic key, $K_{tenant}$ according to an embodiment of the present invention.

In the initial step, the first security context 5 obtains the generation certificate of the time source, status and time from a time source 2. The generation certificate and time stamp signature are then verified at the first security context 5. This is described in relation to FIG. 10 and steps S1201 to S1206 above.

If the generation certificate and time stamp signature are validated, then the method progresses on to the next step, "generate authorisation certificate". If not, an error is returned.

The use certificate is generated as described in steps S1207 and S1208 above. The use certificate is then sent to the second security context 7, as described in relation to step S1103 above.

The steps outlined above define a system that is secure against attack by third parties as well as a malicious service provider, as all key material is encrypted between the tenant and the second security context 7, the tenant key material is stored in a secure, tamper-resistant format, the tenant keys can only be used when authorized by a tenant in a way that is cryptographically enforced, and component spoofing is prevented by the presence of an identity key $K_{ID}$ and generation certificate signed by a manufacturer that is trusted by both the tenant and the service provider.

The above described key transfer method and method of controlling the use of the key mean that the tenant can securely lease cryptographic keys to a service provider who is hosting a shared cryptographic infrastructure of known origin. The use of the tenant key remains under the control of the tenant in a cryptographically protected manner.

As part of the key transfer method, the tenant generates a key inside a self-hosted, secure appliance, the first security context 5.

The tenant's secure appliance, the first security context 5, validates that the cryptographic infrastructure hosted by a chosen service provider, the second security context 7, adheres to a set of rules acceptable to the tenant by validating that the infrastructure is built using a trusted manufacturer, configured in a way acceptable to the tenant and suitable for leasing a key to. Step S205 described in relation to FIG. 2(a) above allows validation that the infrastructure is built using a trusted manufacture. If the signature of the generation certificate $C_{2ID}$ is verified, then it is validated that the second security context is built by a trusted manufacturer. Step S215 described in relation to FIG. 2(b) above allows validation that the infrastructure is configured in a way that is acceptable to the tenant and suitable for leasing a key to.

In addition the tenant and service provider's cryptographic infrastructure use a trusted time source 2, which may be hosted by a third-party, to enforce key expiry times set by the tenant.

The above described devices and methods enable a multi-tenanted, hosted cryptographic solution to be provided by a CSP. The system is designed to be secure against attacks by both third-parties and the CSP itself. A tenant remains in control of their key, providing usage authorizations, which are cryptographically enforced, for use inside a CSP-hosted system. It allows both multi-tenancy of HSMs and assurance for keys transferred into a service provider's cryptographic infrastructure. More than one tenant can use a single cryptographic appliance, however the security of a tenant's key is protected from both third parties and the service provider.

The above described devices and methods allow a tenant to verifiably lease cryptographic keys to be used inside a service provider's cryptographic infrastructure in a way that is inaccessible to the service provider and third parties, whilst maintaining control over the use of the keys once inside a CSP security context. This enables the secure leasing of cryptographic keys between a tenant and a service provider, with the ability to restrict the use of a tenant key for use inside a service provider HSM for a set time period, and providing resistance to malicious or rogue administrator attacks. It allows leasing of keys to a CSP in a cryptographically enforced manner. It allows service providers to host multi-tenanted services that are robust to third-party attack whilst also being robust against a malicious CSP. Cryptographically enforcing that the use of a tenant key is controlled by a tenant ensures that the use of keys is now completely controlled by tenants, making the service secure against attacks and enabling the sharing of infrastructure with others.

The above described devices and methods allow a CSP to provide their tenants use of their cryptographic infrastructure for applications such as payments, security and regulation.

The second security context 7 is part of a service provider system, enabling the service provider, for example a CSP, to host cryptographic services via hardware security modules, HSMs, on behalf of their customers.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A hardware security module device, comprising:
a first transceiver configured to receive a first public key and a first cryptographic certificate, comprising information from which the origin of the first public key can be validated, from a second hardware security module device;
a first processor configured to perform cryptographic operations, the first processor being further configured to:
generate a second cryptographic key pair and a second cryptographic certificate, the second cryptographic key pair comprising a second public key and a second private key and the second cryptographic certificate comprising information from which the origin of the second public key can be identified, wherein the first transceiver is further configured to send the second public key and the second cryptographic certificate to the second hardware security module device;
validate that the first public key originated from the second hardware security module device;
encrypt a first cryptographic key and a corresponding access control list to provide a secure channel between the hardware security module device and the second hardware security module device, wherein the secure channel is derived from the first public key, wherein the access control list specifies that a valid use credential must be presented in order to grant a first type of use of the first cryptographic key;
wherein the first transceiver is further configured to send the encrypted first cryptographic key and access control list, and information from which the origin of the encrypted first cryptographic key can be validated, to the second hardware security module device.

2. The device of claim 1, further comprising:
a first device memory, storing a first identity private key;
wherein the first transceiver is further configured to:
send a first identity public key and a first identity certificate to the second hardware security module device, wherein the first identity public key and the first identity private key are a cryptographic key pair and the first identity certificate comprises information identifying the first identity public key and is cryptographically signed by a manufacturer private key; and
receive a second identity public key and a second identity certificate from the second hardware security module device, the second identity certificate comprising information identifying the second identity public key and being cryptographically signed by the manufacturer private key;
the first processor is further configured to verify the second identity certificate using the manufacturer public key.

3. The device of claim 1, wherein
the first transceiver is further configured to:
receive information relating to the current configuration of the second hardware security module device, wherein the information is cryptographically signed with a second identity private key, wherein the second identity public key and the second identity private key are a cryptographic key pair; and wherein
the first processor is further configured to:
verify the signature using the second identity public key;
validate that the configuration of the second hardware security module device meets the security requirements of the hardware security module device.

4. The device of claim 3, wherein the first processor is further configured to:
cryptographically sign the second cryptographic certificate with the first identity private key, wherein sending the second cryptographic certificate to the second hardware security module device comprises sending the signed second cryptographic certificate to the second hardware security module device.

5. A hardware security module device, comprising:
a processor, configured to perform cryptographic operations, the processor being further configured to:
generate a first cryptographic key pair and a first cryptographic certificate, the first cryptographic key pair comprising a first public key and a first private key and the first cryptographic certificate comprising information from which the origin of the first public key can be validated;
a transceiver, configured to:
send the first public key and the first cryptographic certificate to a further hardware security module device;
receive a second public key and a second cryptographic certificate from the further hardware security module device; and receive a first cryptographic key and a corresponding access control list, and information from which the origin of the first cryptographic key can be validated, from the further hardware security module device, wherein the access control list specifies that a valid use credential must be presented in order to grant a first type of use of the first cryptographic key, wherein the first cryptographic key and corresponding access control list are received via a secure channel between the hardware security module device and the further hardware security module device, wherein the secure channel is derived from the first private key;

the processor further configured to:

validate the origin of the encrypted first cryptographic key; and wherein the processor is further configured to re-encrypt the first cryptographic key with a second cryptographic key.

6. The device of claim 5, further comprising:

a device memory, storing a second identity private key;

wherein the transceiver is further configured to:

send a second identity public key and a second identity certificate to the further hardware security module, wherein the second identity public key and the second identity private key are a cryptographic key pair and the second identity certificate comprises information identifying the second identity public key and is cryptographically signed by a manufacturer private key; and receive a first identity public key and a first identity certificate from the further hardware security module device, the first identity certificate comprising information identifying the first identity public key and being cryptographically signed by the manufacturer private key;

wherein the processor is further configured to verify the first identity certificate using the manufacturer public key.

7. The device according to claim 6, wherein the processor is further configured to generate the first cryptographic certificate comprising information relating to the current configuration of the device and sign the first cryptographic certificate with the second identity private key.

8. A method comprising:

receiving a first public key and a first cryptographic certificate from a second hardware security module device, the first cryptographic certificate comprising information from which the origin of the first public key can be validated;

generating a second cryptographic key pair and a second cryptographic certificate in a first hardware security module device, the second cryptographic key pair comprising a second public key and a second private key and the second cryptographic certificate comprising information from which the origin of the second public key can be identified;

sending the second public key and the second cryptographic certificate to the second hardware security module device;

validating the first cryptographic certificate in the first hardware security module device;

if the first cryptographic certificate is valid, encrypting a first cryptographic key and a corresponding access control list in the first hardware security module device to provide a secure channel between the first hardware security module device and the second hardware security module device, wherein the secure channel is derived from the first public key, wherein the access control list specifies that a valid use credential must be presented in order to grant a first type of use of the cryptographic key;

sending the encrypted first cryptographic key and corresponding access control list, and information from which the origin of the encrypted first cryptographic key can be validated, to the second hardware security module device.

9. A method comprising:

generating a first cryptographic key pair and a first cryptographic certificate in a second hardware security module device, the first cryptographic key pair comprising a first public key and a first private key, and the first cryptographic certificate comprising information from which the origin of the first public key can be validated;

sending the first public key and the first cryptographic certificate to a first hardware security module device;

receiving a second public key and a second cryptographic certificate at the second hardware security module device, the second cryptographic certificate comprising information from which the origin of the second public key can be identified;

receiving a first cryptographic key and a corresponding access control list, and information from which the origin of the encrypted first cryptographic key can be validated, from the first hardware security module device, wherein the access control list specifies that a valid use credential must be presented in order to grant a first type of use of the first cryptographic key, wherein the first cryptographic key and corresponding access control list are received via a secure channel between the first hardware security module device and the second hardware security module device, wherein the secure channel is derived from the first private key; and validating the origin of the encrypted first cryptographic key based on the at the second hardware security module device; and wherein the processor is further configured to re-encrypt the first cryptographic key with a second cryptographic key.

10. A non-transitory computer-readable storage medium storing a program configured to cause a computer to perform the method of claim 8.

* * * * *